US012576551B2

United States Patent
Hu et al.

(12) United States Patent
(10) Patent No.: US 12,576,551 B2
(45) Date of Patent: Mar. 17, 2026

(54) MODIFIED WOOD AND TRANSPARENT WOOD COMPOSITES, AND SYSTEMS AND METHODS FOR FORMING AND USE THEREOF

(71) Applicant: UNIVERSITY OF MARYLAND, COLLEGE PARK, College Park, MD (US)

(72) Inventors: Liangbing Hu, Rockville, MD (US); Ruiyu Mi, Beijing (CN); Qinqin Xia, Harbin (CN); Chaoji Chen, Wuhan (CN); Tian Li, West Lafayette, IN (US)

(73) Assignee: UNIVERSITY OF MARYLAND, COLLEGE PARK, College Park, MD (US)

( * ) Notice: Subject to any disclaimer, the term of this patent is extended or adjusted under 35 U.S.C. 154(b) by 175 days.

(21) Appl. No.: 18/014,941

(22) PCT Filed: Jul. 9, 2021

(86) PCT No.: PCT/US2021/041181
§ 371 (c)(1),
(2) Date: Jan. 6, 2023

(87) PCT Pub. No.: WO2022/011316
PCT Pub. Date: Jan. 13, 2022

(65) Prior Publication Data

US 2023/0256645 A1 Aug. 17, 2023

Related U.S. Application Data

(60) Provisional application No. 63/134,936, filed on Jan. 7, 2021, provisional application No. 63/050,484, filed on Jul. 10, 2020.

(51) Int. Cl.
*B27K 3/15* (2006.01)
*B27K 3/16* (2006.01)

(52) U.S. Cl.
CPC . *B27K 3/15* (2013.01); *B27K 3/16* (2013.01)

(58) Field of Classification Search
None
See application file for complete search history.

(56) References Cited

U.S. PATENT DOCUMENTS 5,937,925 A * 8/1999 Lee .......................... F26B 7/00 144/380
6,235,358 B1 5/2001 Goto et al.
(Continued)

FOREIGN PATENT DOCUMENTS

CA 3006341 A1 6/2017
JP H11-048208 A 2/1999
(Continued)

OTHER PUBLICATIONS

Feb. 28, 2019, machine translation of JP2019-505420 (Year: 2019).*
(Continued)

*Primary Examiner* — Chinessa T. Golden
(74) *Attorney, Agent, or Firm* — RowanTree Law Group, PLLC; Frederick F. Rosenberger

(57) ABSTRACT

In some embodiments, a material comprises a contiguous block of chemically-modified wood infiltrated with an index-matching polymer. The contiguous block has a first section that is substantially transparent to light and a second section that is translucent or opaque. The first section can have a lower lignin content than the second section. Alternatively, the first section can have a chromophore state altered from that of the wood in its natural state, and the lignin in the second section can retain a chromophore state of the wood in its natural state. In some embodiments, a material comprises a section of wood chemically-modified such that chromophores of lignin within the wood in its natural state are altered or removed, and the section retains
(Continued)

at least 70% of the lignin of the wood in its natural state. Methods for forming such materials are also disclosed.

20 Claims, 34 Drawing Sheets

(56) References Cited

U.S. PATENT DOCUMENTS

| | | | |
|---|---|---|---|
| 10,411,222 B2 | 9/2019 | Hu et al. | |
| 10,982,390 B2 | 4/2021 | Hu et al. | |
| 2010/0068543 A1 | 3/2010 | Hayward et al. | |
| 2010/0272938 A1 | 10/2010 | Mitchell et al. | |
| 2014/0059878 A1 | 3/2014 | Bilaine et al. | |
| 2016/0010279 A1 | 1/2016 | Hu et al. | |
| 2018/0370071 A1* | 12/2018 | Boitouzet | C08B 1/003 |
| 2019/0282253 A1 | 9/2019 | Steger | |
| 2019/0292337 A1 | 9/2019 | Heiskanen et al. | |
| 2020/0023546 A1* | 1/2020 | Li | B27K 3/0292 |
| 2021/0122902 A1 | 4/2021 | Hu et al. | |

FOREIGN PATENT DOCUMENTS

| | | | | |
|---|---|---|---|---|
| JP | 2019505420 A | * | 2/2019 | B27K 5/008 |
| WO | WO 2014/060413 A1 | | 4/2014 | |
| WO | WO-2017136714 A1 | * | 8/2017 | B27K 3/0207 |

OTHER PUBLICATIONS

Abstract for Yano et al., "High Strength Wood-based Materials," *Cellulose Commun.*, 2003, 10(1): pp. 23-27. (6 pages).

Callahan, "Wooden Windows? New material could replace glass in solar cells and buildings," Mar. 31, 2016. PCT ISA/US Retrieved from the Internet Mar. 30, 2017 (Mar. 30, 2017). URL: <http://www.kth.se/en/forskning/artiklar/kth-forskare-har-uppfunnit-genomskinligt-tra-1.638511>. (3 pages).

Chung, "The incredible possibilities of invisible wood," CNN Updated Aug. 2016, PCT ISA/US Retrieved from the internet Mar. 30, 2017 (Mar. 30, 2017). URL: <http://www.cnn.com/2016-05-23/architecture/clear-wood-architecture/>. (3 pages).

CN Office Action, issued Dec. 4, 2023 (Dec. 4, 2023), in Chinese Application No. 202180053907.2. (14 pages).

CN Office Action, issued Jun. 21, 2024 (Jun. 21, 2024), in Chinese Application No. 202180053907.2. (13 pages).

EP Office Action, issued Jan. 25, 2024 (Jan. 25, 2024), in European Application No. 21838167.1. (7 pages).

Fink, Siegfried, "Transparent Wood—A New Approach in the Functional Study of Wood Structure," *Holzforschung: International Journal of the Biology, Chemistry, Physics and Technology of Wood*, Jan. 1992, 46(5): pp. 403-408. (6 pages).

Jia et al., "Scalable, anisotropic transparent paper directly from wood for light management in solar cells," *Nano Energy*, 2016, 36: pp. 366-373. (8 pages).

Li et al., "Lignin-Retaining Transparent Wood," *ChemSusChem*, 2017, 10: pp. 3445-3451. (7 pages).

Li et al., "Luminescent Transparent Wood," *Advanced Optical Materials*, 2016, DOI: 10.1002/adom.201600834. (5 pages).

Li et al., "Optically Transparent Wood from a Nanoporous Cellulosic Template: Combining Functional and Structural Performance," *Biomacromolecules*, 2016, 17: pp. 1358-1364. (7 pages).

Vasileva et al., "Transparent wood as a novel material for non-cavity laser," *Asia Communications and Photonics Conference* (*ACP*), 2016. (3 pages).

Yano et al., "Effects of the removal of matrix substances as a pretreatment in the production of high strength resin impregnated wood based materials," *Journal of Materials Science Letters*, 2001, 20: pp. 1125-1126. (2 pages).

Zhu et al., "Highly Anisotropic, Highly Transparent Wood Composites," *Advanced Materials*, 2016, DOI: 10.1002/adma.201600427. (7 pages).

De Hora Machado et al. "Photodelignification of *Eucalyptus grandis* organosolv chemical pulp," *Journal of Photochemistry and Photobiology A: Chemistry*, 1996, 94: pp. 253-262. (10 pages).

International Search Report and Written Opinion, mailed Dec. 21, 2021, in International Application No. PCT/US21/41181. (21 pages).

Mi et al., "Scalable aesthetic transparent wood for energy efficient buildings," *Nature Communications*, Jul. 2020, 11:3836. (9 pages).

Tormund et al., "Delignification and bleaching response of earlywood and latewood," *Journal of Wood Chemistry and Technology*, 2006, 26: pp. 325-337. (13 pages).

JP Office Action, issued Apr. 22, 2025 (Apr. 22, 2025), in Japanese Application No. 2023-501451. (10 pages).

IN Office Action, mailed Jan. 19, 2026 (Jan. 19, 2026), in Indian Application No. 202327002605. (6 pages).

EP Office Action, mailed Jan. 28, 2026 (Jan. 28, 2026), in European Application No. 25195534.0. (8 pages).

* cited by examiner

MODIFIED WOOD AND TRANSPARENT WOOD COMPOSITES, AND SYSTEMS AND METHODS FOR FORMING AND USE THEREOF

CROSS-REFERENCE TO RELATED APPLICATION

The present application claims the benefit of U.S. Provisional Application No. 63/050,484, filed Jul. 10, 2020, entitled "Patterned, Transparent Wood and Wood Composite Structures and Methods of Making and Using the Same," and U.S. Provisional Application No. 63/134,936, filed Jan. 7, 2021, entitled "Patterned, Transparent Wood and Wood Composite Structures and Methods of Making and Using the Same," both of which are incorporated by reference herein in their entireties.

FIELD

The present disclosure relates generally to processing of naturally-occurring wood, and more particularly, to forming and use of modified wood and/or transparent wood composites.

SUMMARY

Embodiments of the disclosed subject matter provide modified wood and transparent wood composites, and methods for forming and use thereof. In some embodiments, a contiguous wood block is subjected to a chemical treatment such that natural sections therein experience different degrees of lignin removal. For example, the contiguous wood block can be a softwood, and the earlywood sections thereof can be delignified while the latewood sections thereof can retain substantial amounts of lignin after the chemical treatment. Subsequent infiltration of the chemically-treated wood block with an index-matching polymer converts the delignified sections to be substantially transparent while other sections remain opaque or translucent with respect to wavelengths in the visible light spectrum. The resulting wood composite can thus exhibit a natural pattern defined by the arrangement of transparent earlywood sections and translucent or opaque latewood sections.

In some embodiments, a contiguous wood block is subjected to a UV-assisted photocatalytic oxidation treatment to in situ modify lignin therein, thereby converting a color of the wood to white. For example, the contiguous wood block can be infiltrated with a liquid oxidation agent, such as hydrogen peroxide, and then subsequently exposed to UV radiation to cause a chromophore of lignin within the wood block to be removed therefrom while otherwise retaining the lignin within the microstructure of the wood. In some embodiments, the application of liquid oxidation agent to a surface of the wood block and/or the exposure of the wood block to UV light can form a pattern, which confines the in situ modification to particular sections of the wood block. Subsequent infiltration of the wood block with an index-matching polymer converts the in situ modified sections to be substantially transparent while other sections remain opaque or translucent with respect to wavelengths in the visible light spectrum. The resulting wood composite can thus exhibit a predetermined pattern defined by the application of oxidation agent and UV light and independent of any underlying natural patterns in the wood.

In a representative embodiment, a material comprises a contiguous block of chemically-modified wood infiltrated with polymer. The chemically-modified wood can retain a cellulose-based microstructure of the wood in its natural state. The polymer can have a refractive index substantially matching a refractive index of cellulose and filling open spaces within the microstructure. The contiguous block can have a first section and a second section adjacent to the first section. At least one of the first and second sections have been chemically modified such that a lignin characteristic of the first section is different than a lignin characteristic of the second section. The first section can be substantially transparent to light having a wavelength of 600 nm, and the second section can be translucent or opaque to the light having a wavelength of 600 nm.

In another representative embodiment, a material comprises a section of wood chemically-modified such that chromophores of lignin within the wood in its natural state are altered or removed. The section can retain at least 70% of the lignin of the wood in its natural state. The section can also retain a cellulose-based microstructure of the wood in its natural state.

In another representative embodiment, a method comprises subjecting a contiguous block of wood to a chemical treatment for a first time so as to remove lignin from first and second sections within the contiguous block while substantially retaining a cellulose-based microstructure of the wood. The first section can be adjacent to the second section. The first time can be selected such that at least 90% of the lignin of the wood in the first section is removed while less than 75% (e.g., no more than 65%, or no more than 50%) of the lignin in the second section is removed. The method can further comprise infiltrating the contiguous block with a polymer so as to fill open spaces within the retained cellulose-based microstructure of the first and second sections. The polymer can have a refractive index substantially matching a refractive index of cellulose. After the infiltrating, the first section can be substantially transparent to light having a wavelength of 600 nm, and the second section can be translucent to the light having a wavelength of 600 nm.

In another representative embodiment, a method comprises applying a first volume of a liquid oxidation agent to an external surface of a section of a contiguous block of wood, and, during or after the applying, exposing the section of the contiguous block of wood to ultra-violet (UV) radiation. Chromophores of lignin within said section can be chemically oxidized and removed in situ by the UV exposure in the presence of the liquid oxidation agent. After the exposing, at least 70% of the lignin in said section prior to the applying retained. After the exposing, the section can also retain a cellulose-based microstructure of the wood prior to the applying.

In another representative embodiment, a method comprises photocatalytically oxidizing a section of a contiguous block of wood so as to in situ chemically modify native lignin within the section to remove chromophores thereof while preserving its bulk aromatic skeleton.

Any of the various innovations of this disclosure can be used in combination or separately. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the disclosed technology will become more apparent from the following detailed description, which proceeds with reference to the accompanying figures.

BRIEF DESCRIPTION OF THE DRAWINGS

Embodiments will hereinafter be described with reference to the accompanying drawings, which have not necessarily been drawn to scale. Where applicable, some elements may be simplified or otherwise not illustrated in order to assist in the illustration and description of underlying features. Throughout the figures, like reference numerals denote like elements.

DETAILED DESCRIPTION

General Considerations

Figure 1A:
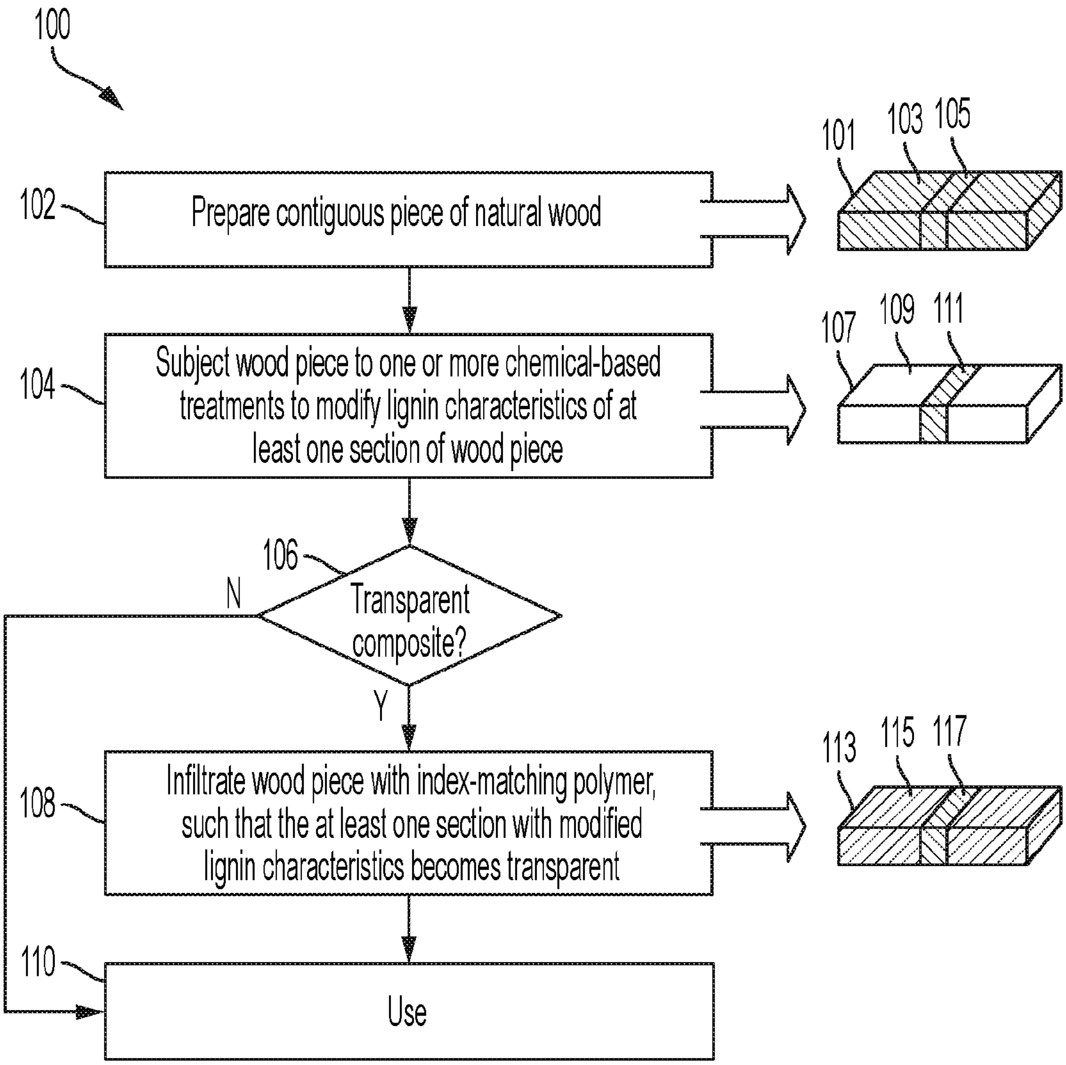
FIG. 1A is a simplified process flow diagram of a generalized fabrication method for forming modified wood or transparent wood composites, according to one or more embodiments of the disclosed subject matter.

For purposes of this description, certain aspects, advantages, and novel features of the embodiments of this disclosure are described herein. The disclosed methods and systems should not be construed as being limiting in any way. Instead, the present disclosure is directed toward all novel and nonobvious features and aspects of the various disclosed embodiments, alone and in various combinations and subcombinations with one another. The methods and systems are not limited to any specific aspect or feature or combination thereof, nor do the disclosed embodiments require that any one or more specific advantages be present, or problems be solved. The technologies from any embodiment or example can be combined with the technologies described in any one or more of the other embodiments or examples. In view of the many possible embodiments to which the principles of the disclosed technology may be applied, it should be recognized that the illustrated embodiments are exemplary only and should not be taken as limiting the scope of the disclosed technology.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms are high-level abstractions of the actual operations that are performed. The actual operations that correspond to these terms may vary depending on the particular implementation and are readily discernible by one of ordinary skill in the art.

The disclosure of numerical ranges should be understood as referring to each discrete point within the range, inclusive of endpoints, unless otherwise noted. Unless otherwise indicated, all numbers expressing quantities of components, molecular weights, percentages, temperatures, times, and so forth, as used in the specification or claims are to be understood as being modified by the term "about." Accordingly, unless otherwise implicitly or explicitly indicated, or unless the context is properly understood by a person of ordinary skill in the art to have a more definitive construction, the numerical parameters set forth are approximations that may depend on the desired properties sought and/or limits of detection under standard test conditions/methods, as known to those of ordinary skill in the art. When directly and explicitly distinguishing embodiments from discussed prior art, the embodiment numbers are not approximates unless the word "about" is recited. Whenever "substantially," "approximately," "about," or similar language is explicitly used in combination with a specific value, variations up to and including 10% of that value are intended, unless explicitly stated otherwise.

Directions and other relative references may be used to facilitate discussion of the drawings and principles herein, but are not intended to be limiting. For example, certain terms may be used such as "inner," "outer,", "upper," "lower," "top," "bottom," "interior," "exterior," "left," right," "front," "back," "rear," and the like. Such terms are used, where applicable, to provide some clarity of description when dealing with relative relationships, particularly with respect to the illustrated embodiments. Such terms are not, however, intended to imply absolute relationships, positions, and/or orientations. For example, with respect to an object, an "upper" part can become a "lower" part simply by turning the object over. Nevertheless, it is still the same part and the object remains the same.

As used herein, "comprising" means "including," and the singular forms "a" or "an" or "the" include plural references unless the context clearly dictates otherwise. The term "or" refers to a single element of stated alternative elements or a combination of two or more elements, unless the context clearly indicates otherwise.

Although there are alternatives for various components, parameters, operating conditions, etc. set forth herein, that does not mean that those alternatives are necessarily equivalent and/or perform equally well. Nor does it mean that the alternatives are listed in a preferred order, unless stated otherwise. Unless stated otherwise, any of the groups defined below can be substituted or unsubstituted.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Features of the presently disclosed subject matter will be apparent from the following detailed description and the appended claims.

Overview of Terms

The following explanations of specific terms and abbreviations are provided to facilitate the description of various aspects of the disclosed subject matter and to guide those of ordinary skill in the art in the practice of the disclosed subject matter.

Contiguous piece: A single continuous piece of wood taken from a single tree and subject to processing, as contrasted with a single piece formed by joining or combining multiple subpieces (e.g., laminate). In some embodiments, the processing forms sections or regions within the contiguous piece of wood with different lignin characteristics.

Lignin characteristics: In some embodiments, lignin characteristics refers to a content of naturally-occurring or native lignin in a wood section. Different lignin characteristics can thus refer to the native lignin content of one wood section being less than that of an adjacent wood section after processing (e.g., such that an earlywood region is substantially delignified while an adjacent latewood region retains a majority or at least some native lignin). Alternatively or additionally, in some embodiments, lignin characteristics refers to a naturally-occurring or native form of lignin in a wood section. Different lignin characteristics can thus refer to the native lignin of one wood section being in situ modified (e.g., by chemical oxidation) to alter or remove a chromophore of the lignin without otherwise removing the lignin, while an adjacent wood section retains the native form of lignin after processing.

Delignified: A wood section having at least 90% of naturally-occurring lignin originally therein removed therefrom. In some embodiments, a lignin content of a delignified wood section is no more than 3 wt %, for example, less than 1 wt %. Lignin content within the cellulose-based material before and after delignification can be assessed using known techniques in the art, for example, Laboratory Analytical Procedure (LAP) TP-510-42618 for "Determination of Structural Carbohydrates and Lignin in Biomass," Version 08-03-2012, published by National Renewable Energy Laboratory (NREAL), and ASTM E1758-01(2020) for "Standard Test Method for Determination of Carbohydrates in Biomass by High Performance Liquid Chromatography," published by ASTM International, both of which are incorporated herein by reference Longitudinal growth direction: A direction along which a plant grows from its roots or from a trunk thereof, with cellulose nanofibers forming cell walls of the plant being generally aligned with the longitudinal growth direction. In some cases, the longitudinal growth direction may be generally vertical or correspond to a direction of its water transpiration stream. This is in contrast to the radial direction, which extends from a center portion of the plant outward and may be generally horizontal.

Transparent: Having a transmittance value (i.e., ratio of intensity of transmitted light to intensity of incident light) of at least 80% with respect to a particular wavelength of light or range of light wavelengths.

Translucent: Having a transmittance value of between 36% and 80% with respect to a particular wavelength of light or range of light wavelengths.

Opaque: Having a transmittance value less than 36% with respect to a particular wavelength of light or range of light wavelengths.

Introduction

Transparent wood composites with improved mechanical properties can be formed by retaining some or all of the lignin that naturally occurs within the starting wood material. In prior transparent wood composites, removal of most or all (e.g., at least 90%) of the lignin in the starting wood material is necessary to yield high transparency (e.g., >80% for visible wavelengths). However, the removal of such significant amounts of lignin can compromise the integrity of the cellulose-based microstructure of the wood, thereby complicating subsequent fabrication steps (e.g., polymer infiltration) and the resulting mechanical strength of the composite material.

In some embodiments of the disclosed subject matter, a contiguous wood block can be subjected to a chemical treatment such that natural sections therein experience different degrees of lignin removal. For example, the contiguous wood block can be a softwood, and the earlywood sections thereof can be delignified while the latewood sections thereof can retain substantial amounts of lignin after the chemical treatment. Subsequent infiltration of the chemically-treated wood block with an index-matching polymer converts the delignified sections to be substantially transparent while other sections remain opaque or translucent with respect to wavelengths in the visible light spectrum. The resulting wood composite can thus exhibit a natural pattern defined by the arrangement of transparent earlywood sections and translucent or opaque latewood sections. Moreover, since the latewood sections retain substantial amounts of lignin, the overall mechanical strength of the material is improved as compared to completely delignified wood composites.

Alternatively or additionally, in some embodiments of the disclosed subject matter, contiguous wood block is subjected to a UV-assisted photocatalytic oxidation treatment to in situ modify lignin therein, thereby converting a color of the wood to white. For example, the contiguous wood block can be infiltrated with a liquid oxidation agent, such as hydrogen peroxide, and then subsequently exposed to UV radiation to cause a chromophore of lignin within the wood block to be removed therefrom while otherwise retaining the lignin within the microstructure of the wood. In some embodiments, the application of liquid oxidation agent to a surface of the wood block and/or the exposure of the wood block to UV light can form a pattern, which confines the in situ modification to particular sections of the wood block. Subsequent infiltration of the wood block with an index-matching polymer converts the in situ modified sections to be substantially transparent while other sections remain opaque or translucent with respect to wavelengths in the visible light spectrum. The resulting wood composite can thus exhibit a predetermined pattern defined by the application of oxidation agent and UV light and independent of any underlying natural patterns in the wood. Since no or only minimal of the lignin is removed by the photocatalytic oxidation treatment (e.g., less than 30% of the lignin in the original wood removed), the overall mechanical strength of the material is improved as compared to completely delignified wood composites.

In addition, prior transparent wood composites require substantial amounts of chemicals and extensive processing times for the delignification of wood, which may inhibit manufacturability. In contrast, in some embodiments, UV-assisted photocatalytic oxidation treatment is used to process wood to in situ modify lignin therein by surface application of a liquid oxidation agent. Thus, the treatment time and the amount of chemicals used can be reduced as compared to prior transparent wood processing. Moreover, as compared to delignification agents such as $NaClO_2$ that can release toxic chlorine gas, the use of hydrogen peroxide ($H_2O_2$) as the liquid oxidation agent provides a more environmentally friendly process, since $H_2O_2$ only produces water or oxygen as byproducts.

In some embodiments, a naturally-patterned transparent wood composite (also referred to as aesthetic wood) is provided. The aesthetic wood can have aesthetic features (e.g., intact wood patterns), excellent optical properties (e.g., an average transmittance of ~80% and a haze of ~93%), good UV-blocking ability (e.g., a transmittance of ≤20%), and low thermal conductivity ($0.24\ W\cdot m^{-1}\ K^{-1}$) based on a process of spatially-selective delignification and refractive-index-matched polymer (e.g., epoxy resin) infiltration. Moreover, the rapid fabrication process (e.g., chemical treatment of 2 hours or less) and mechanical robustness (e.g., a high longitudinal tensile strength of 91.95 MPa and toughness of $2.73\ MJ\cdot m^{-3}$) of the aesthetic wood can enable manufacturing at scale while saving large amounts of time and energy as compared to conventional complete delignification processes. For example, the aesthetic wood may be used in energy-efficient building applications, such as glass ceilings, rooftops, transparent decorations, and indoor panels.

In some embodiments, a modified wood (also referred to as in situ lignin modified wood, lignin-modified wood, or photonic wood) is provided. Lignin within natural wood can be modified using an in situ, rapid, and scalable process, in particular, by photocatalytic oxidation of native lignin in wood using a liquid oxidation agent (e.g., hydrogen peroxide) and UV light (e.g., solar radiation or artificial illumination in the UVA band). The photocatalytic oxidation reaction selectively eliminates chromophores of the lignin while leaving the aromatic skeleton of the lignin intact, thus modulating the optical properties of wood. The resulting photonic wood retains ~80% of its original lignin content, which continues to serve as a strong binder and waterproofing agent. As a result, the photonic wood exhibits a much higher mechanical strength in a wet environment (e.g., 20-times higher tensile strength and 12-times greater compression resistance), significant scalability (e.g., ~2-meter long sample), and largely reduced processing times (e.g., 1-6.5 hours versus 4-14 hours) as compared with delignification of wood. Moreover, the in-situ lignin-modified wood structure can be patterned using photocatalytic oxidation process, in particular, by selective application of the liquid oxidation agent or UV radiation to surfaces of the wood. This photocatalytic production of photonic wood can enable large-scale manufacturing of sustainable bio-sourced functional materials for a range of applications, including energy-efficient buildings, optical management, and fluidic, ionic, electronic, and optical devices.

In some embodiments, a transparent wood composite (also referred to as in situ lignin modified transparent wood composite, artificially patterned transparent wood composite, or simply, transparent wood) is provided. Lignin within natural wood can be modified using UV-assisted photocatalytic oxidation, similar to photonic wood. This preserves most of the native lignin to act as a binder, thereby providing a robust wood scaffold for polymer infiltration while greatly reducing the chemical and energy consumption as well as processing time. After polymer infiltration, the resulting transparent wood (e.g., ~1 mm in thickness) can exhibit a high transmittance (e.g., >90%), high haze (e.g., >60%), and excellent light-guiding effect with respect to visible light wavelengths. Moreover, similar to photonic wood, patterns can be formed directly on the wood surfaces by selective application of the liquid oxidation agent (e.g., brushing or printing) or UV radiation (e.g., masking or laser illumination). Compared to delignified wood (e.g., tensile strength of 0.4 MPa), the lignin-modified wood has a substantially higher tensile strength (e.g., 20.6 MPa) due to the presence of the modified lignin binding with the well-oriented cellulose fibrils.

METHOD EXAMPLES

FIG. 1A illustrates an exemplary method 100 for forming modified wood or transparent wood composites. The method 100 can begin at process block 102, where a contiguous piece 101 of natural wood is prepared. For example, the preparing of process block 102 can include cutting, removing, or otherwise separating the piece of wood from a parent tree. In some embodiments, the cutting can form the natural wood into a substantially flat planar structure, with a direction of cellulose fibers extending parallel to a plane of the structure (e.g., longitudinal cut or rotary cut) or extending perpendicular to a plane of the structure (e.g., radial cut). Optionally, in some embodiments, the preparing can include pre-processing of the piece of natural wood, for example, cleaning to remove any undesirable material or contamination in preparation for subsequent processing, forming the natural cellulose-based material into a particular shape in preparation for subsequent processing (e.g., slicing into strips), or any combination of the foregoing. In some embodiments, the contiguous piece 101 of natural wood can be a softwood with well-defined naturally-occurring sections therein having different properties, such as an early-wood (EW) region 103 and an adjacent latewood (LW) region 105. Alternatively, in some embodiments, the contiguous piece 101 of natural wood can be a hardwood or a softwood without well-defined naturally-occurring sections.

At process block 104, the contiguous piece of natural wood can be subject to one or more chemical-based treatments to modify lignin characteristics of at least one section of the wood piece. In some embodiments, the lignin characteristic modification is such that at least one section is formed having a different lignin property than that of an adjacent section. For example, in some embodiments, the lignin property is a lignin content of sections of the contiguous piece 107 of processed wood, and the chemical-based treatment can be such that the lignin content of one wood section 109 (e.g., formerly EW region 103) is less than that of an adjacent wood section 111 (e.g., formerly LW region 105), as described in further detail below with respect to FIG. 1B. Alternatively, in some embodiments, the lignin property is presence of a chromophore, and the chemical-based treatment can be such that chromophores in one wood section 109 are removed while chromophores in an adjacent wood section 111 are retained, as described in further detail below with respect to FIGS. 1C-1D. Alternatively, in some embodiments, the lignin characteristic modification is such that the entire contiguous piece is formed having the lignin property (e.g., lignin content or presence of chromophore).

The method 100 can proceed to decision block 106, where it is determined if a transparent composite is desired. If it is determined that a transparent composite is not desired, for example, for use as photonic wood, then the method 100 can proceed from decision block 106 to process block 110. Otherwise, if it is determined that a transparent composite is desired, the method 100 can proceed from decision block 106 to process block 108, where the contiguous piece of modified wood is infiltrated with an index-matching polymer.

In some embodiments, the polymer infiltration of process block 108 can be accomplished by one or more vacuum-assisted infiltration sessions, for example, by immersing the modified wood in a container of liquid polymer or polymer precursors and applying a vacuum to chamber containing the container, or as otherwise described in International Publication No. WO-2017/136714, filed Feb. 3, 2017, which is incorporated herein by reference. The polymer can be any polymer having a refractive substantially matching that of cellulose (e.g., having a refractive index of ~1.47) and capable of infiltration into the wood microstructure. For example, the infiltrated index-matching polymer can include any type of thermosetting polymer (e.g., epoxy resin), thermoplastic polymer (e.g., acrylic), cellulose derivative (e.g., cellulose acetate), and/or a functional index-matching material (e.g., liquid crystal or piezoelectric material). Non-limiting examples of polymers that can be infiltrated into the modified wood can include, but are not limited to, those described in International Publication No. WO-2017/136714 incorporated by reference above. In some embodiments, the polymer can be an epoxy resin (e.g., AeroMarine 300/21 epoxy).

In some embodiments, process block 110 can also include drying or allowing infiltrated precursors to polymerize. In some embodiments, the modified wood with infiltrated polymer is subjected to pressing during the drying or polymerization. For example, when a first section 109 has been delignified in process block 104 and a second section 111 retains lignin, the different mechanical strengths of the sections could lead to warping as the polymer dries or polymerizes in these sections. Accordingly, nominal pressure (e.g., without changing a thickness of the contiguous piece by more than 10%) can be applied during the drying or polymerization to prevent, or at least reduce, any warping.

The infiltration of the polymer via process block 110 can thus convert some or all of the wood sections to be substantially transparent. For example, when wood section 109 was substantially delignified or had chromophores removed via the chemical treatment at process block 104, the infiltrating polymer can convert section 109 into a substantially transparent section 115. Meanwhile, when wood section 111 retained lignin and its chromophore after the chemical treatment at process block, section 111 remains a translucent or opaque section 117 after polymer infiltration. Alternatively, in some embodiments, when the entire contiguous piece 107 was formed having the modified lignin property, then the entire piece 113 will be made transparent after polymer infiltration.

After the polymer infiltration of process block 108, or if no polymer infiltration was desired at decision block 106, the method 100 can proceed to process block 110, where the modified wood or transparent wood composite is used in a particular application or adapted for use in a particular application. For example, process block 110 can include machining, cutting, or otherwise forming the contiguous piece into a particular shape. The use of process block 110 can involve use of the contiguous piece of modified wood or transparent wood composite by itself or assembling it together with non-wood materials (e.g., metal, metal alloy, plastic, ceramic, composite, etc.) to form a heterogenous composite structure). In some embodiments, after the polymer infiltration of process block 108, the contiguous piece of transparent wood composite can be used as part of a building (e.g., a window or skylight). Alternatively, in some embodiments, when a transparent composite is not desired at decision block 106, the contiguous piece of modified wood can be used as an insulating structure or a visible light reflector. Other applications beyond those specifically listed are also possible for the modified wood and transparent wood composite structures fabricated according to the disclosed technology. Indeed, one of ordinary skill in the art will readily appreciate that the modified wood and transparent wood composite structures disclosed herein can be adapted to other applications based on the teachings of the present disclosure.

Although some of blocks 102-110 of method 100 have been described as being performed once, in some embodiments, multiple repetitions of a particular process block may be employed before proceeding to the next decision block or process block. In addition, although blocks 102-110 of method 100 have been separately illustrated and described, in some embodiments, process blocks may be combined and performed together (simultaneously or sequentially). Moreover, although FIG. 1A illustrates a particular order for blocks 102-110, embodiments of the disclosed subject matter are not limited thereto. Indeed, in certain embodiments, the blocks may occur in a different order than illustrated or simultaneously with other blocks.

Figure 1B:
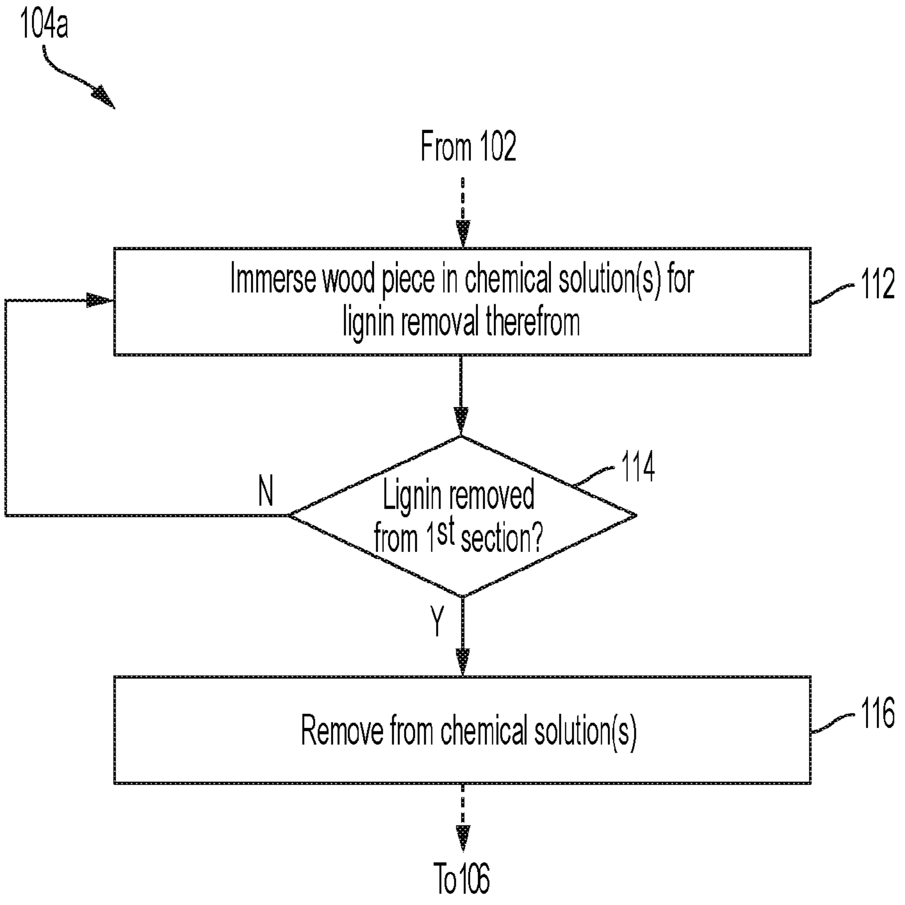
FIGS. 1B-1D are simplified process flow diagrams for alternative sub-routines for forming modified wood or transparent wood composites, according to one or more embodiments of the disclosed subject matter.

FIG. 1B illustrates a first exemplary sub-routine **104*a* that may be used for the chemical-based treatment of process block 104 of the method 100 of FIG. 1A. For example, sub-routine 104*a* can be used to form a naturally-patterned transparent wood composite based on selective delignification of naturally-occurring EW and LW sections in a softwood (e.g., pine, cedar, spruce, larch, or fir). The sub-routine 104*a* can begin at process block 112, where the contiguous piece of natural wood is immersed in one or more chemical solutions to remove lignin from the wood. The physical properties of the EW section (e.g., lower density, larger lumen size, thinner cell walls) as compared to the LW section (e.g., higher density, smaller lumen size, thicker cell walls) leads to the chemical solution more easily penetrating and reacting with the EW section, such that lignin is removed from the EW section more quickly than the LW section. By appropriately timing the chemical treatment of process block 112**, the EW and LW sections can be processed to have different lignin contents. In particular, by terminating the chemical treatment (e.g., by removing the contiguous piece from the solution) once the EW section has been delignified or shortly thereafter, the LW section can retain significant amounts of lignin.

In some embodiments, the chemical treatment of process block 112 can be performed under vacuum, such that the solution associated with the treatment is encouraged to fully penetrate the cell walls and lumina of the contiguous piece of wood. Alternatively, in some embodiments, the chemical treatment of process block 112 can be performed under ambient pressure conditions or elevated pressure conditions (e.g., ~6-8 bar). In some embodiments, the chemical treatment of process block 112 can be performed at any temperature between ambient (e.g., ~23° C.) and an elevated temperature where the chemical solution is boiling (e.g., ~70-160° C.). In some embodiments, the chemical solution is not agitated in order to avoid disruption to the cellulose-based microstructure of the wood. In some embodiments, the chemical solution can include sodium chlorite ($NaClO_2$) alone or in combination with other chemicals (e.g., acetic acid). For example, in some embodiments, the chemical solution comprises a boiling solution of $NaClO_2$.

In some embodiments, the immersion time can be less than 5 hours, for example, 2 hours or less. The amount of time of immersion within the chemical solution may be a function of amount of lignin to be removed, size of the piece, density of the EW section, temperature of the solution, pressure of the treatment, and/or agitation. For example, smaller amounts of lignin removal, smaller piece size, lower density of the EW section, higher solution temperature, higher treatment pressure, and agitation may be associated with shorter immersion times, while larger amounts of lignin removal, larger piece size, higher density of the EW section, lower solution temperature, lower treatment pressure, and no agitation may be associated with longer immersion times.

At decision block 114, it is determined if the treatment of process block 112 should continue. The treatment with the chemical solution can continue (or can be repeated with subsequent solutions) until a desired reduction in lignin content in the EW section is achieved, for example, to achieve a desired light transmittance after infiltration with index-matching polymer at process block 108. In some embodiments, the treatment of process block 112 continues until the lignin content in the EW section has been reduced by at least 90% (e.g., less than 10% of the lignin originally in the EW section is retained), which may correspond to a light transmittance of at least 80% for one or more wavelengths in the visible spectrum (e.g., 600 nm). For example, after the treatment of process block 112, the EW section can have a lignin content less than or equal to 3 wt %, such as less than or equal to 1 wt %. In some embodiments, the treatment of process block 112 can be effective to reduce the lignin content in the LW section by no more than 75% (e.g., greater than 25% of the lignin originally in the LW section is retained), for example, reduced by no more than 65%, or even by no more than 50%, which may correspond to a light transmittance of less than 70% for one or more wavelengths in the visible spectrum (e.g., 600 nm). For example, after the treatment of process block 112, the LW section can have a lignin content greater than or equal to 7.5 wt %, such as greater than or equal to 12.5 wt %.

Once sufficient lignin has been removed from the EW section, the sub-routine 104*a* can proceed from decision block 114 to process block 116, where the contiguous piece of modified wood is removed from the chemical solution in preparation for polymer infiltration at process block 108. In some embodiments, process block 116 can further include an optional rinsing step after the chemical treatment(s), for example, to remove residual chemicals or particulate resulting from the delignification process. For example, the contiguous block of modified wood can be partially or fully immersed in one or more rinsing solutions. The rinsing solution can be a solvent, such as but not limited to, de-ionized (DI) water, alcohol (e.g., ethanol, methanol, isopropanol, etc.), or any combination thereof. For example, the rinsing solution can be formed of water and ethanol. In some embodiments, the rinsing may be repeated multiple times (e.g., at least 3 times) using a fresh mixture rinsing solution for each iteration. In some embodiments, after the rinsing, the contiguous piece can be stored in an alcohol (e.g., ethanol). In some embodiments, after the storing, the contiguous piece can be immersed in another solvent (e.g., toluene) to exchange with the alcohol therein prior to polymer infiltration at process block 108.

Although some of blocks 112-116 of sub-routine 104*a* have been described as being performed once, in some embodiments, multiple repetitions of a particular process block may be employed before proceeding to the next decision block or process block. In addition, although blocks 112-116 of sub-routine 104*a* have been separately illustrated and described, in some embodiments, process blocks may be combined and performed together (simultaneously or sequentially). Moreover, although FIG. 1B illustrates a particular order for blocks 112-116, embodiments of the disclosed subject matter are not limited thereto. Indeed, in certain embodiments, the blocks may occur in a different order than illustrated or simultaneously with other blocks.

Figure 1C:
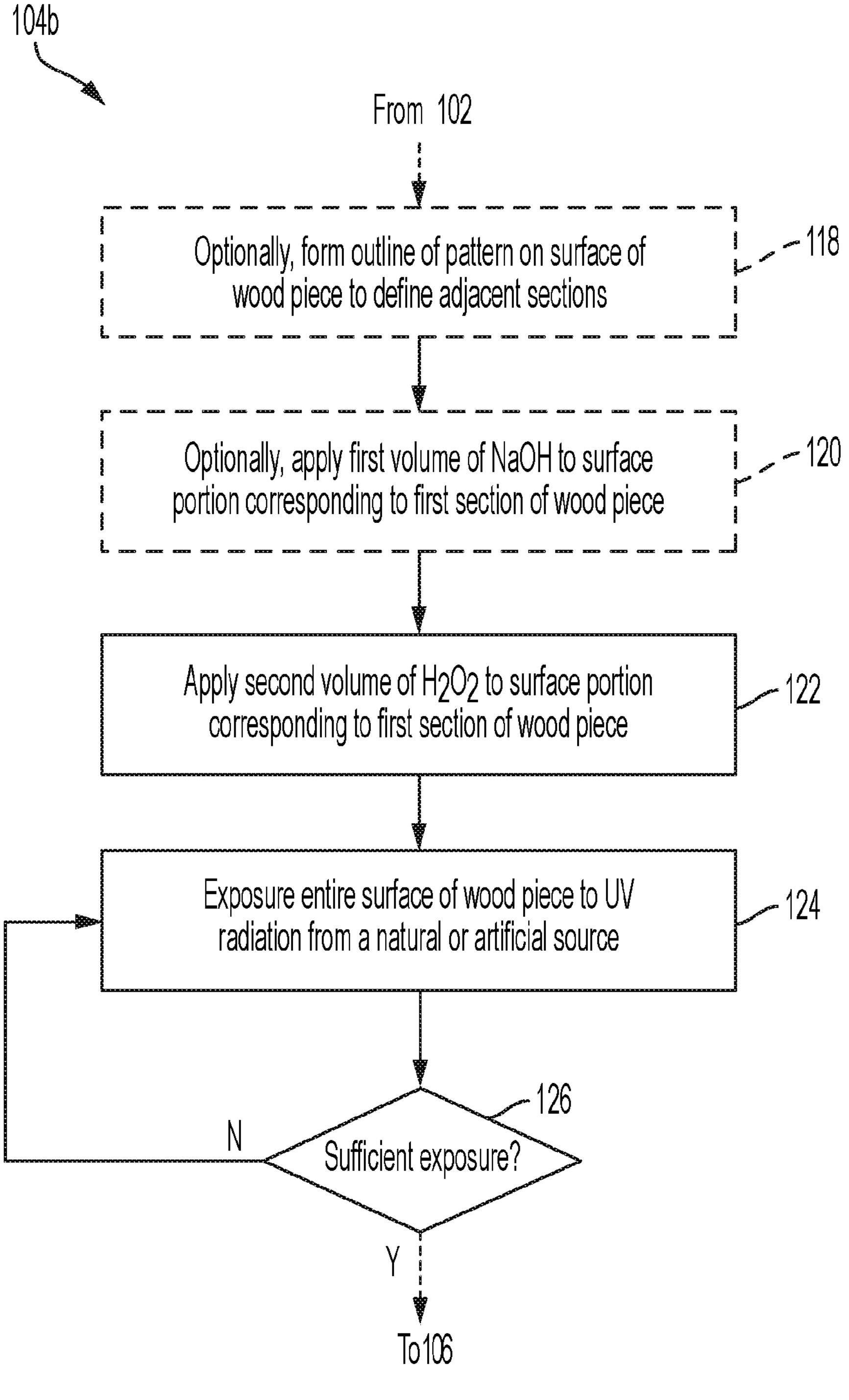

FIG. 1C illustrates a second exemplary sub-routine 104*b* that may be used for the chemical-based treatment of process block 104 of the method 100 of FIG. 1A. For example, sub-routine 104*b* can be used to form a contiguous piece of patterned in situ lignin modified wood or patterned transparent wood composite. The sub-routine 104*b* can begin at optional process block 118, where an outline of a predetermined pattern is formed on an upper exposed surface of the contiguous piece of wood to delineate adjacent first and second sections within the wood. For example, the outline can be formed using a hydrophobic material, such as petroleum jelly. The outline may be effective to prevent the liquid oxidation agent (e.g., hydrogen peroxide) from flowing from the first section to the second section (or vice versa) when subsequently applied to the surface. However, in some embodiments, the outline can be omitted, for example, where the liquid oxidation agent is applied in such a manner as to avoid, or at least reduce, the lateral spread into adjacent sections. In some embodiments, the predetermined pattern can define multiple first sections that are separated from each other by one or more intervening second sections.

The sub-routine 104*b* can proceed to optional process block 120, where a first volume of alkali in solution is applied to the upper exposed surface portion of the contiguous piece corresponding to the first section(s). For example, the alkali can be sodium hydroxide (NaOH), potassium hydroxide (KOH), ammonium hydroxide ($NH_4OH$), calcium hydroxide ($Ca(OH)_2$), or any combination thereof. In some embodiments, the alkali in solution has a concentration of at least 10 wt %. The application can be by brushing, spraying, rolling, printing, or any other controlled surface application technique. In some embodiments, the first volume can be much less than a corresponding volume of the liquid oxidation agent applied in the subsequent process block 122. For example, the first volume can be less than or equal to 20% of the volume of liquid oxidation agent. In some embodiments, the first volume is in a range of 1-3 ml, inclusive. By including a small quantity of alkali, the decomposition of liquid oxidation agent (e.g., $H_2O_2$) can be accelerated without otherwise causing substantial lignin removal from the wood. However, in some embodiments, the application of alkali to the contiguous piece of wood can be omitted.

The sub-routine 104*b* can proceed to process block 122, where a second volume of liquid oxidation agent is applied to the upper exposed surface portion of the contiguous piece corresponding to the first section(s). For example, the liquid oxidation agent can be $H_2O_2$ having a concentration of at least 30 wt %. In some embodiments, the liquid oxidation agent can be applied to the surface portion of the first section(s) without otherwise applying to the surface portion of the second section(s), thereby defining a pattern by virtue of the oxidation agent application. The application can be by brushing, spraying, rolling, printing, or any other controlled surface application technique. In some embodiments, part of the second volume can be applied to the upper exposed surface portion, and the remaining part of the second volume can be simultaneously or subsequently applied to a lower exposed surface portion on an opposite side of the contiguous piece.

In some embodiments, the second volume can be based on a surface area and/or thickness of the wood section to which the liquid oxidation agent is to be applied. For example, when the contiguous piece has a thickness (e.g., in a direction perpendicular to the upper exposed surface) of ~0.6 mm, the applied second volume for the liquid oxidation agent can be at least 800 ml per square meter of surface area. When the contiguous piece has a thickness of ~0.8 mm, the applied second volume for the liquid oxidation agent can be at least 1200 ml per square meter of surface area. When the contiguous piece has a thickness of ~1 mm, the applied second volume for the liquid oxidation agent can be at least 2400 ml per square meter of surface area. Alternatively, the applied second volume for the liquid oxidation agent can be at least 125 ml per 0.1 mm thickness and per square meter of surface area. In some embodiments, the applied second volume for the liquid oxidation agent can be based on the volume of the wood section to which the liquid oxidation agent is to be applied. For example, the second volume can be at least equal to the volume of the wood section, or within a range of 1-5 times, inclusive, of the volume of the wood section. For example, the second volume can be 10-20 ml, inclusive.

The sub-routine 104*b* can proceed to process block 124, where the contiguous block is subjected to UV radiation from a natural light source (e.g., insolation at a UV index of 5 or greater) or artificial light source (e.g., 20 W of UVA band). In some embodiments, the entire upper surface can be exposed to the UV radiation for a time sufficient to in situ modify the lignin in the first section via the photocatalytic oxidation, in particular, to remove chromophores from the lignin. The exposure of process block 124 can continue via decision block 126 until the photocatalytic oxidation reaction in the first section has proceeded to completion, as evidenced by the first section turning completely white in color. In some embodiments, the exposure time may be less than or equal to 2 hours, for example, 1-2 hours.

After the exposure, the contiguous block can retain at least 80% of the lignin originally therein prior to processing (e.g., reduction of the lignin content of no more than 20%) in the now-white first section. Moreover, since the adjacent second section was not subject to photocatalytic oxidation (e.g., due to lack of application of the oxidation agent thereto), substantially all of the lignin originally therein should be retained. Accordingly, the second section may have a higher lignin content than the first section, albeit only slightly. For example, after the treatment of process block 124, both the first and second sections can have a lignin content greater than or equal to 15 wt %.

Although some of blocks 118-126 of sub-routine 104*b* have been described as being performed once, in some embodiments, multiple repetitions of a particular process block may be employed before proceeding to the next decision block or process block. For example, the application of liquid oxidation agent in process block 122 may be effected by multiple fractional applications (e.g., by brushing the same surface area more than once (e.g., 3 to greater than 10 times) to cumulatively apply the desired second volume). In addition, although blocks 118-126 of sub-routine 104*b* have been separately illustrated and described, in some embodiments, process blocks may be combined and performed together (simultaneously or sequentially). For example, the application of first volume of alkali in solution of process block 120 may be combined with the application of second volume of liquid oxidation agent in process block 122. Moreover, although FIG. 1C illustrates a particular order for blocks 118-126, embodiments of the disclosed subject matter are not limited thereto. Indeed, in certain embodiments, the blocks may occur in a different order than illustrated or simultaneously with other blocks.

Figure 1D:
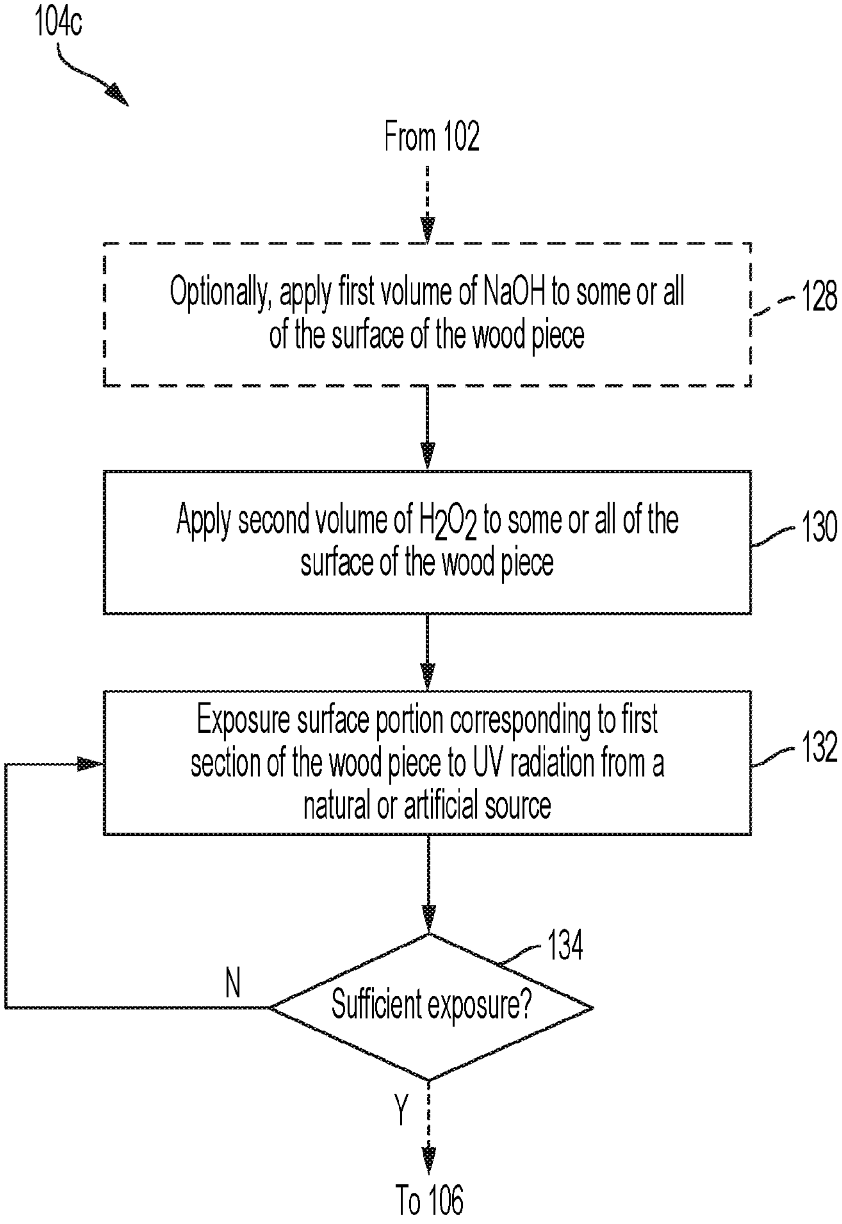

FIG. 1D illustrates a third exemplary sub-routine 104*c* that may be used for the chemical-based treatment of process block 104 of the method 100 of FIG. 1A. For example, sub-routine 104*c* can be used to form a contiguous piece of patterned in situ lignin modified wood or patterned transparent wood composite. The sub-routine 104*c* can begin at optional process block 128, where a first volume of alkali in solution is applied to some or all of the upper exposed surface of the contiguous piece. The details of process block 128 may otherwise be similar to process block 120 described above for sub-routine 104*b*. The sub-routine 104*c* can proceed to process block 130, where a second volume of liquid oxidation agent (e.g., $H_2O_2$) is applied to some or all of the upper exposed surface of the contiguous piece. The details of process block 130 may otherwise be similar to process block 122 described above for sub-routine 104*c*. Alternatively, in some embodiments, the application of process block 130 can be via immersion of the contiguous piece of wood in a bath of the oxidation agent rather than surface application of the oxidation agent. The contiguous piece of wood can be removed from the bath after sufficient infiltration of the oxidation agent and prior to UV exposure in process block 132.

The sub-routine 104*c* can proceed to process block 132, where the contiguous block is subjected to UV radiation from a natural light source or artificial light source. In some embodiments, the UV radiation can be applied to the upper exposed surface portion of the first section(s) without otherwise applying to the upper exposed surface portion of the second section(s), thereby defining a pattern by virtue of the UV exposure. For example, the UV radiation from the light source can be passed through a photomask to screen off the second sections from exposure. Alternatively or additionally, the UV light source can be a UV laser or laser diode (e.g., Nd:YAG laser) configured and controlled to sequentially illuminate the upper exposed surface portions corresponding only to the first section(s). In some embodiments, the UV exposure of the upper surface portions of the first section may continue for a time sufficient to in situ modify the lignin in the first section via the photocatalytic oxidation, in particular, to remove chromophores from the lignin. The exposure of process block 132 can continue via decision block 134 until the photocatalytic oxidation reaction in the first section has proceeded to completion, as evidenced by the first section turning completely white in color. In some embodiments, the exposure time may be less than or equal to 2 hours, for example, 1-2 hours.

After the exposure, the contiguous block can retain at least 70% of the lignin originally therein prior to processing (e.g., reduction of the lignin content of no more than 30%) in the now-white first section. Moreover, since the adjacent second section was not subject to photocatalytic oxidation (e.g., due to the lack of UV radiation thereon), substantially all of the lignin originally therein should be retained. Accordingly, the second section may have a higher lignin content than the first section, albeit only slightly. For example, after the treatment of process block 132, both the first and second sections can have a lignin content greater than or equal to 15 wt %.

Although some of blocks 128-134 of sub-routine 104*c* have been described as being performed once, in some embodiments, multiple repetitions of a particular process block may be employed before proceeding to the next decision block or process block. For example, the application of liquid oxidation agent in process block 130 may be effected by multiple fractional applications (e.g., by brushing the same surface area more than once (e.g., 3 to greater than 10 times) to cumulatively apply the desired second volume). In addition, although blocks 128-134 of sub-routine 104*c* have been separately illustrated and described, in some embodiments, process blocks may be combined and performed together (simultaneously or sequentially). For example, the application of first volume of alkali in solution of process block 128 may be combined with the application of second volume of liquid oxidation agent in process block 130. Moreover, although FIG. 1D illustrates a particular order for blocks 128-132, embodiments of the disclosed subject matter are not limited thereto. Indeed, in certain embodiments, the blocks may occur in a different order than illustrated or simultaneously with other blocks.

Naturally-Patterned Transparent Wood Composite Examples

Figure 2A:
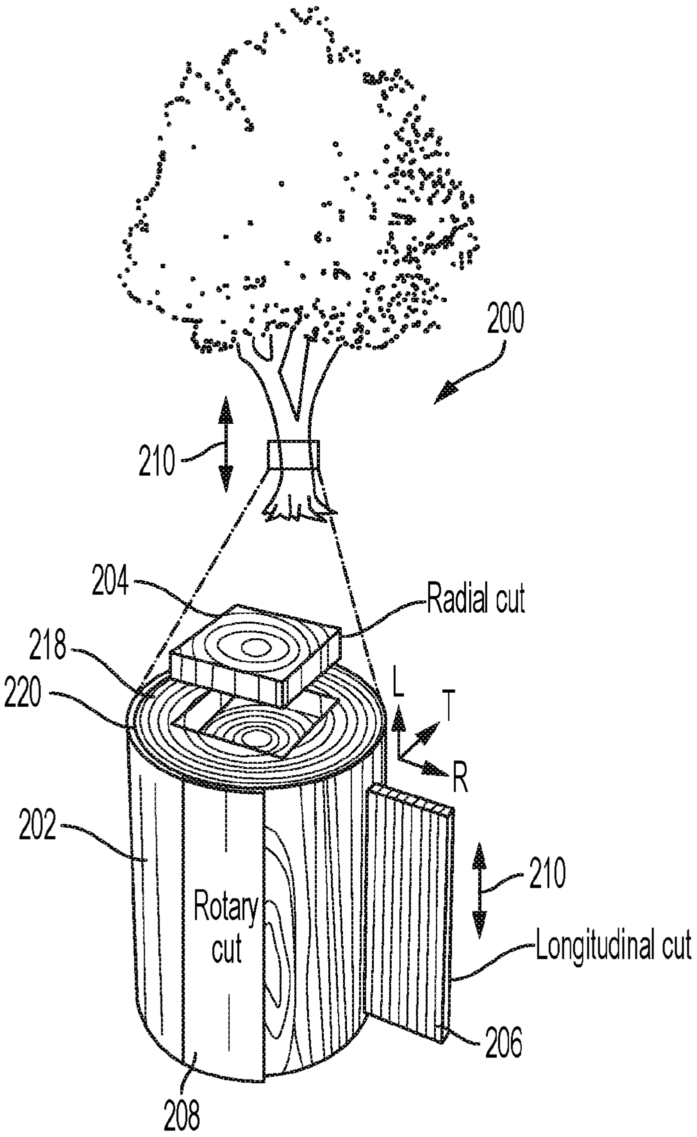
FIG. 2A illustrates radial, longitudinal, and rotary cut pieces of natural wood that may be used to form a modified wood or transparent wood composite, according to one or more embodiments of the disclosed subject matter.
Figure 2B:
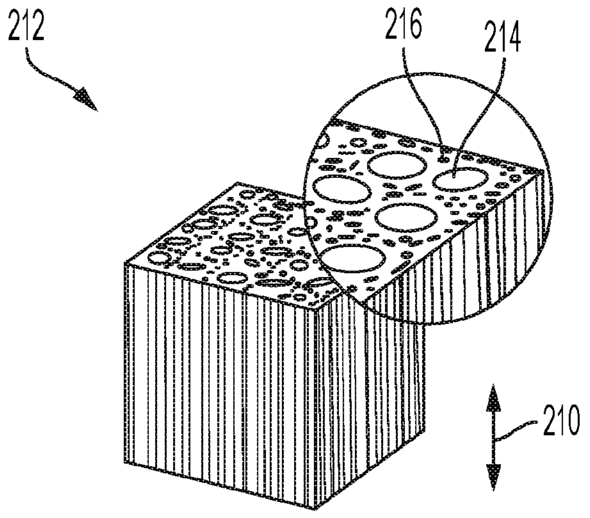
FIG. 2B is a simplified cross-sectional view illustrating the microstructure of the natural wood including cellulose-based longitudinal cells.

Walls of cells in the natural wood are primarily composed of cellulose (40 wt %~50 wt %), hemicellulose (20 wt %~30 wt %), and lignin (20 wt %~30 wt % for hardwoods and 25 wt %~35 wt % for softwoods), with the three components intertwining with each other to form a strong and rigid wall structure. Natural hardwood has a unique three-dimensional porous structure with multiple channels or lumina formed by longitudinal cells, including vessels 214 (e.g., having a maximum cross-sectional dimension, or diameter, in a plane perpendicular to a length thereof of 40-80 μm, inclusive) and fibers 216 (e.g., having a maximum cross-sectional dimension, or diameter, in a plane perpendicular to a length thereof of 10-30 μm, inclusive) extending in a direction of wood growth 210, as illustrated by the exemplary section 212 in FIG. 2B. In contrast to hardwoods, softwoods rely on medullary rays and tracheids 215 extending along the wood growth direction 210 to transport water. The tracheids can have a maximum cross-sectional dimension, or diameter, can vary depending on the location of the tracheid within the wood cross-section.

Figure 2C:
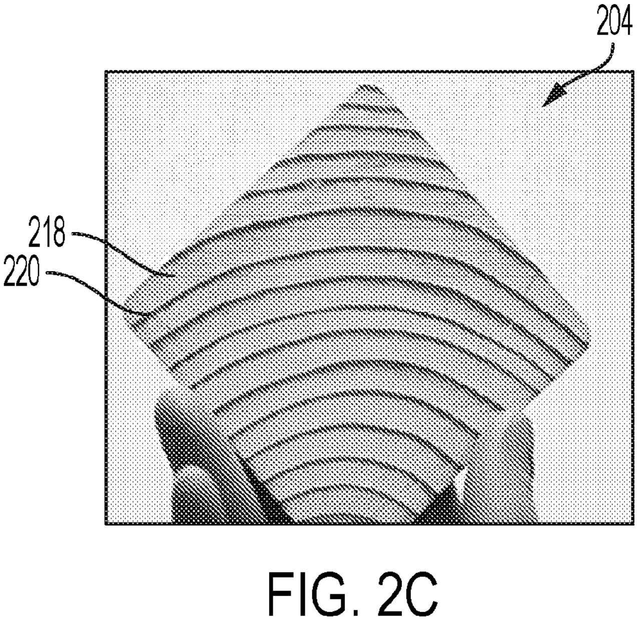
FIG. 2C is a photo of a contiguous piece of natural wood with different sections prior to processing.
Figure 2D:
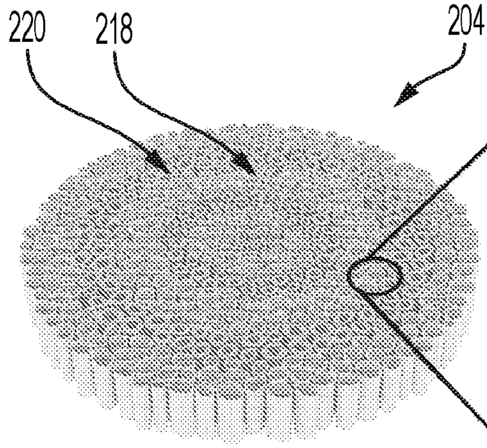
FIG. 2D is a simplified schematic diagram illustrating the different early-wood and late-wood sections in natural wood.

Softwoods are wood from gymnosperm trees such as pine (e.g., Eastern white pine, Lodgepole pine, Parana pine, Scots pine, Southern yellow pine, etc.), cedar (e.g., red cedar, etc.), spruce (e.g., European spruce, Sitka spruce, etc.), larch, and fir (e.g., Douglas fir). Natural softwood presents an intrinsic aesthetic pattern of annual growth rings with alternating structures at macroscopic and microscopic scales. From the macro perspective, the rings result from the alternating formation of EW 218 in spring and LW 220 in summer, as shown in FIGS. 2C-2D. Each EW region 218 is generally wider, weaker, more porous, and lighter in color than each LW region 220. With respect to microstructure, cells within the EW region 218 have a relatively larger lumen 215*a* diameter and thinner cell walls as compared to the lumen 215*b* in LW region 220, as shown in FIG. 2E.

The piece of natural wood can be cut in any direction with respect to its longitudinal growth direction 210. Since the tracheids are naturally aligned with the growth direction, the cut direction will dictate the orientation of the cell lumina in the final structure, which orientation can affect the optical or mechanical properties of the final transparent wood composite. For example, in some embodiments, a piece of natural wood can be cut from a trunk 202 of tree 200 in a vertical or longitudinal direction (e.g., parallel to longitudinal wood growth direction 210) such that lumina of longitudinal cells are oriented substantially parallel to a major face (e.g., largest surface area) of the longitudinal-cut wood piece 206. Alternatively, in some embodiments, the piece of natural wood can be cut in a horizontal or radial direction (e.g., perpendicular to longitudinal wood growth direction 210, also referred to as a transverse cut) such that lumina of longitudinal cells are oriented substantially perpendicular to the major face of the radial-cut wood piece 204. Alternatively, in some embodiments, the piece of natural wood can be cut in a rotation direction (e.g., perpendicular to the longitudinal wood growth direction 210 and along a circumferential direction of the trunk 202) such that lumina of longitudinal cells are oriented substantially parallel to the major face of the rotary-cut wood piece 208. In some embodiments, the piece of natural wood can be cut at any other orientation between longitudinal, radial, and rotary cuts. For any of the cut directions, a thickness of the piece of natural wood can be measured in a direction perpendicular to the major face and may be 10 mm or less.

Figure 2E:
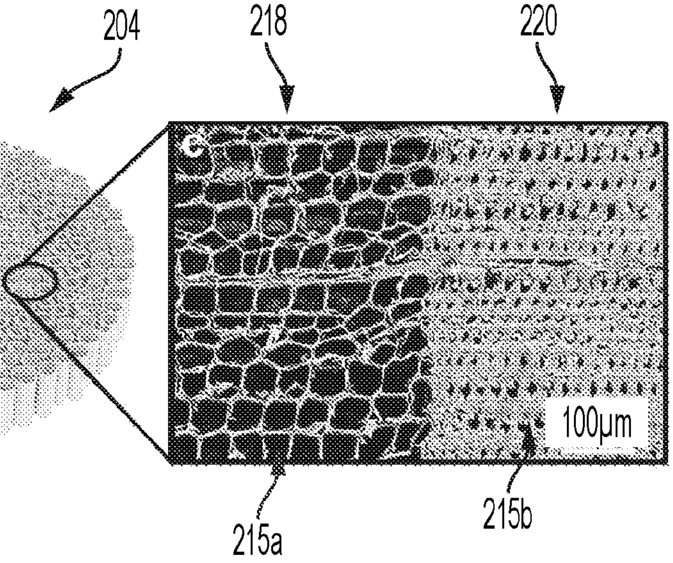
FIG. 2E are scanning electron microscopy (SEM) images of a cross-section, in a direction perpendicular to the longitudinal wood growth direction, of early-wood and late-wood sections in natural wood.
Figures 3A, 3B:
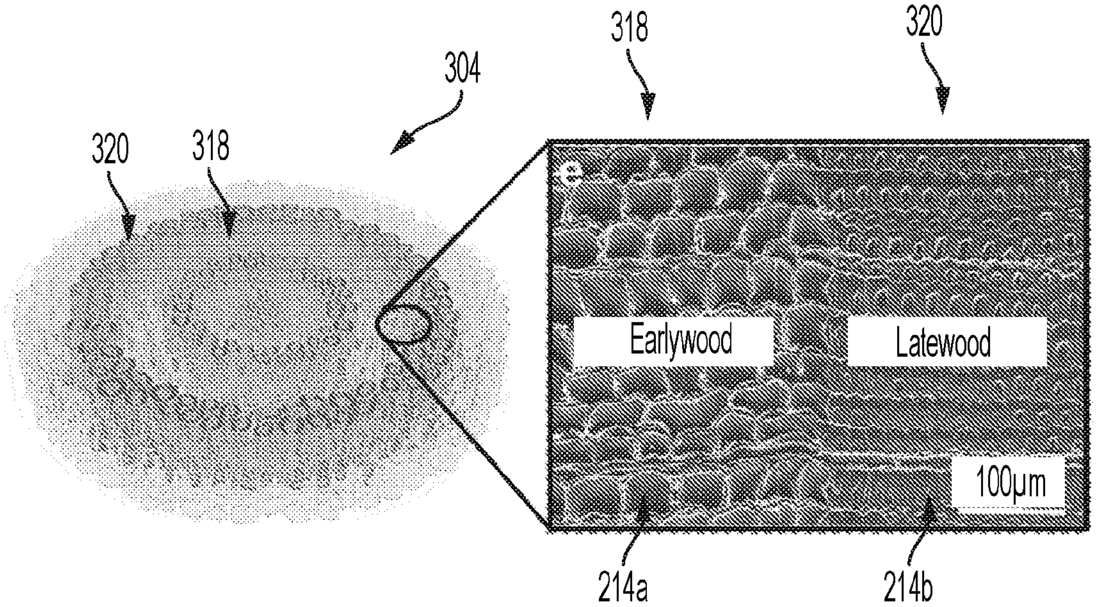
FIG. 3A is a simplified schematic diagram illustrating the different early-wood and late-wood sections in a contiguous piece of wood composite after chemical delignification and polymer infiltration, according to one or more embodiments of the disclosed subject matter.
FIG. 3B is an SEM image of a cross-section, in a direction perpendicular to the longitudinal wood growth direction, of early-wood and late-wood sections in the transparent wood composite after chemical delignification and polymer infiltration.
Figure 3C:
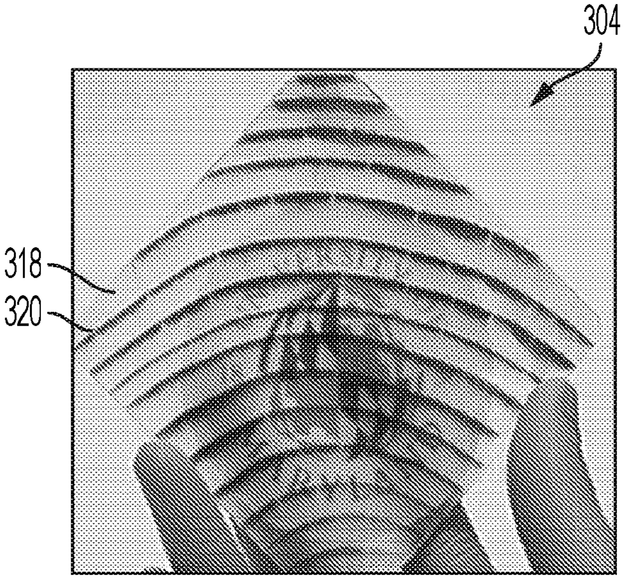
FIG. 3C is a photo of a contiguous piece of naturally-patterned, transparent wood composite after processing.

Using the naturally-occurring patterns of alternating EW 218 and LW 220 regions illustrated in FIGS. 2C-2E, a transparent wood composite can be formed that inherits the naturally-occurring patterns and also possesses favorable optical and mechanical properties. For example, the softwood can be subject to spatially selective delignification and subsequent polymer infiltration, for example, as described above with respect to FIGS. 1A-1B. After spatially selective delignification, the EW region 218 can become almost completely white due to the light scattering and the removal of light absorbers (e.g., lignin and some extractives) while the LW region 220 preserves partial lignin. Subsequently infiltration using the refractive index-matched polymer resulted in a contiguous piece 304 with adjacent sections having different optical properties, in particular, section 318 based on the original EW region 218 that is substantially transparent (e.g., transmittance of at least 80% for light having a wavelength of 600 nm) and section 320 based on the original LW region 220 that is substantially translucent or opaque (e.g., transmittance less than 70% for light having a wavelength of 600 nm), as shown in FIGS. 3A-3C. In addition, to the different optical transmittance values (based on delignification of the EW region 218 versus only partial removal of lignin of the LW region 220), the retention of lignin within the LW region 220 can imbue the naturally patterned transparent wood composite with enhanced mechanical strength and favorable UV absorption characteristics.

Figure 4A:
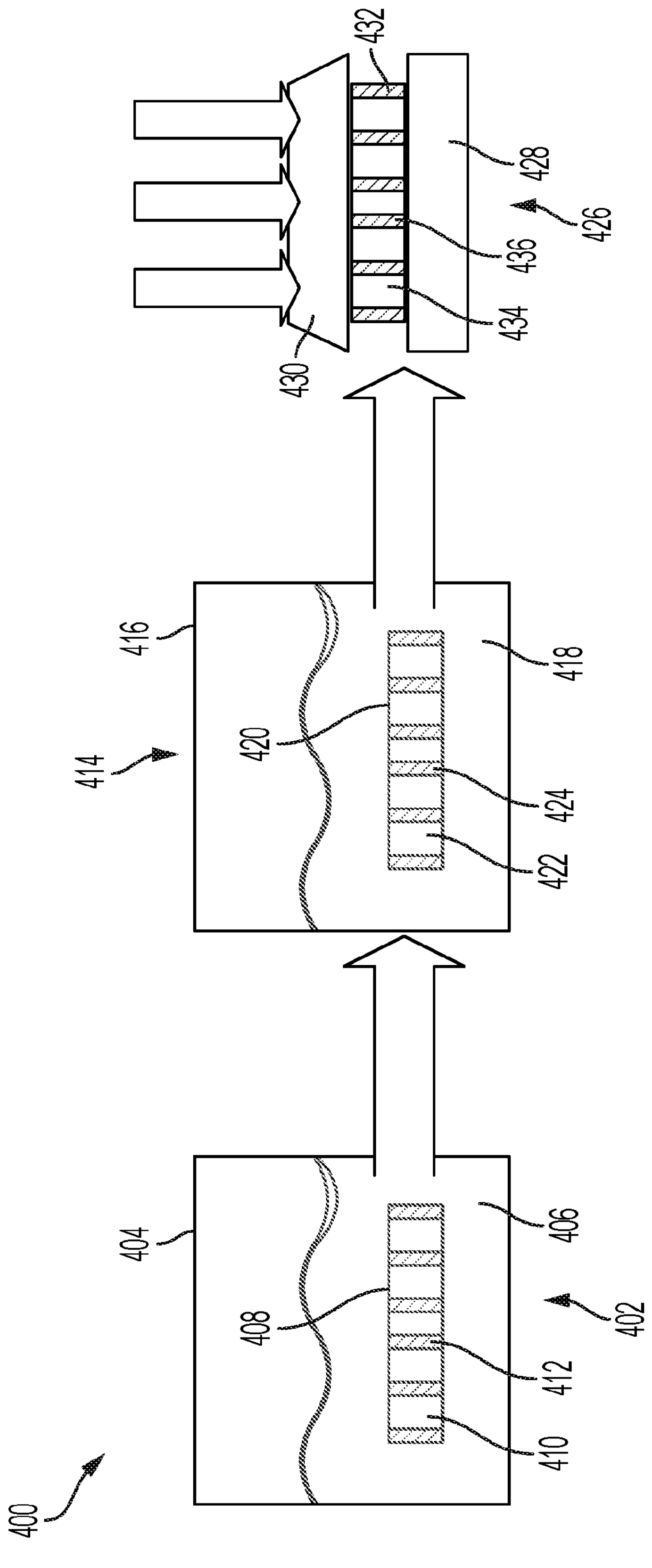
FIGS. 4A-4B show an exemplary batch fabrication setup and an exemplary continuous or semi-continuous fabrication setup, respectively, for forming a naturally-patterned, transparent wood composite, according to one or more embodiments of the disclosed subject matter.

In some embodiments, the naturally patterned transparent wood composite can be fabricated using a batch fabrication process. For example, FIG. 4A illustrates an exemplary fabrication setup 400 employing batch operation. At a first stage 402, the contiguous piece 408 of softwood with well-defined EW 410 and LW 412 sections can be immersed in a delignifying solution 406 (e.g., $NaClO_2$) within fluid chamber 404 for a predetermined period of time or until EW sections 410 turn white in color. The resulting modified contiguous piece 420 includes substantially delignified EW sections 422 alternating with non-white lignin-retaining LW sections 424. In a subsequent second stage 414, the modified contiguous piece 420 is immersed in liquid polymer or polymer precursors 418 in chamber 416 (e.g., a vacuum chamber) to allow infiltration into the cellulose-based microstructure of the modified EW 422 and LW 424 sections, thereby forming the transparent wood composite 432 with fully transparent sections 434 alternating with translucent or opaque sections 436.

In some embodiments, the contiguous piece is removed from the fluid chamber 404 of the first stage 402 and inserted into the chamber 416 of the second stage 414. Alternatively, in some embodiments, the fluid chamber 404 and the chamber 416 are the same, and the transition from the first stage 402 to the second stage 414 is effected by replacing the delignifying solution 406 with the liquid polymer or precursors 418. Although not specifically discussed above, it should be appreciated that batch fabrication setup 400 can further include one or more rinsing stages (not shown).

In some embodiments, the batch fabrication setup can optionally include a drying or polymerization stage 426 that employs a pressing setup (e.g., a hydraulic press). For example, the pressing setup can have a top platen 430 and a bottom platen 428, with one or both platens capable of moving toward the other to apply pressure to the wood composite 432 held therebetween. For example, the pressing setup can apply nominal pressure to maintain a thickness and/or the planarity of upper and lower surfaces of the composite 432 as the polymer therein hardens. In some embodiments, the pressing stage 426 can include heating of the composite 432 while being pressed, for example, by heating of one or both platens 428, 430.

Figure 4B:
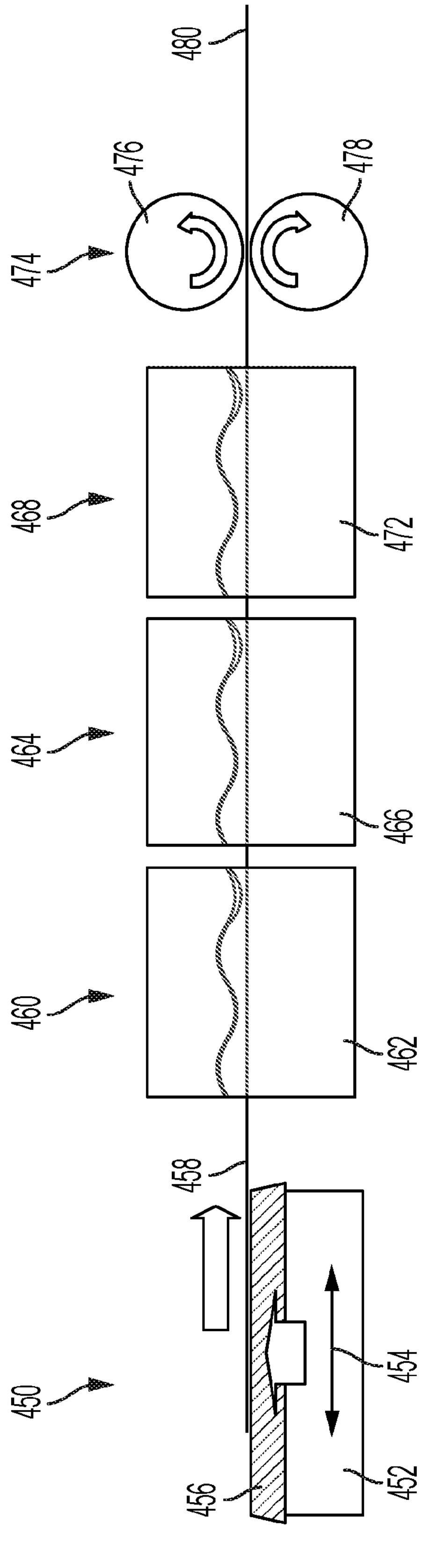
Figure 4C:
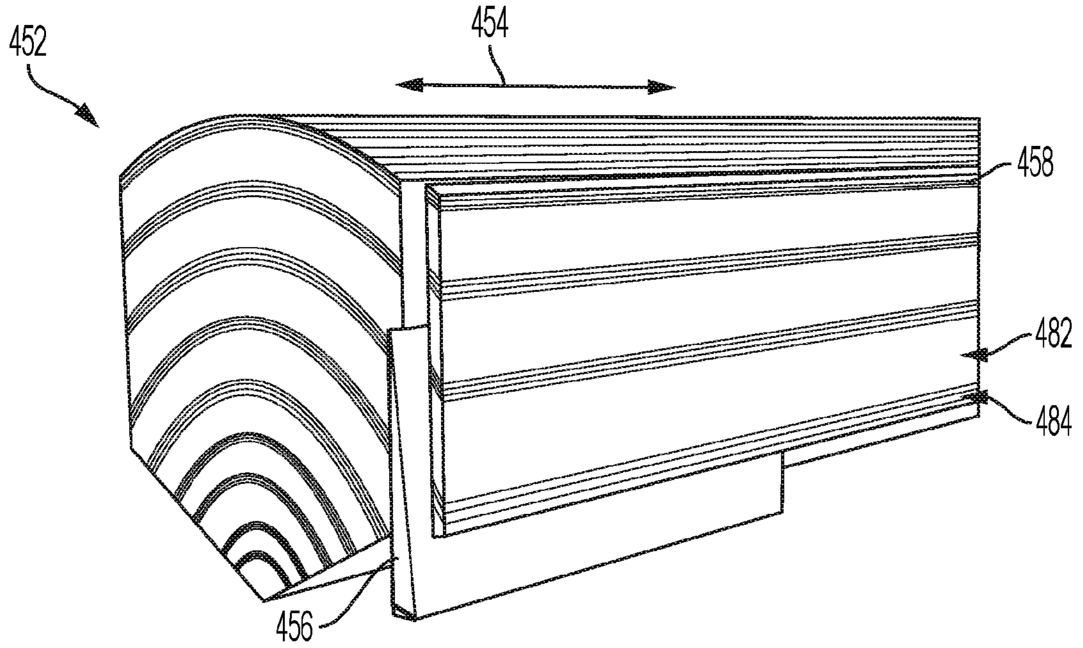
FIG. 4C is a perspective view of an exemplary quarter slice cutting arrangement that can be employed in the fabrication setups, according to one or more embodiments of the disclosed subject matter.

In some embodiments, the naturally patterned transparent wood composite can be fabricated using a semi-continuous fabrication process. For example, FIG. 4B illustrates an exemplary fabrication setup 450 employing semi-continuous operation. Natural softwood 452 may be in the form of a log or cylindrical bar, with lumina extending along direction 454. The natural wood 452 can be repeatedly cut by a longitudinal blade 456, for example, using the quarter cutting approach of FIG. 4C to generate long slices 458 having both EW 482 and LW 484 regions. The sliced layer 458 can be conveyed to delignification station 460 for the next step in the fabrication process, e.g., immersing the wood 458 within a chemical solution 462, for example, as described above with respect to process block 112 of sub-routine 104*a*, to delignify the EW sections but only partially remove lignin from the LW sections. In some embodiments, the size of the station 460 and the speed of conveyance of the wood layer 458 through the station 460 may correspond to the desired immersion time for the chemical treatment. Thus, a time from when a portion of the layer 458 enters station 460 to when it leaves for rinsing station 464 would correspond to the immersion time for the desired amount of lignin removal from the EW sections.

After delignification station 460, the modified sliced layer 458 can continue to be conveyed to the next sequential station, e.g., rinsing station 464. Rinsing station may contain one or more solvents 466 (e.g., water, alcohol, etc.), and optionally one or more agitators, designed to remove any remnants of the delignifying chemicals 462 within the modified layer. Although only a single rinsing station is illustrated in FIG. 4B, multiple stations can be provided, for example, to allow for solvent exchange prior to polymer infiltration.

After rinsing station 464, the modified sliced layer 458 can continue to be conveyed to the next sequential station, e.g., polymer station 468, which includes liquid polymer or polymer precursors 472 within a chamber (e.g., a vacuum chamber). Infiltration into the cellulose-based microstructure of the modified EW and LW sections forms the transparent wood composite 480 with fully transparent sections alternating with translucent or opaque sections.

In some embodiments, fabrication setup 450 can optionally include a drying or polymerization station 474 that employs complementary rollers 476, 478. In some embodiments, the upper roller 476 and lower roller 478 remain at a fixed distance from each other that substantially equal to or slightly less than a thickness of composite wood 480, thereby applying a nominal pressing force that discourages warping during drying or polymerization. In some embodiments, one or both rollers 476, 478 can be heated so as to raise a temperature of the composite 480 above room temperature, for example, to encourage solidification or polymerization of the polymer. Alternatively or additionally, the rollers 476, 478 may be unheated, but a separate heating mechanism may be provided, or an environment containing or following the station 474 may be heated.

In Situ Lignin Modification Examples

Figure 5A:
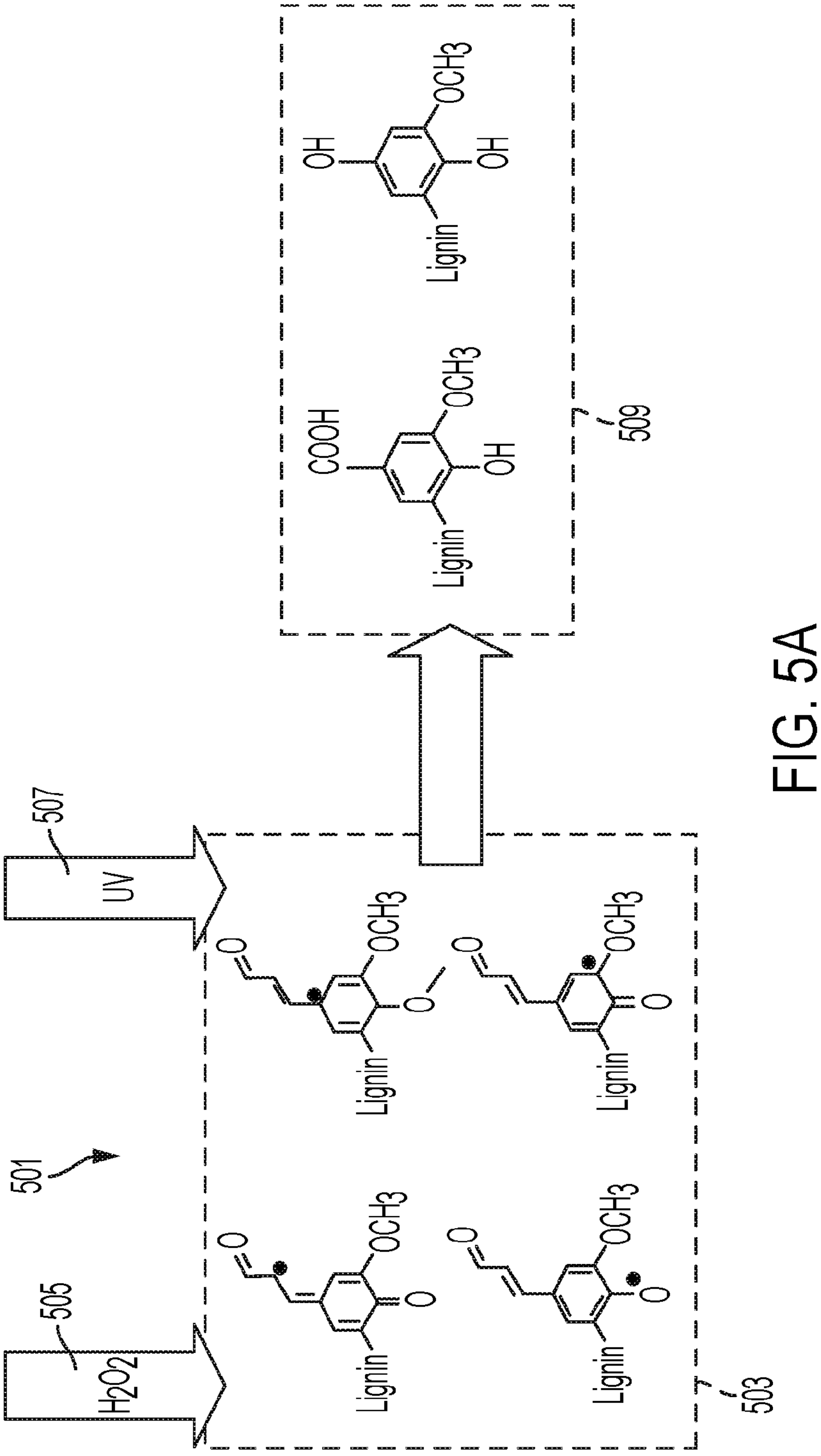
FIG. 5A is a schematic diagram illustrating the photocatalytic chemical oxidation and resulting in situ structural changes of lignin within wood, according to one or more embodiments of the disclosed subject matter.

In situ modification of lignin in hardwood or softwood is accomplished by a photocatalytic oxidation mechanism resulting from simultaneous exposure 501 of the naturally-occurring forms 503 of lignin to both an oxidation agent 505 (e.g., hydrogen peroxide) and UV-radiation 507, as shown in FIG. 5A. Without being bound by any particular theory, UV light 507 serves as a photocatalyst that triggers the formation of chromophoric radicals (Lig·) from lignin by cleaving the conjugated double bond, as well as accelerating the decomposition of $H_2O_2$ into oxygen/peroxy radicals (O·/HOO·). The photo-excited Lig· and O·/HOO· then participate in the photocatalytic oxidation reaction to form the non-conjugated carboxyl group 509, leading to the material's decoloration and formation of modified wood. In addition, a minor reaction may take place in which a very small quantity of the aromatic ring structures in lignin undergo ring opening reactions to form small molecules that are soluble in $H_2O_2$, which may contribute to a slight reduction in lignin content (e.g., no more than 20% reduction) of the wood after treatment. Since the reaction requires both UV light 507 and oxidation agent 505, patterning of the wood can be achieved by applying both to sections in which modification is desired and applying UV or oxidation agent, but not both, to sections in which modification is not desired. In some embodiments, the in situ lignin modified wood is used on it own without further processing. Alternatively, in some embodiments, the modified wood is further processed by infiltrating with polymer to form a transparent wood composite.

Figure 5B:
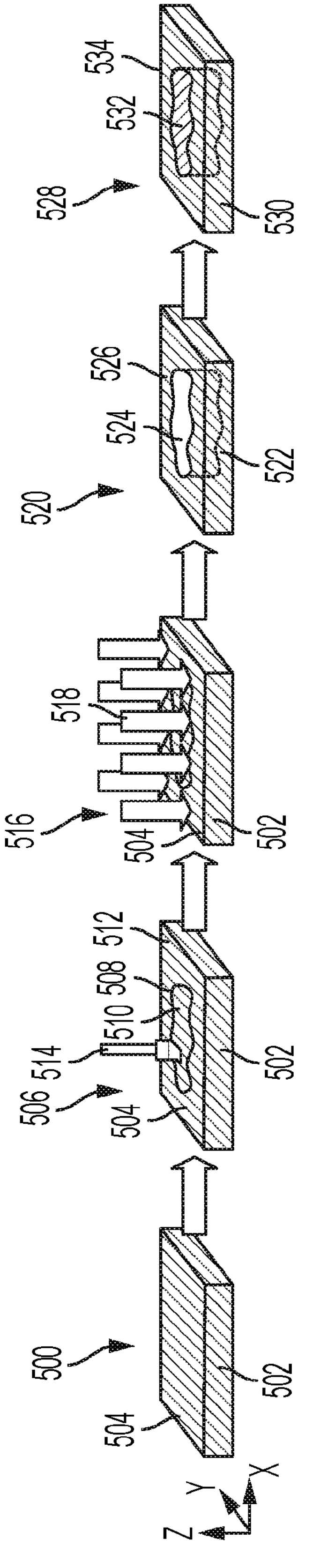
FIG. 5B shows an exemplary batch fabrication for forming a modified wood or transparent wood composite by patterned application of a chemical oxidation agent (e.g., hydrogen peroxide), according to one or more embodiments of the disclosed subject matter.

In some embodiments, a patterned transparent wood composite can be fabricated using a batch fabrication process. For example, FIG. 5B illustrates an exemplary batch fabrication operation. At an initial stage 500, a contiguous piece of wood 502 of any cut (e.g., R-cut, L-cut, T-cut, etc.) and any wood type (e.g., softwood or hardwood) is provided. The contiguous piece 502 can have an upper surface 504 to which an oxidation agent is applied in a second stage 506. In some embodiments, a predetermined pattern outline 508 is first formed on the upper surface 504 to delineate a first section 510 from a second section 512. For example, the pattern outline 508 can be formed using a hydrophobic material, such as petroleum jelly. Alternatively, in some embodiments, no physical outline 508 is provided. Instead, the physical application of oxidation agent (and optionally alkali prior to or concurrent with the oxidation agent) to particular portions of the upper surface 504 can define the predetermined pattern 508. For example, a brush 514 can be used to paint, coat, print, or otherwise apply a controlled volume of oxidation agent to the first section 510 without otherwise applying the oxidation agent to second section 512. Other mechanisms of applying a controlled volume to a surface are also possible according to one or more contemplated embodiments.

At a third stage 516, the entire upper surface 504 can be exposed to UV radiation 518 from a natural or artificial light source. Alternatively, in some embodiments, only the first section 510 may be exposed to UV radiation 518 (e.g., in a manner similar to UV exposure stage 540 in FIG. 5C). In either case, the combination of oxidation agent and UV radiation in the first section, but not in the second section 512, causes photocatalytic oxidation to occur only in the first section 510. The resulting modified wood 522 (e.g., photonic wood) at stage 520 has a first section 524, which is in situ lignin-modified and thus substantially white in color, and a second section 526, which retains its natural lignin and thus is substantially non-white in color (e.g., natural wood color). In some embodiments, the modified wood 522 at stage 520 can be used as is, for example, as insulation or optically reflecting material.

Alternatively, in some embodiments, the modified wood 522 is subject to further processing at final stage 528, for example, to infiltrate the wood 522 with an index-matching polymer to form a patterned transparent wood composite 530 with a transparent first section 532 and an adjacent translucent or opaque second section 534. For example, polymer can be infiltrated into the microstructure of the modified wood 522 by immersing it in a liquid polymer or polymer precursors and applying a vacuum for a period of time, for example, as discussed above with respect to FIG. 1A.

Figure 5C:
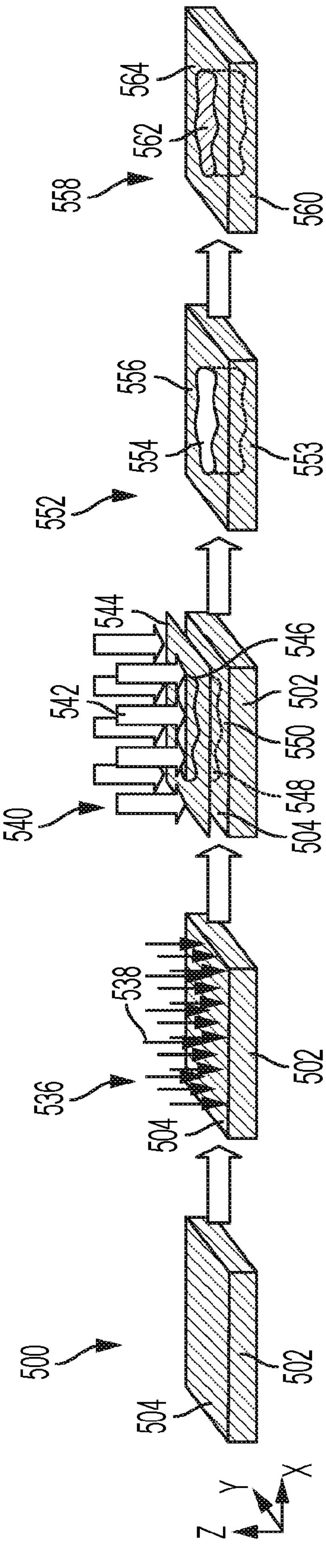
FIG. 5C shows an exemplary batch fabrication for forming a modified wood or transparent wood composite by patterned exposure to ultraviolet radiation, according to one or more embodiments of the disclosed subject matter.

FIG. 5C illustrates another exemplary batch operation for fabricating a patterned transparent wood composite. At a second stage 536, an oxidation agent 538 can be applied to the entire upper surface 504 of the contiguous piece of wood 502. In some embodiments, a brush or other mechanism can be used to apply a controlled volume of oxidation agent to the entire upper surface 504, for example, in a manner similar to that described above with respect to second stage 506 in FIG. 5B. Alternatively, the application of oxidation agent can be by immersing the surface 504 or the entire contiguous piece 502 in a bath of the oxidation agent. At a third stage 540, only a portion of the upper surface 504 corresponding to the predetermined pattern is exposed to UV radiation. For example, a uniform UV radiation field 542 may be incident on a photomask 544 that has an open or transparent region 546 allowing light to pass through to expose the upper surface of the first section 548 while otherwise blocking light from exposing the upper surface of the second section 550.

The combination of oxidation agent and UV radiation in the first section 548, but not in the second section 550, causes photocatalytic oxidation to occur only in the first section 548. The resulting modified wood 553 (e.g., photonic wood) at stage 552 has a first section 554, which is in situ lignin-modified and thus substantially white in color, and a second section 556, which retains its natural lignin and thus is substantially non-white in color (e.g., natural wood color). In some embodiments, the modified wood 553 at stage 552 can be used as is, for example, as insulation or optically reflecting material.

Alternatively, in some embodiments, the modified wood 553 is subject to further processing at final stage 558, for example, to infiltrate the wood 553 with an index-matching polymer to form a patterned transparent wood composite 560 with a transparent first section 562 and an adjacent translucent or opaque second section 564. For example, polymer can be infiltrated into the microstructure of the modified wood 553 by immersing it in a liquid polymer or polymer precursors and applying a vacuum for a period of time, for example, as discussed above with respect to FIG. 1A.

Figure 5D:
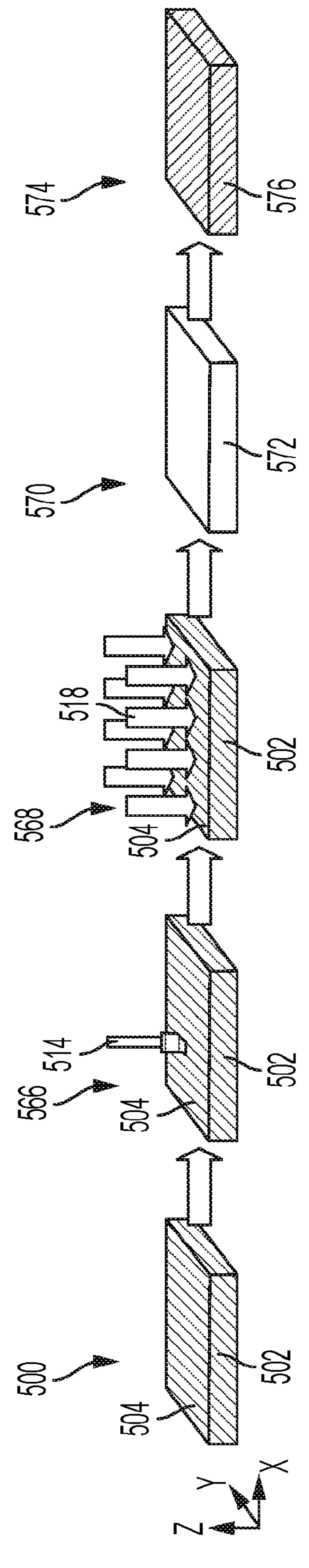
FIG. 5D shows an exemplary batch fabrication for forming a modified wood or transparent wood composite without any patterning, according to one or more embodiments of the disclosed subject matter.

FIG. 5D illustrates an exemplary batch operation for fabricating a transparent wood composite. At a second stage 566, an oxidation agent can be applied to the entire upper surface 504 of the contiguous piece of wood 502, for example, in a manner similar to second stage 536 in FIG. 5C, and/or using a brush 514 or other mechanism controlled volume application of oxidation agent, for example, in a manner similar to that described above with respect to second stage 506 in FIG. 5B. Alternatively, the application of oxidation agent can be by immersing the surface 504 or the entire contiguous piece 502 in a bath of the oxidation agent. At a third stage 568, the entire upper surface 504 can be exposed to UV radiation 518 from a natural or artificial light source. The combination of oxidation agent and UV radiation in the entire contiguous piece 502 causes photocatalytic oxidation to occur everywhere (e.g., without any patterning). The resulting modified wood 572 (e.g., photonic wood) at stage 570 has been in situ lignin-modified throughout and thus substantially white in color. In some embodiments, the modified wood 572 at stage 570 can be used as is, for example, as insulation or optically reflecting material. Alternatively, in some embodiments, the modified wood 572 is subject to further processing at final stage 574, for example, to infiltrate the wood 572 with an index-matching polymer to form a transparent wood composite 576. For example, polymer can be infiltrated into the microstructure of the modified wood 572 by immersing it in a liquid polymer or polymer precursors and applying a vacuum for a period of time, for example, as discussed above with respect to FIG. 1A.

Figure 6:
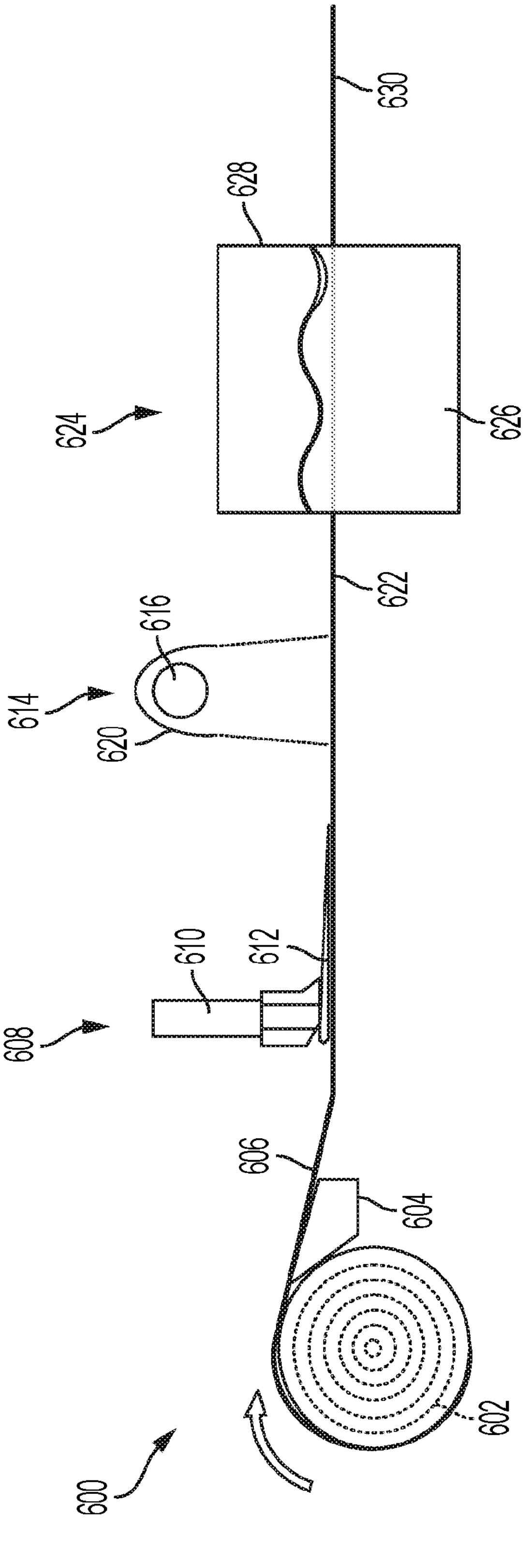
FIG. 6 shows an exemplary continuous or semi-continuous fabrication setup for forming a modified wood or transparent wood composite, according to one or more embodiments of the disclosed subject matter.

In some embodiments, transparent wood composite (whether patterned or unpatterned) can be fabricated using a semi-continuous or continuous fabrication process. For example, FIG. 6 illustrates an exemplary fabrication setup 600 employing continuous operation. Natural wood 602 may be in the form of a log or cylindrical bar, with lumina extending in a direction perpendicular to the page. The natural wood 602 can be continuously cut by a rotary lathe 604, for example, to separate a thin continuous layer 606 of natural wood for subsequent processing. The natural wood layer 606 can be conveyed to station 608 for the next step in the fabrication process, e.g., surface application of a controlled amount of a liquid oxidation agent 612, for example, using a brush 610 or other mechanism.

After station 608, the wood layer 606 can be conveyed to the next sequential station e.g., UV exposure station 614. UV exposure station 614 can include an artificial light source 616 and one or more optical elements 620 (e.g., reflector) designed to illuminate the wood with a substantially uniform light beam 618. Alternatively, in some embodiments, UV exposure station 614 takes advantage of natural insolation rather than using an artificial light source. As with the above described examples, the combination of UV exposure and oxidation agent within the wood results in photocatalytic oxidation that in situ modifies the lignin in the wood, in particular, by removing chromophores thereof without substantially decreasing lignin content. In some embodiments, the size of the station 614 and the speed of conveyance of the wood layer 606 through the station 614 may correspond to the desired UV exposure time (e.g., 1-2 hours). Thus, a time from when a portion of the layer 606 enters station 614 to when it leaves for polymer infiltration station 624 would correspond to exposure time for the in situ lignin modification.

In some embodiments, the modified wood 622 resulting from station 614 can be used without further processing. Alternatively, in some embodiments, the modified wood 622 is further conveyed to the next sequential station, e.g., polymer station 624, which includes liquid polymer or polymer precursors 626 within a chamber 628 (e.g., a vacuum chamber). Infiltration into the cellulose-based microstructure of the modified wood 622 forms the transparent wood composite 630.

FABRICATED EXAMPLES AND EXPERIMENTAL RESULTS

First Example—Naturally-Patterned Transparent Wood Composite

Figure 7A:
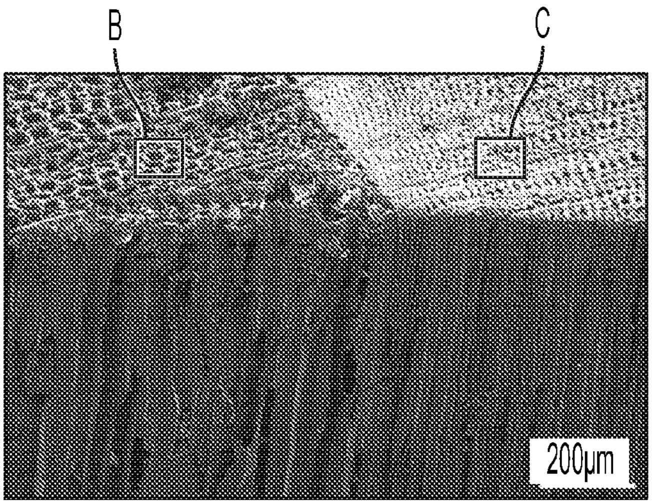
FIG. 7A is an SEM image of the cellulose-based microstructure of Douglas fir at the boundary between earlywood and latewood sections.

Naturally-patterned transparent wood composites (also referred to as aesthetic wood) were fabricated based on two different cuts of wood, in particular, a radial (R) cut where the aligned channels of the cellulose-based microstructure extend in a direction perpendicular to a primary surface (e.g., a surface exposed to incident light to be transmitted) and a longitudinal (L) cut where the aligned channels of the cellulose-based microstructure extend in a direction parallel to the primary surface. Douglas fir was chosen in view of its a pronounced contrast of both color and density between earlywood (EW) and latewood (LW) sections. As shown in FIG. 7A, the cellulose-based microstructure of Douglas fir exhibits a distinct boundary between EW and LW sections.

Figure 7B:
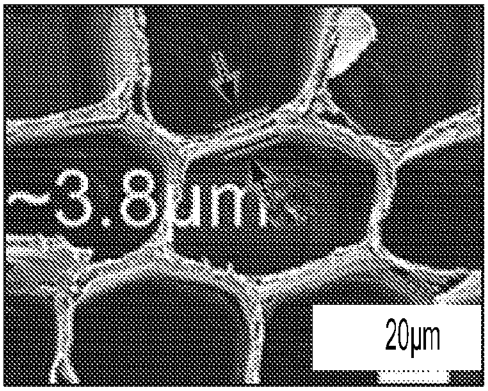
FIGS. 7B-7C are magnified SEM image of earlywood and latewood sections, respectively, in the natural Douglas fir of FIG. 7A.
Figure 7C:
Figure 7D:
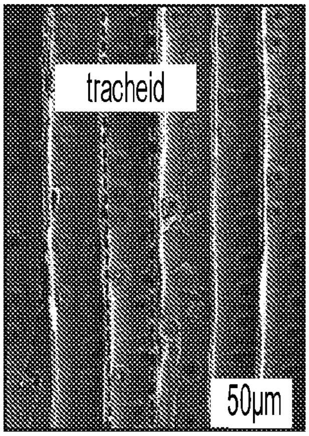
FIG. 7D is an SEM of a longitudinal cross-section of tracheids of the Douglas fir of FIG. 7A.
Figure 7F:
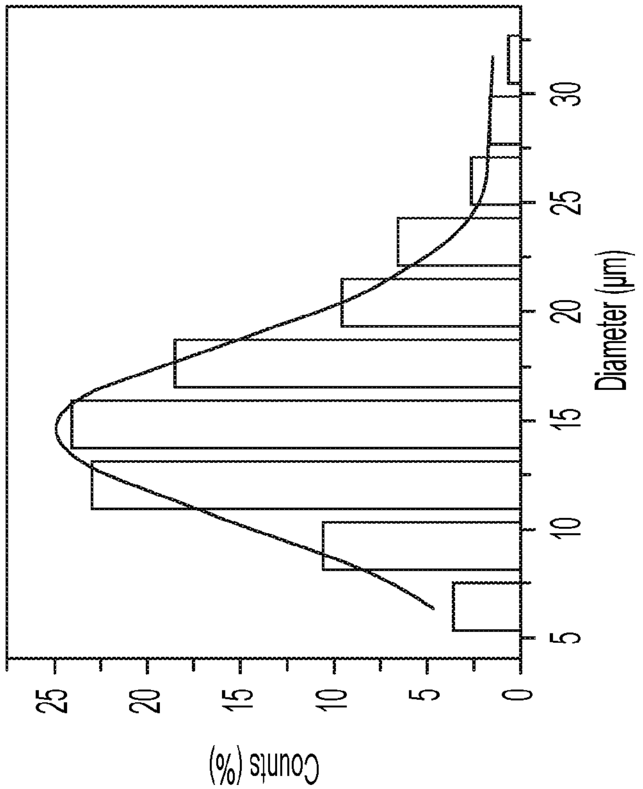
FIG. 7E-7F show pore diameter distributions of the earlywood and latewood sections, respectively, in the natural Douglas fir.
Figure 7E:
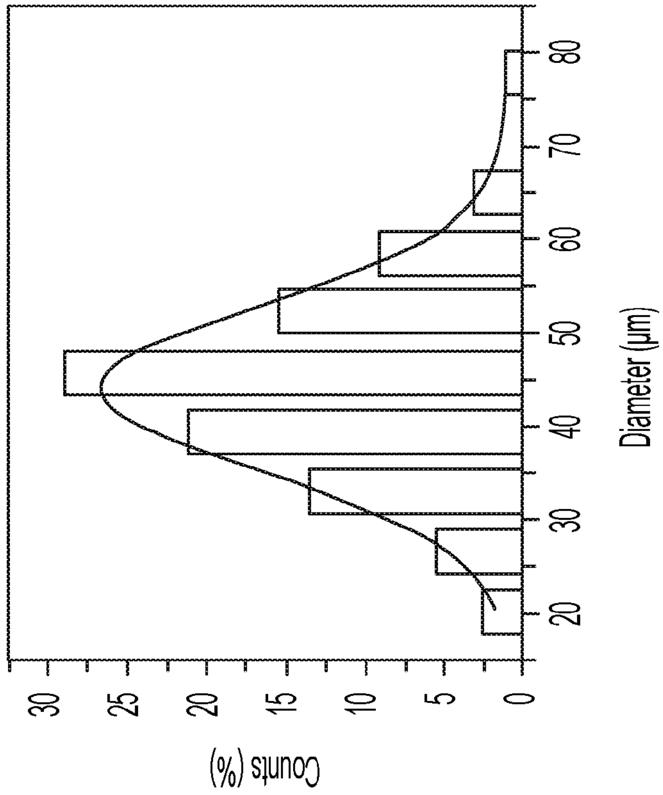

Within the EW section (as shown in FIGS. 7A-7B), the microstructure has thinner sidewalls (e.g., having a thickness in a plane substantially parallel to the radial direction of the wood of ~3.8 μm) and larger lumina (e.g., having a cross-sectional dimension in a plane substantially parallel to the radial direction of the wood), as compared to the sidewalls (e.g., having a thickness of ~15.7 μm) and lumina in the LW section (as shown in FIGS. 7A and 7C). The distribution of the wood tracheids (e.g., the hollow tube-like structures shown in FIG. 7D) varies depending on the particular wood section, with the EW section having a lumen diameter range of about 20-80 μm (see FIG. 7E) and the LW section having a lumen diameter range of about 5-35 μm (see FIG. 7F). The different pore size distributions can thus be indicative of the different densities of EW and LW.

R-cut contiguous blocks of Douglas fir, each with dimensions of 60 mm×60 mm×2 mm, were used to analyze the effect of delignification. A solution of acidic $NaClO_2$ (80%) was employed to remove the colored components (primarily lignin, along with extractives) from the bulk wood. The solution was prepared by dissolving $NaClO_2$ powder in de-ionized (DI) water, and then adding acetic acid to adjust the pH value (~4.6). Each wood sample was placed in the boiling $NaClO_2$ solution for a time period (for example, 2 hours) until the EW sections became white. Afterwards, the delignified wood samples were rinsed with DI water at least three times and then stored in ethanol until further processing. To form naturally-patterned wood composite, epoxy resin (e.g., AeroMarine 300/21 epoxy, a clear, low viscosity cycloaliphatic epoxy system Aeromarine Products, Inc., San Diego, CA) was infiltrated into the processed wood samples. The epoxy resin was allowed to solidify for approximately 24 hours, resulting the naturally-patterned wood composite.

Differential (e.g., spatially-selective) delignification between the EW and LW sections (e.g., based at least in part on the density differences between EW and LW) can be achieved in as little as 2 hours of immersion in the boiling in the $NaClO_2$ solution. After the 2 hour treatment, the EW section becomes almost completely white, whereas the LW section retains color due to the residual lignin and other colored components. The main contributor to spatially-selective delignification is the inherent structural differences between EW and LW sections, which accordingly leads to a faster solution diffusion in the EW section than in the adjacent LW section. After 2 hours of immersion in the boiling $NaClO_2$ solution, the weight of each wood sample had decreased by about 13.5%. However, nano-scale and macros-scale features of the native wood (e.g., the cellulose-based microstructure) is substantially preserved. In order to convert the LW sections to a completely white color, much longer treatment times are required (e.g., about 10 hours) with a corresponding increase in the amount of weight lost (e.g., weight decreased by about 35%). With these longer treatment times, the integrity of the delignified wood structure may not be well-maintained, resulting in poor mechanical properties in part due to the distinct density difference between the EW section (e.g., ~284.6 $cc \cdot m^{-3}$) and LW section (e.g., ~846 $kg \cdot m^{-3}$) and the lack of lignin in both the EW and LW sections.

Figure 7G:
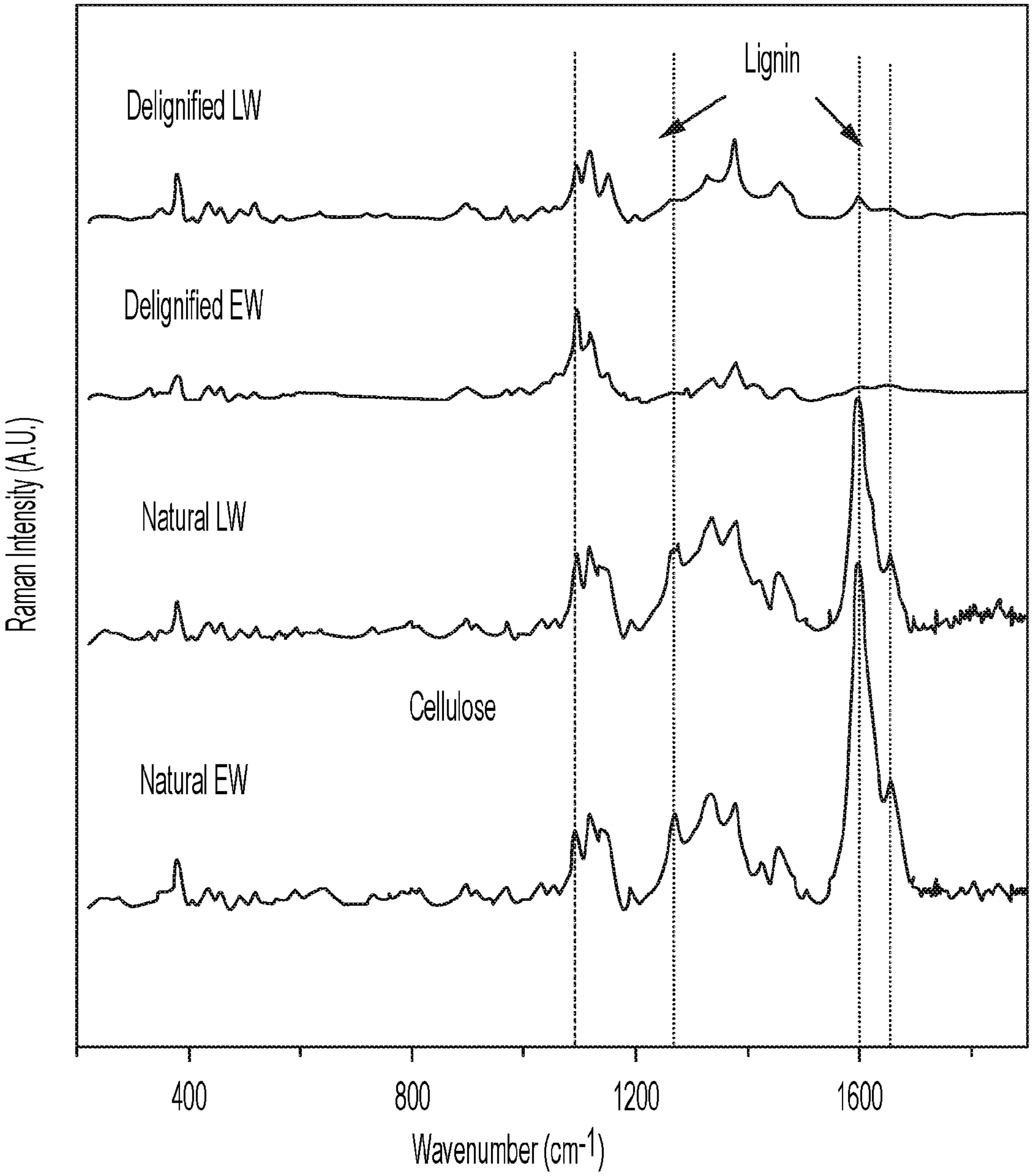
FIG. 7G shows the Raman spectra for cell wall components of earlywood and latewood sections in natural Douglas fir and a fabricated naturally-patterned transparent wood composite, respectively.

To assess the distribution of lignin in the softwood scaffold after spatially-selective delignification, Raman spectroscopy imaging was used in combination with Vertex Component Analysis (VCA). FIG. 7G shows the Raman spectra obtained for the EW and LW sections of both natural wood and spatially-selective delignified wood. In particular, FIG. 7G shows the characteristic bands of the lignin component, located at 1598 $cm^{-1}$, 1656 $cm^{-1}$, and 1269 $cm^{-1}$ (a marker band of the aryl-OH and aryl-OCH3 in guaiacyl (G) units in lignin) ascribing to aromatic C═C stretching, coniferyl alcohol C═C, C═O stretching, and C—H banding of C═C, aromatic C═C stretching, respectively. As compared to the EW and LW sections in natural wood, the representative lignin bands in the cells walls in the EW section of the spatially-selective delignified wood almost disappears while the representative lignin bands in the cell walls in the LW section of the spatially-selective delignified wood remain. Meanwhile, respective cellulose peaks (e.g., at 1095 $cm^{-1}$ (C—O—C stretching vibrations)) remain relatively unchanged after $NaClO_2$ treatment. These results suggest that in the spatially-selective delignified wood most of the lignin in the EW section has been removed while a small proportion of the lignin in the LW section remains, thereby leading to creation of a natural pattern in the contiguous wood block.

Following the same procedure described above, L-cut contiguous blocks of Douglas fir (using the quarter slice cutting of FIG. 4C) were created with straight patterns rather than ringed patterns. The efficient spatially-selective delignification process not only endows excellent structural integrity but also facilitates the large-scale production of L-cut naturally-patterned transparent wood composite. For example, a contiguous block of L-cut naturally-patterned transparent wood composite having a size of 320 mm×170 mm×0.6 mm was fabricated, which is significantly larger than conventional attempts at fabricating transparent woods using delignified wood as a framework. The L-cut naturally-patterned transparent wood composite is optically transparent, with a total transmittance (e.g., from both EW and LW sections) of 87% and optical haze of 65% at 600 nm.

Figure 7H:
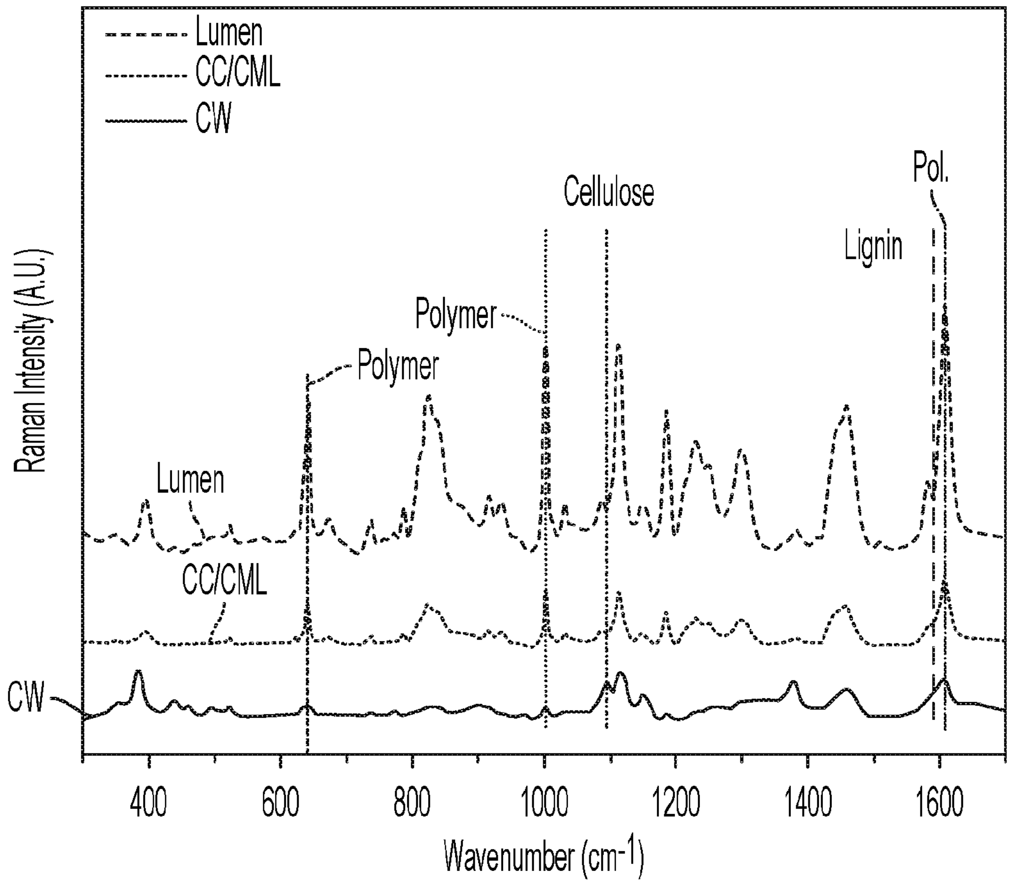
FIG. 7H shows the Raman spectra for cell wall components in a fabricated naturally-patterned transparent wood composite.
Figure 7J:
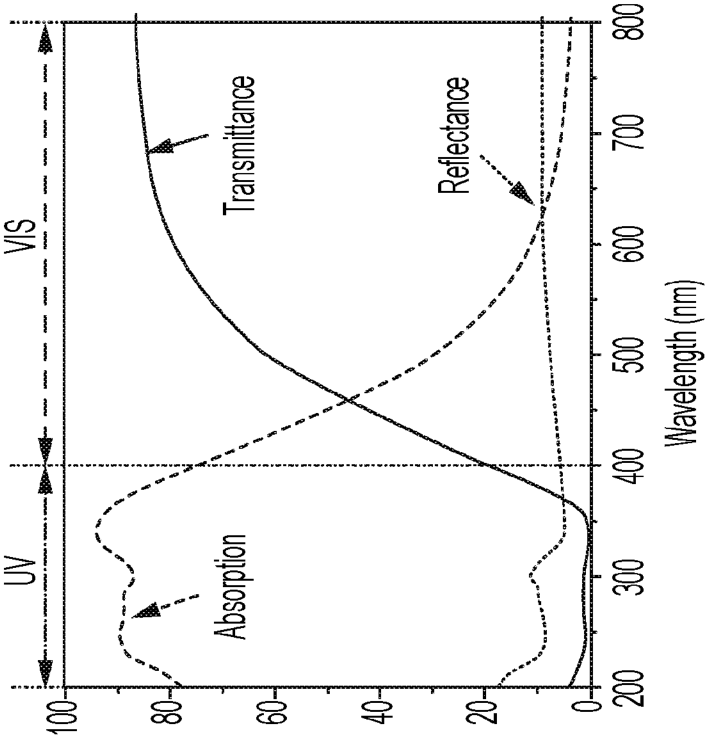
FIG. 7J is a graph of absorption, transmittance, and reflectance spectra of a fabricated contiguous piece of naturally-patterned transparent wood composite.

The L-cut naturally-patterned transparent wood composite exhibits massive aligned dense microchannels along the wood growth direction after successful infiltration. In a cross-sectional view, although lumen in the LW section is much smaller than that of EW section, the lumina are all densely packed. Additionally, the channels and apertures in each section are fully filled with polymer (e.g., epoxy resin), which acts as a glue to create strong interaction between the cellulosic cell wall and that polymer itself. Raman spectroscopy imaging was further performed to identify the distribution of the impregnating polymer in the obtained wood cell including cell corner (CC), compound middle lamella (CML), cell wall (CW), and lumen. According to the corresponding Raman spectrum in FIG. 7H, the strong-signal peaks within lumina indicate the bond stretching of epoxy, in particular, 640 $cm^{-1}$ (aromatic C—H out-of-plane deformation), 1001 $cm^{-1}$ (polyamidoamine adduct, amino groups) and 1608 $cm^{-1}$ (aromatic ring breathing mode). Polymer signals can also be detected in the CML/CC and CW, suggesting that polymer has been well-infiltrated into the wood cells, forming robust interfaces with cellulose in the delignified wood scaffold.

The hierarchical cellular structure of the spatially-delignified wood leads to unique anisotropic mechanical features. For example, naturally-patterned transparent wood composite formed from R-cut wood exhibits a dramatically improved tensile strength (e.g., 21.56 MPa) as compared to natural R-cut wood (e.g., 6.24 MPa), and naturally-patterned transparent wood composite formed from L-cut wood exhibits an even higher tensile strength (e.g., 91.95 MPa) The toughness of naturally-patterned transparent wood composite formed from R-cut wood and L-cut wood, respectively, is 0.523 MJ $m^{-3}$ and 2.73 MJ $m^{-3}$.

Figure 7I:
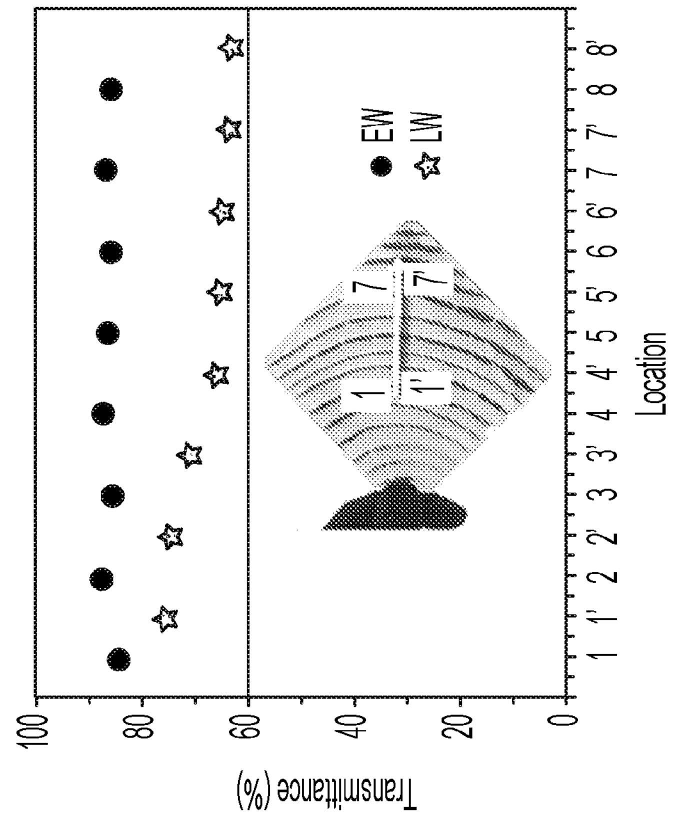
FIG. 7I is a graph of transmittance at 600 nm of the earlywood and latewood sections in a fabricated naturally-patterned transparent wood composite.

In addition, the inhomogeneous distribution of lignin and cell structures between EW and LW sections in the naturally-patterned transparent wood composite can result in non-uniform transmittance. As shown in FIG. 7I, eight locations within EW (1-8) and LW (1'-8') sections of naturally-patterned transparent wood composite formed from R-cut wood were selected and measured for light transmittance at 600 nm. The LW sections exhibited lower transmittance (e.g., average of about 68%) than the EW sections (e.g., average of about 86%). Despite the lower transmittance value in the LW section, the LW sections only slightly decrease the overall average transmittance of the naturally-patterned transparent wood composite with respect to light in the visible spectrum (e.g., at least wavelengths between 600 and 700 nm, inclusive).

Figure 7L:
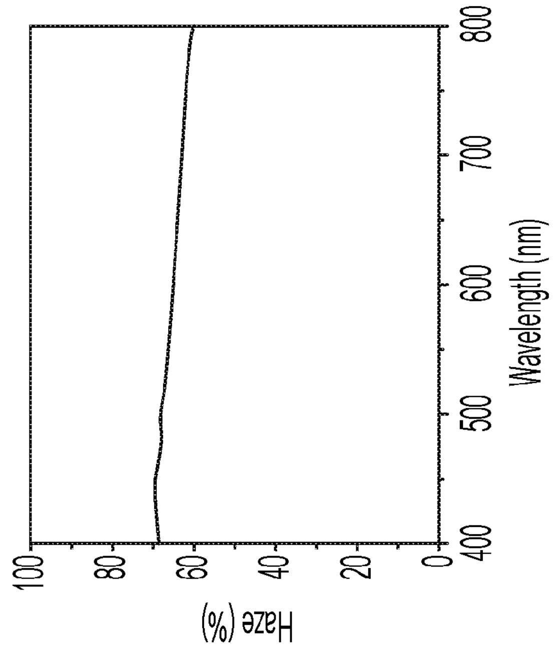
FIG. 7L is a graph of haze for a fabricated contiguous piece of naturally-patterned transparent wood composite.
Figure 7K:
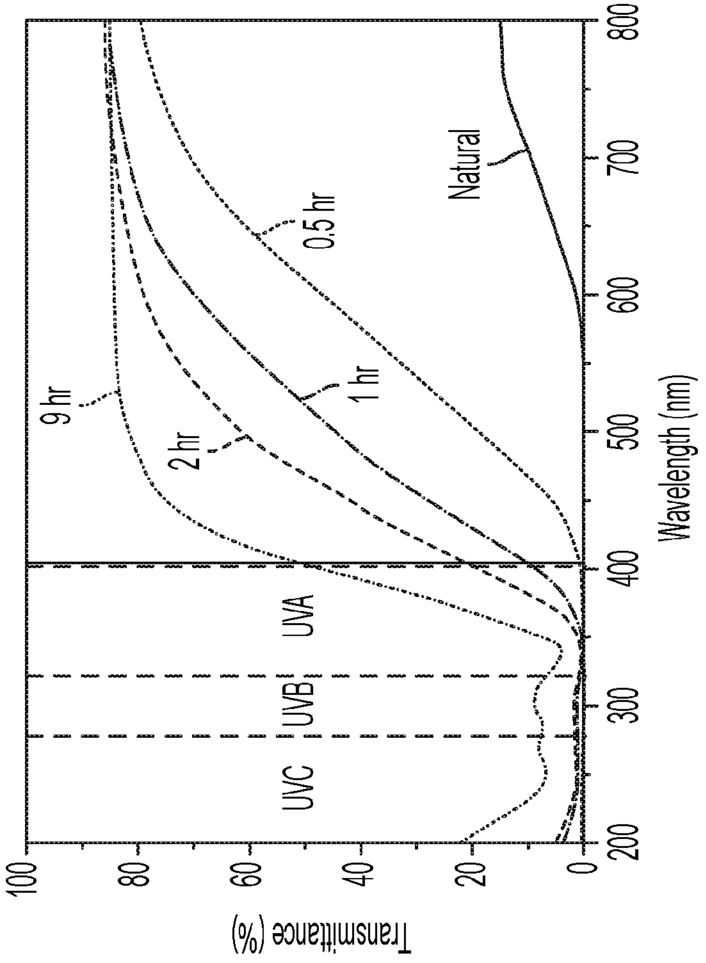
FIG. 7K is a graph of UV-blocking properties of fabricated contiguous pieces of naturally-patterned transparent wood composites based on a duration of delignification treatment.

Moreover, the retention of lignin in the LW sections imbues the naturally-patterned transparent wood composite with unique UV-blocking capabilities (e.g., with respect to wavelengths in a range of 200-400 nm, inclusive), which can be tuned depending on the timing of the delignification treatment. For example, when contiguous wood blocks having thickness of 2 mm was subjected to delignification treatment times under 2 hours, the subsequent transparent wood composite was able to shield almost 100% of the UVC (200-275 nm) and UVB (275-320 nm) spectra and most of the UVA (320-400 nm) spectrum. If, however, the delignification treatment time is prolonged, for example, to 9 hours, the UVA blocking capability of the resulting transparent wood composite was remarkably decreased, as shown in FIG. 7K. The excellent UV-blocking properties are ascribed to the existence of phenylpropane structures and phenolic hydroxyl groups in the lignin molecules with UV absorption ability. Consequently, naturally-patterned transparent wood composites formed from contiguous wood blocks subject to a delignification treatment of 2 hours exhibited a unique combination of features, in particular, good UV absorption (e.g., ≥80%) in a range of 200-400 nm, a high average transparency (e.g., ≥80%) at 600 nm, and a low reflectance (e.g., ≤20%) for visible wavelengths.

The naturally-patterned transparent wood composites also demonstrate anti-glare and light guiding capabilities. For example, the naturally-patterned transparent wood composites largely scatters the light forward, leading to a high optical haze of ~93%, as shown in FIG. 7L. Since the transparent wood composite inherits the aligned microstructure of the natural wood, once the refractive-index-matched polymer (e.g., epoxy) fills the wood lumina, light can propagate along the microchannels. The microchannels function as lossy waveguides, which provide the transparent wood composite with the noted properties.

Figure 7M:
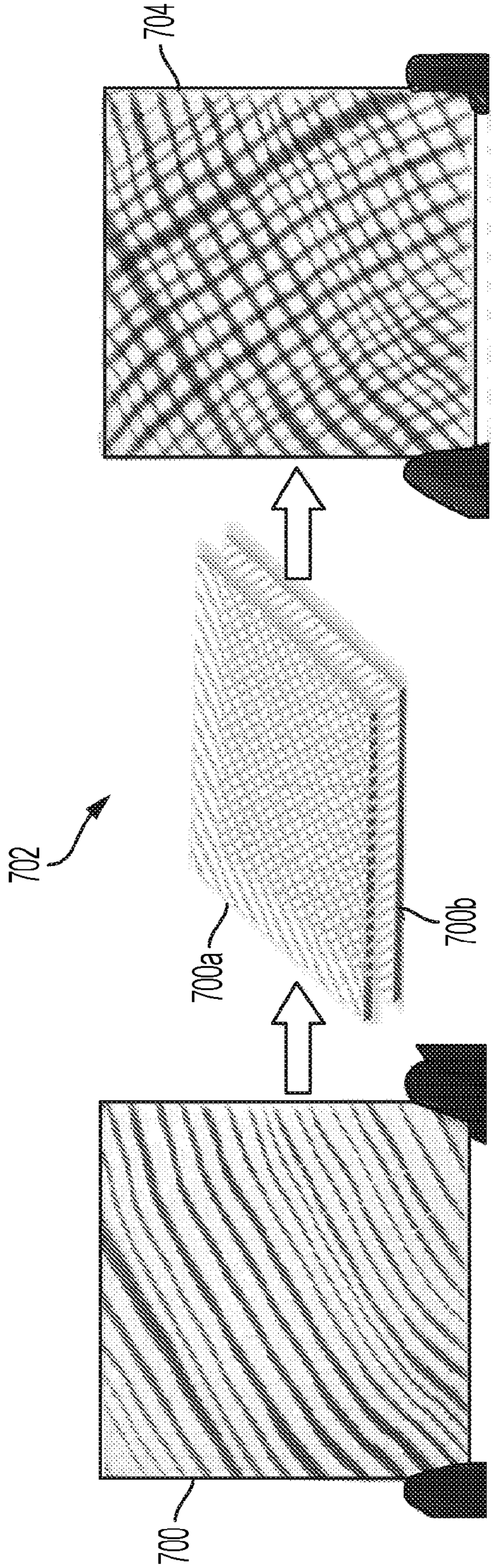
FIG. 7M illustrates assembly of separate contiguous pieces of naturally-patterned transparent wood composites to form custom patterns.

The pattern of the transparent wood composite is defined by the natural pattern of EW and LW sections in the contiguous piece of original wood. However, other types of patterns can be realized by stacking multiple layers 700 of transparent wood composites together, each of which may be from the same tree, from the same wood species (e.g., both Douglas fir but from different trees), or from different softwoods (e.g., one is fir and the other is pine). For example, as shown in FIG. 7M, lattice patterns in an assembly 704 can be formed by arranging in a stack 702 two (or more) layers 700*a*, 700*b*, which have patterns rotated with respect to each other. Based on the high transmittance and intrinsic aesthetic, this capability can enable the potential application in patterned ceilings.

At the same time, aesthetic wood can also improve energy efficiency due to its excellent thermal insulation properties compared to glass. For example, the naturally patterned transparent wood composite exhibits a thermal conductivity of 0.24 $W\cdot m^{-1} K^{-1}$ in the radial direction (e.g., perpendicular to the longitudinal growth direction), which is lower than in the longitudinal growth direction (e.g., ~0.41 $W\cdot m^{-1} K^{-1}$) and lower than the isotropic thermal conductivity of common window glass (e.g., ~1 $W\cdot m^{-1} K^{-1}$). The anisotropic thermal transport of the transparent wood composite in combination with such low thermal conductivities can be useful for replacing glass in energy-efficient buildings.

To demonstrate the use of the naturally-patterned transparent wood composite as a building material with high transparency and high haze, model houses were constructed using glass and the transparent wood composite as a skylight. Using an external white light source directed at the skylight, light intensities at various points within each model house were detected and compared. In the model house employing the glass skylight, the maximum light intensity (e.g., 56.8 $mW\cdot cm^{-2}$) was about 17 times higher than the minimum light intensity (e.g., 3.4 $mW\cdot cm^{-2}$), which yielded a non-uniform illumination. In contrast, the model house employing the transparent wood composite skylight experienced a diffused light distribution that was more uniform, with a maximum light intensity of 48.2 $mW\cdot cm^{-2}$ and a minimum light intensity of 20.9 $mW\cdot cm^{-2}$.

The weathering stability of the naturally-patterned transparent wood composite was also evaluated by exposing the materials outdoors for 3 weeks and measuring optical and mechanical properties. For the transparent wood composite formed from R-cut wood, the transmittance of the composite after exposure decreased slightly as compared to before the exposure, while the haze increased from ~93% to ~98% in the wavelength range of 400-800 nm. The transparent wood composite formed from L-cut wood experienced a similar change in transmittance and haze properties after exposure. Similar trends in the transmittance and haze occurred in aesthetic wood-L as well. However, the exposure did not impact the mechanical properties of either cut of the transparent wood composite. Rather, there was no significant degradation in the strength of the transparent wood composite by the exposure, suggesting that the composite enjoys at least short term weathering capability.

In the examples above, softwood was used to take advantage of the spatially-selective delignification based on the native sections within the contiguous wood piece. Although both hardwood and softwood are in principal suitable, hardwood possesses a significantly different structure consisting of vessels and fibers, while softwood mainly consists of tracheids. For example, basswood, a type of hardwood, has a substantially uniform cell wall thickness of ~5.8 μm, which is much thinner than the cell wall thickness of the LW section in Douglas fir. Moreover, the vessel channels in basswood are larger in terms of lumen diameter than the relatively narrow tracheids of Douglas fir, and the vessel channels exhibit a bimodal pore-size distribution. As a result, the reactions in the EW and LW sections of basswood proceed substantially in sync, such that almost no apparent wood patterns are preserved after 2 hours of treatment. Similar results were obtained for balsa wood (another type of hardwood possessing bimodal pores and therefore substantially uniform solution diffusion). However, hardwoods otherwise exhibit substantial differences in density, porosity, cell wall thickness, lumina cross-sectional dimensions, or any combination of the foregoing and that results in different solution diffusion or reaction efficiency between different naturally-occurring sections therein can be used to form a naturally-patterned transparent wood composite according to embodiments of the disclosed subject matter.

Second Example—In Situ Lignin Modified Wood

The native lignin within contiguous blocks of wood was chemically modified in situ by UV-assisted photocatalytic oxidation method to fabricate modified wood (also referred to as in situ lignin modified wood, lignin-modified wood, or photonic wood). During the UV-assisted photocatalytic oxidation process, conjugated double bonds are cleaved so as to remove the chromophores of lignin while preserving the bulk aromatic skeleton of lignin, which continues to provide mechanical strength. The modified wood thus retained most of the lignin within the original wood (e.g., ≥80%), while the removal of chromophores imbues the modified wood with unique optical properties. In particular, the modified wood exhibits a high optical whiteness (e.g., ≥90% reflectivity for light having a wavelength in the range of 400-800 nm, inclusive), an intact cellulose-based microstructure, improved mechanical strength (e.g., ~20 MPa wet tensile strength), remarkable water stability, and improved scalability (e.g., as much as 2 meter) when compared with prior delignification techniques used to generate optical properties in wood.

In the natural wood, the vertically-aligned wood channels enable $H_2O_2$ and UV light to penetrate efficiently into the wood structure for fast and in-depth de-coloration that can be achieved in less than 7 hours (e.g., 1-6.5 hours, depending on thickness of the contiguous piece of wood in a direction perpendicular to a surface of the wood piece upon which the UV light is incident). Furthermore, the wood can be selectively decolored by $H_2O_2$ printing in combination with UV light radiation (e.g., using a paper board carving as a mold for application of $H_2O_2$ to the wood surface), which makes it possible to directly generate custom, predetermined patterns of regions with different optical properties within the contiguous piece of wood.

Balsa wood was used to prepare the modified wood because of its low density and hierarchical porous microstructure, but other hardwoods or softwoods could also be used. First, balsa wood samples were impregnated with $H_2O_2$, in particular, by immersing each contiguous sample block in a 30% $H_2O_2$ solution to which was added 10% NaOH solution. The small quantity of alkali can serve to accelerate the decomposition of $H_2O_2$ without causing substantial lignin removal from the balsa wood. Each $H_2O_2$-impregnated balsa wood sample was then exposed to UV radiation using an artificial light source (UVA band, 20 W power) until the samples became completely white. For example, the natural balsa wood changes from brown to completely white after about 2 hours of UV exposure (in combination with the $H_2O_2$ exposure). In contrast, the color of the wood turns yellow when using $H_2O_2$ without UV light. Note that lignin has many photolabile chromophore groups (e.g., quinone groups and conjugated double bonds), which is prone to absorb the energetic photons of UV light to generate chromophoric radicals. Therefore, the photo-excited chromophoric radicals can efficiently react with $H_2O_2$ to enable the photocatalytic oxidation degradation of chromophore groups, eliminating the brownish color of natural wood. Meanwhile, the color of the wood did not change significantly when applying only UV light, despite the fact that lignin is sensitive to UV radiation. Moreover, if $H_2O_2$ treatment is used any UV exposure, even 10 hours of exposure to $H_2O_2$ is insufficient to modify the natural balsa wood to have the white color achievable with the combination of $H_2O_2$ and UV exposure. This indicates that the chemical oxidant alone may not be enough to completely bleach the wood, or at least not on the same time scales as the combination of the chemical oxidant with the UV exposure.

Figure 8A:
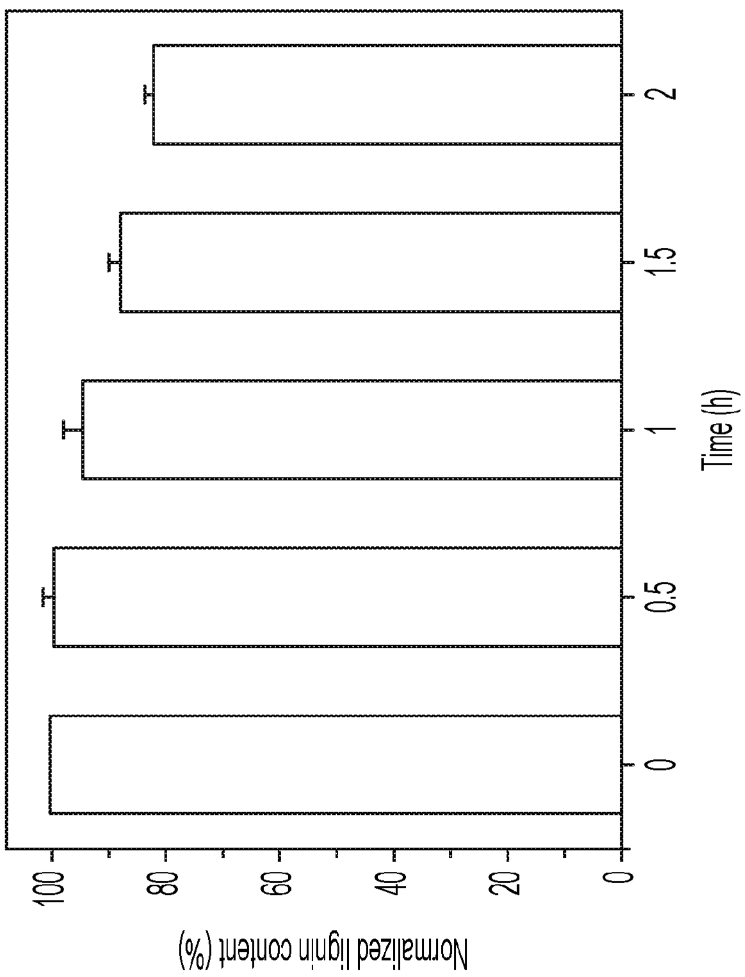
FIG. 8A is a graph of normalized lignin content after photocatalytic oxidation treatment to form in situ lignin modified wood versus time of the treatment.
Figure 8B:
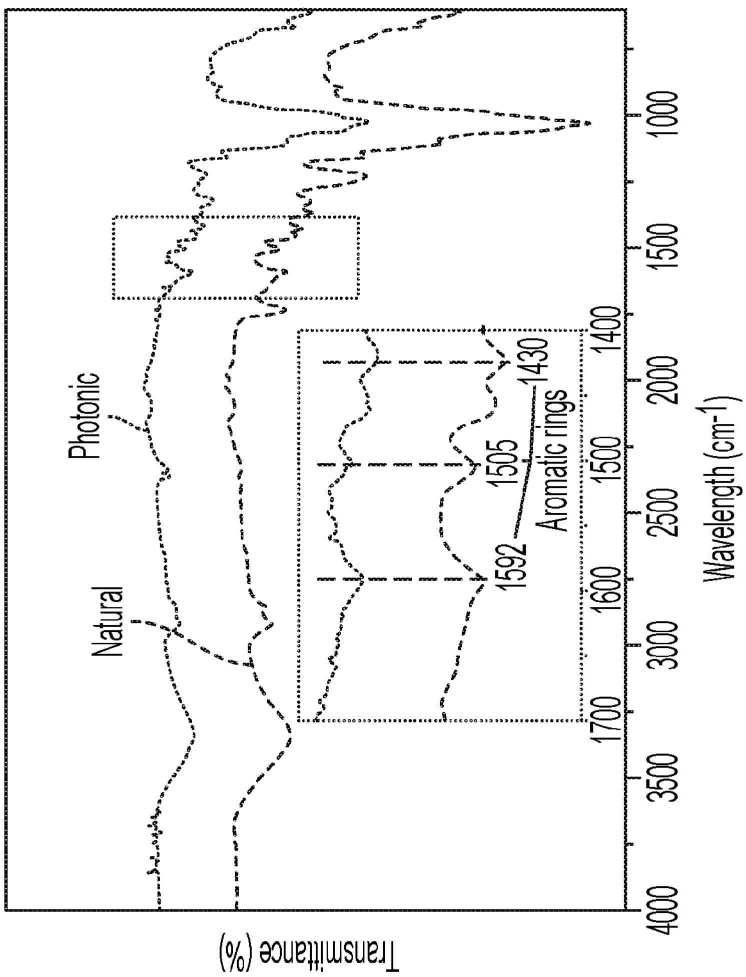
FIG. 8B is a graph of Fourier transform infrared (FTIR) spectra of natural wood and a fabricated contiguous piece of in situ lignin modified wood.

The combination of $H_2O_2$ and UV exposure further allows the modification of optical properties of the wood without removing significant amounts of lignin therefrom, thereby enabling enhanced mechanical strength of the modified wood as compared to conventional delignification. The compositional content of the modified wood was measured using the acid hydrolysis method, and the acid-insoluble lignin (Klason lignin) was determined by gravimetric analysis. FIG. 8A shows that the normalized lignin content only slightly decreased with increasing treatment time during the UV-assisted photocatalytic oxidation treatment. For example, after 2 hours of UV-assisted photocatalytic oxidation (sufficient to turn the sample completely white), the lignin content in the modified wood was 19.29 wt %, which equates to ~82% of the original lignin content in the natural balsa wood starting material (e.g., 23.5 wt %). In addition, as the Fourier transform infrared (FTIR) spectrum of FIG. 8B shows, the modified wood (photonic) exhibits absorbance peaks at 1592, 1505, and 1430 $cm^{-1}$, thereby suggesting that the aromatic skeletal lignin structure was well retained.

Figure 8C:
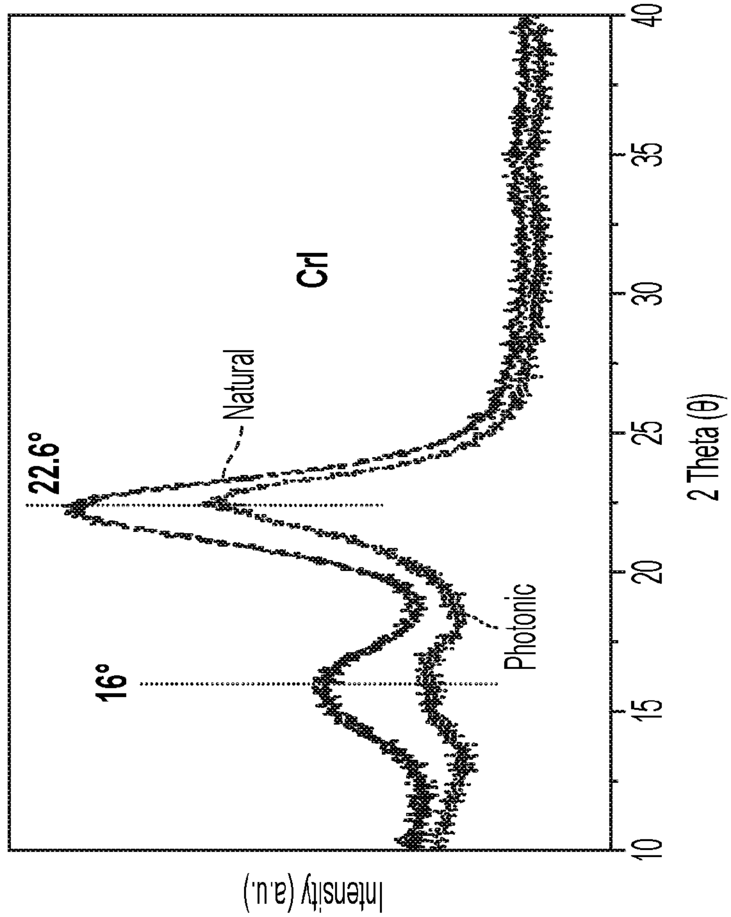
FIG. 8C is a graph of X-ray diffraction (XRD) spectra of natural wood and a fabricated contiguous piece of in situ lignin modified wood.
Figure 8D:
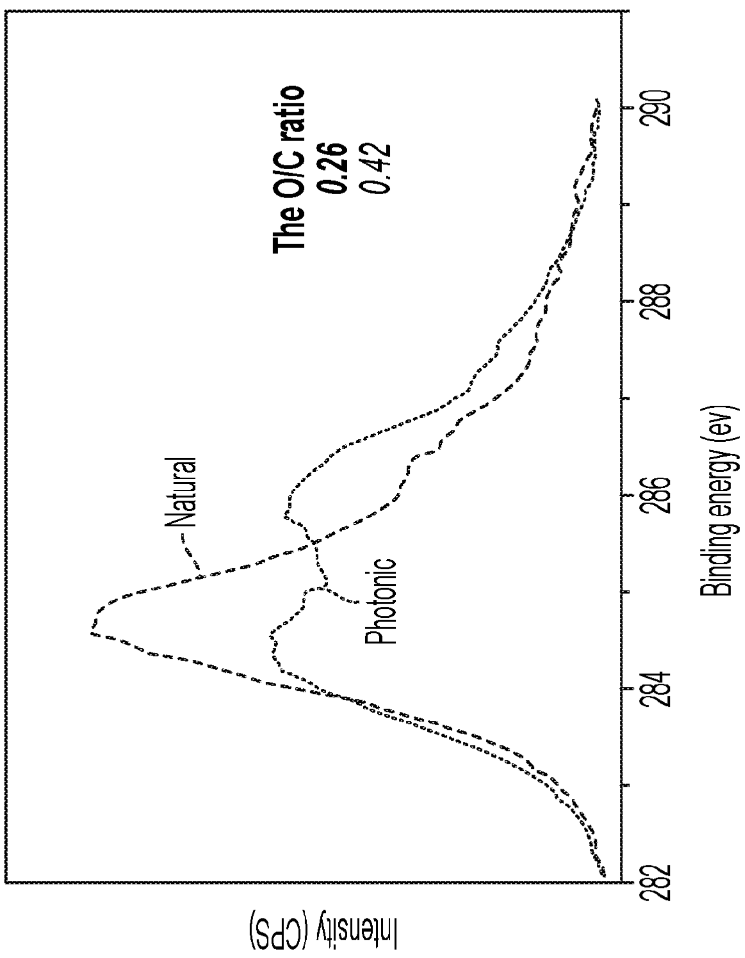
FIG. 8D is a graph of X-ray photoelectron spectroscopy (XPS) spectra of natural wood and a fabricated contiguous piece of in situ lignin modified wood.

The chemical structure of the modified wood was further analyzed using X-ray diffraction spectroscopy (XDS) and X-ray photoelectron spectroscopy (XPS). X-ray diffraction (XRD) patterns were collected using a Rigaku Ultima III equipped with a curved detector manufactured by Rigaku Americas Corp. (operating tube voltage of 40 kV, tube current at 30 mA, Cu Kα, λ=1.5406 Å). As shown in FIG. 8C, the XRD patterns of the cellulose crystal structure in the modified wood exhibited diffraction peaks at 16° and 22.6°, which represent the crystal lattice type I structure of the native cellulose (CrI), confirming that the UV-assisted photocatalytic oxidation process did not change the crystal structure from the original wood. For the XPS experiments, peak positions were calibrated by the binding energy of C1s as a reference of 284.6 eV. FIG. 8D shows the C1s spectra of the natural wood and modified wood. The XPS spectrum of the photonic wood has a high energy shift compared to the starting material. The calculated oxygen to carbon (O/C) ratio changes from 0.26 to 0.42 after the UV-assisted photocatalytic oxidation treatment, indicating the modified wood has a higher percentage of oxygen atoms and a lower percentage of carbon atoms, which may be attributed to an increased amount of O—C═O and C═O groups from the occurrence of oxidation reactions on the surface of lignin. This in turn suggests that the conjugated double bond (C═C) of the chromophores was opened and non-conjugated carboxyl groups were formed.

The above noted results, in addition to change in color to white of the modified wood, confirms that the UV-assisted photocatalytic oxidation is effect to modify lignin in situ to its chromophore while preserving most lignin skeletons. Different from other ex situ lignin modification techniques, the disclosed technique allows for in situ modification of the native lignin, which is composed of phenyl skeletons and oxygen containing branches and bonded by a series of C—O and C—C linkages. Such an intact lignin structure facilitates the elimination of its chromophores while preserving as much of the lignin skeleton structure as possible during photocatalytic oxidation process.

As discussed above, natural wood can possess large vessel channels with diameters of several hundred micrometers (~100-300 μm) as well as small fiber lumen with diameters of tens of micrometers (~20-50 μm), which are decorated by different ranged sizes of pits (~0.8-10 μm). These hierarchical and interconnected microstructures serve as an efficient path for the photocatalytic oxidation process, enhancing the $H_2O_2$ penetration and UV light capture, which leads to an efficient synergistic reaction to obtain the modified wood.

Figure 8E:
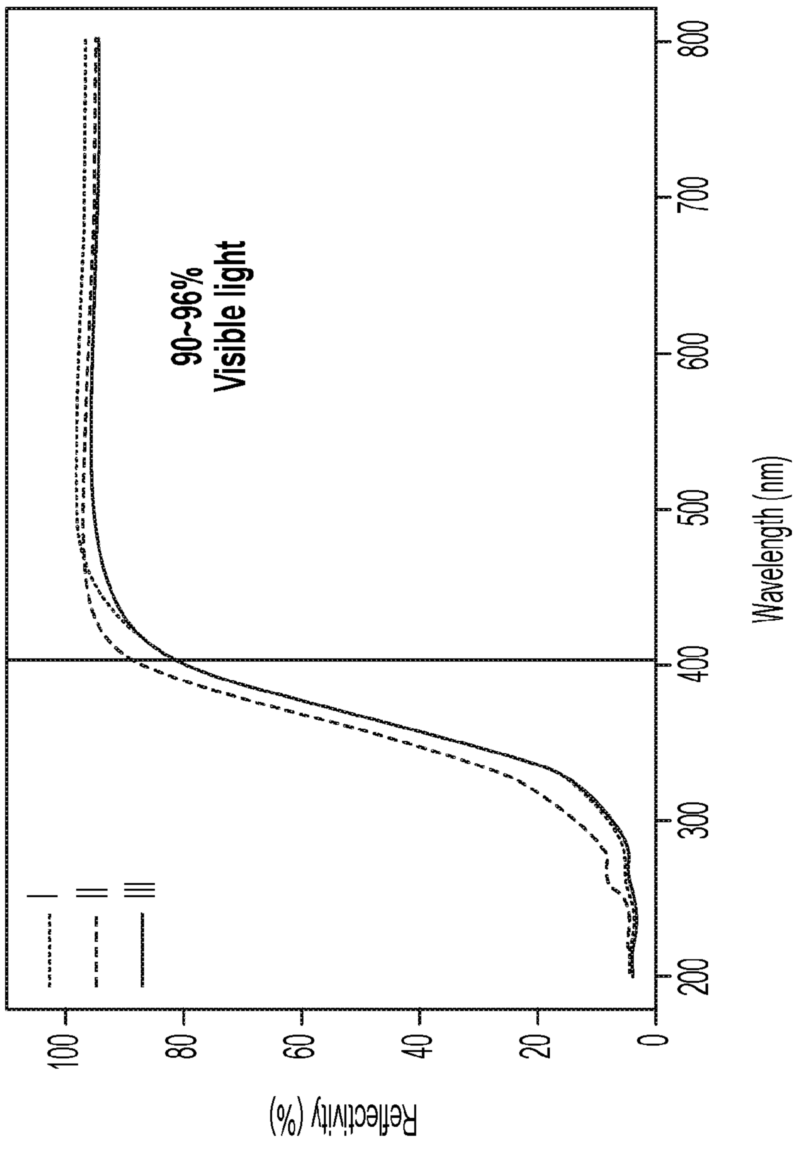
FIG. 8E is a graph of reflectance spectra at different locations of a fabricated contiguous piece of in situ lignin modified wood.
Figure 8F:
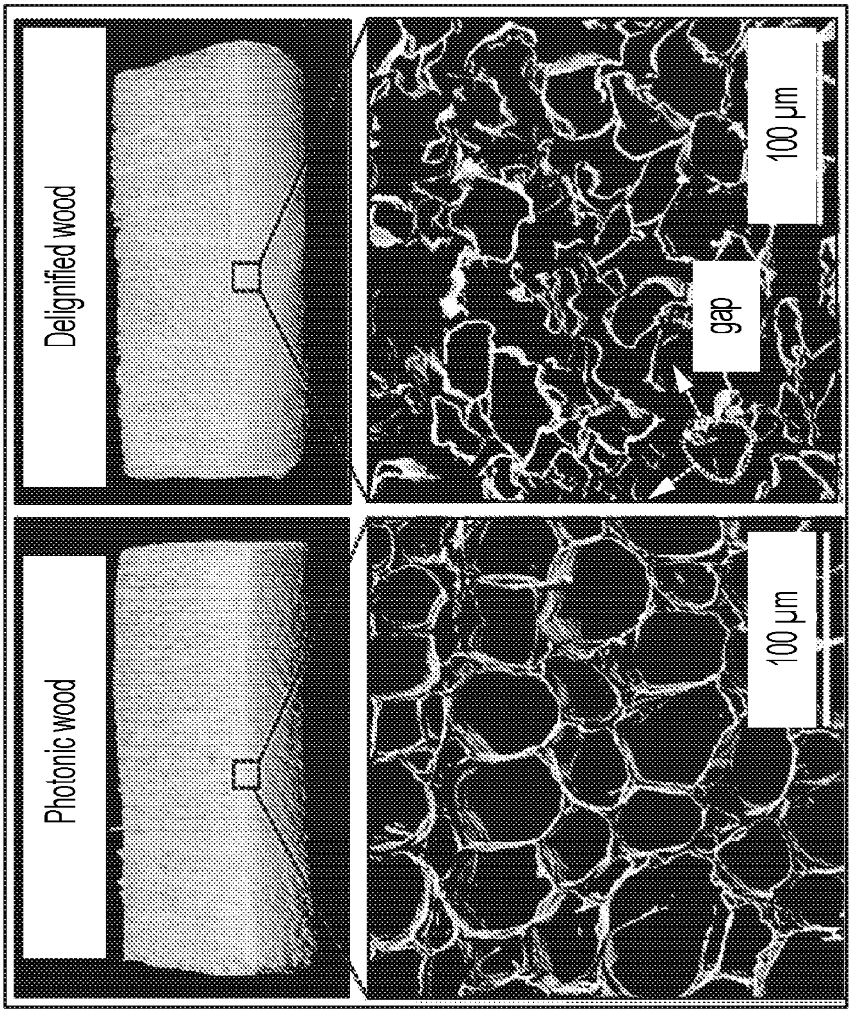
FIG. 8F show macroscale and microscale images comparing a fabricated contiguous piece of in situ lignin modified wood (e.g., photonic wood) and a fabricated piece of delignified wood.

Furthermore, the wood scaffold structure with its hierarchical pores can be maintained after the photocatalytic oxidation process. In particular, the thickness of cell walls in the modified wood (~2.06 μm) are similar to the natural balsa wood starting material (~2.09 μm). For comparison, delignified wood was fabricated by immersing the natural balsa wood in a boiling chemical solution (e.g., an aqueous 5 wt % $NaClO_2$ solution with acetic acid added to adjust the pH to ~4.6) until the wood became completely white. Such delignified wood has cells walls that become significantly thinner after treatment (~1.46 μm) and with substantial changes to the underlying cellulose-based microstructure, as shown in FIG. 8F.

To explore the uniformity of the treatment with respect to a thickness of the modified wood, a cross-section of a contiguous block of modified wood (38 mm×30 mm×9 mm) was taken along the longitudinal growth direction and divided it into three sections (section "I" corresponding to the 3 mm adjacent a top surface of the block subjected to UV exposure, section "III" corresponding to the 3 mm adjacent a bottom surface of the block opposite the top surface, and section "II" corresponding to the 3 mm between sections I and III). No obvious visual differences were observed between the three sections; rather, all displayed the same level of whiteness, indicating that the wood was consistently decolorized by the UV-assisted photocatalytic oxidation. The microscopic structures of these three sections appeared similar as well, demonstrating an intact wood microstructure. FTIR analysis showed these three sections also feature the same components, retaining the bulk structure of lignin. Additionally, the reflectance spectrum shown in FIG. 8E demonstrates that the three sections all exhibit high reflectivity of visible light (~90-96%). Without being bound by any particular theory, it is believed that the uniform properties of the modified wood are due to the rapid infiltration of O·/HOO· and the efficient travel of UV light deep into the interior of the wood, which is made possible by the channel structure of the natural wood.

Compared to delignification methods, the disclosed photocatalytic oxidation technique exhibits many superior characteristics. First, the use of $H_2O_2$, which a green oxidant that decomposes into water and oxygen without producing any toxic gas or liquid, may be considered more environmentally friendly than delignification methods (e.g., using $NaClO_2$ solution, which can produce significant amounts of toxic chlorine gas). Second, the processing times required for photocatalytic oxidation may be substantially less than delignification. For example, the disclosed photocatalytic oxidation can decolor (convert the wood to white in color) a wood block of 5 mm thickness in as little as 3.8 hours, whereas delignification may require at least 6 hours to achieve a similar decoloring. Third, the photocatalytic oxidation process also better retains the lignin content compared to delignification (82% vs. 1.4%) by selectively removing the chromophoric group while retaining lignin's bulk aromatic structure. Indeed, by retaining the majority of lignin after processing, the modified wood can retain the original cellulose-based microstructure of the wood, as shown in FIG. 8F. In contrast, the cell walls of delignified wood feature large gaps and partial kinking, which compromises the structural morphology.

The preserved lignin of the modified wood serves as a mechanical binder that provides mechanical strength and prevent to its deconstruction. Wood samples were kept in ultrapure water for 20 minutes, and then the samples were subjected to mechanical tests after removing the excessive water on the sample surface. The tensile properties of the natural wood, modified wood, and delignified wood samples were measured using a Tinius Olsen H5KT tester. The dimensions for the tensile samples were approximately 50 mm×5 mm×1.5 mm. The samples were stretched at a constant test speed of 5 mm/min along the sample length direction until they fractured. The modified wood in these wet conditions exhibited a tensile strength (along the longitudinal growth direction) of 20 MPa, which is 20-times stronger than that of the totally delignified wood (1 MPa) and essentially the same as that of unmodified natural wood. In this case, the in situ modified lignin of the modified wood is able to hold the cellulose fibers together to enhance the tensile properties of the wood as compared to delignified wood.

The compressive properties of the photonic wood and delignified wood samples were measured using a Tinius Olsen H5KT tester. The dimensions for the tensile samples were approximately 20 mm×10 mm×10 mm. The samples were compressed at a constant test speed of 5 mm/min along the direction perpendicular and parallel to the tree growth direction. The modified wood exhibited a higher compressive strength due to the support of the stiff lignin, while pressure exerted on the delignified wood results in irreversible collapse of the cell walls. After releasing the pressure, the modified wood recovers without obvious deformation (the thickness change after compression Δh=1.5 mm). In contrast, the delignified wood cannot recover, resulting in high compressive deformation (Δh=8.4 mm). Compression tests of wood samples were also performed at well state along the direction parallel to the tree growth direction. At the same compressive displacement (1.6 mm), the delignified wood exhibited collapse of the cell walls, while the modified wood showed no structural damage or a significant decrease in compressive strength.

The in situ modified lignin can also act as a barrier to water and improve the water stability of the modified wood due to the hydrophobic property of the lignin's aromatic rings. Water stability tests were performed by placing blocks of the natural wood, modified wood, and delignified wood in water. The dimensions of the wood in this experiment were 4.5 cm×4.5 cm×0.45 cm. The natural wood, photonic wood, and delignified wood were placed in water at the same time and the thicknesses were recorded every minute. More water was absorbed into the delignified wood, leading to a larger change in mass than that of the modified wood. In this case, without the shield of the hydrophobic lignin, the loosened cellulose fibers of the hydrophilic delignified wood are more sensitive to water. Meanwhile, the high water absorbance by the delignified wood also leads to a more obvious change in the material's thickness. Water absorption rate of the samples were also measured, in which one end of the wood was placed in a methylene blue (MB) solution. The delignified wood featured the highest level of MB adsorption, followed by the modified wood, which again indicates that water penetrates the delignified wood more easily due to the lack of hydrophobic lignin.

After immersing the samples in water for three weeks to study their water stability, the delignified wood completely disintegrated into short fibers, while the modified wood maintained its shape without obvious change. Due to the lack of lignin, water is able to penetrate into the delignified wood and disrupt the accessible and loose cellulose hydrogen bonds, leading to its weak mechanical performance. Meanwhile, benefitting from the hydrophobic and binding role of lignin, which crosslinks the microfibers of photonic wood, water is unable to break the hydrogen bonding structure of the cellulose, resulting in the excellent water stability of the photonic wood in addition to its improved mechanical features.

Figure 8H:
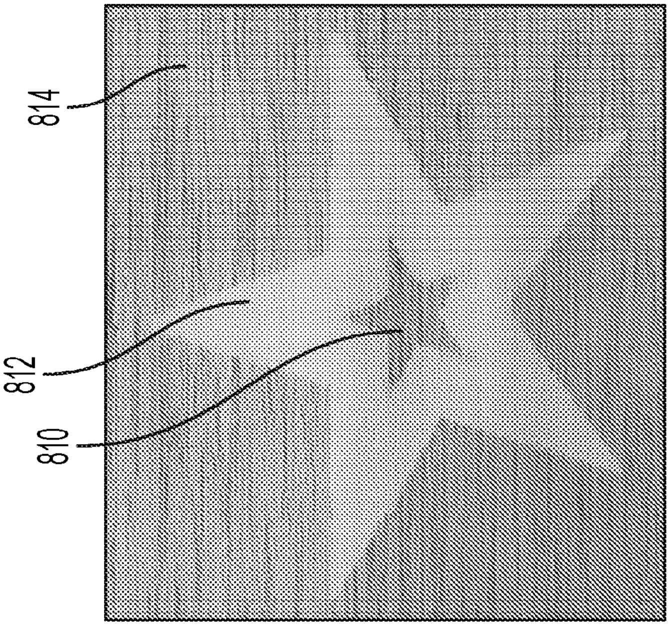
FIGS. 8G-8H are images of fabricated contiguous pieces of in situ lignin modified wood pieces with custom patterns.
Figure 8G:
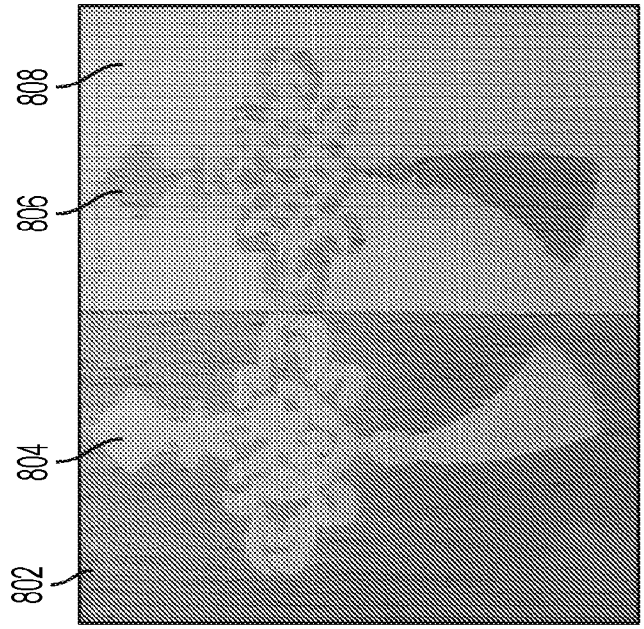

Although the fabricated examples discussed above have resulted in modification of the entire contiguous block, the photocatalytic oxidation technique can be used to form adjacent sections within the contiguous block having different properties, for example, according to a predetermined two-dimensional or three-dimensional pattern that is independent of the natural patterns of the wood. In particular, since both UV light and the chemical oxidant ($H_2O_2$) are used to achieve de-coloration within a particular treatment time, the controlled application of both to specific portions of the wood can dictate the resulting properties thereof. For example, $H_2O_2$ can be printed (e.g., brushed, painted, sprayed, or otherwise applied to the surface without immersion of the entire contiguous block) on the surface of the natural wood in a particular pattern (e.g., using a carved paperboard mold), which surface is then illuminated by UV radiation. Sections of the wood that receive both UV and $H_2O_2$ will be modified while the sections of the wood that receive only one or neither will be unmodified. For example, a pattern was printed on a surface of a contiguous block of wood using 30% $H_2O_2$, and then the surface was exposed to UV light to form patterned modified wood. FIG. 8G-8H shows a Chinese knot pattern and a star pattern that were formed in respective contiguous wood blocks using this technique, with the lignin in sections 804, 808, 812 being in situ modified to remove chromophores therefrom and thus exhibit a white color, and with the lignin in sections 802, 806, 810, 814 being substantially unmodified (e.g., native form of lignin). Alternatively, the $H_2O_2$ can be applied to the entire wood block and the surface of the natural wood then illuminated by UV radiation in a particular pattern. Thus, natural wood can be selectively decolored on its surface with on-demand patterning by this facile, sustainable, large-scale, low-cost synergistic photocatalytic oxidation treatment.

Third Example—Transparent Wood Composite

The native lignin within contiguous blocks of wood was chemically modified in situ by UV-assisted photocatalytic oxidation method to fabricate modified wood, which was then infiltrated with an index-matching polymer to form a transparent wood composite (also referred to as in situ lignin modified transparent wood composite, artificially patterned transparent wood composite, or transparent wood). A balsa wood log was cut along the transverse and longitudinal directions to form wood slices (having thicknesses ranging from 0.6 mm to 3.5 mm, inclusive). For each balsa wood slice, a trace amount of NaOH (2-3 ml at a concentration of 10 wt %) was coated (e.g., brushed) on a top surface (perpendicular to thickness direction) before brushing $H_2O_2$ to improve the oxidation efficiency of the $H_2O_2$. Then, the top surface of each wood slice was brushed with $H_2O_2$ (≥15 ml at a concentration 30 wt % concentration, with volume depending on wood thickness), followed by illuminating the top surface until the samples became completely white. A UV lamp emitting wavelengths of 380-395 nm was used for UV irradiation of the modified wood. For example, ~15 ml of $H_2O_2$ (concentration of 30 wt %) was brushed on a natural balsa wood sample having dimensions of 200 mm×10 mm×0.6 mm, followed by exposure to UV light for 1 hour until the natural wood color turned completely white. This process removes the chromophore in lignin, causing the color of the wood to change from brown to white. The treated wood pieces were then immersed in ethanol for 5 hours to remove any remaining chemicals, and then transferred to toluene so as to exchange the ethanol in the wood. Subsequently, each treated wood piece was impregnated with epoxy resin (e.g., AeroMarine 300/21 epoxy, a clear, low viscosity cycloaliphatic epoxy system Aeromarine Products, Inc., San Diego, CA) by vacuum infiltration for 1.5 hours. Finally, the epoxy-impregnated wood samples were stored at room temperature until the epoxy was completely cured.

Figure 9B:
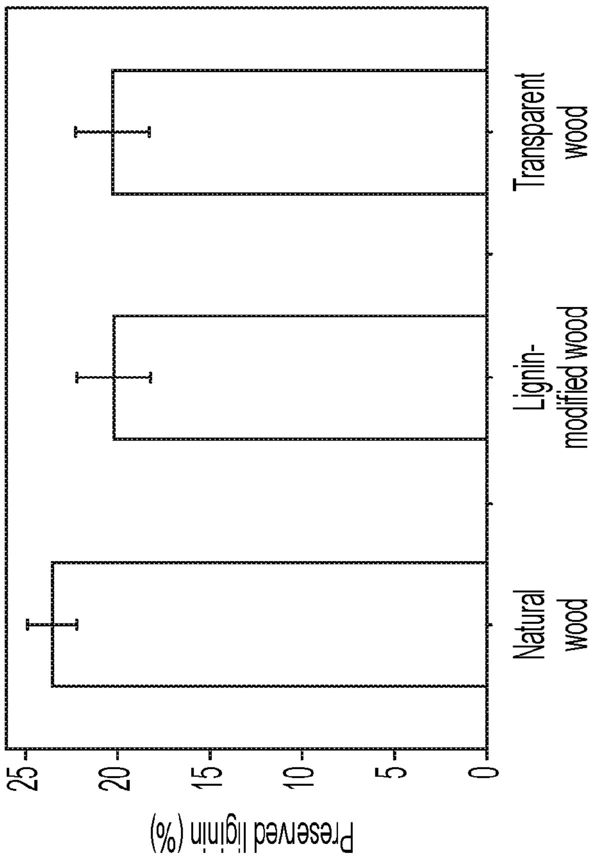
FIGS. 9A-9B are graphs of FTIR spectra and lignin content, respectively, of natural wood, a fabricated contiguous piece of in situ lignin modified wood, and a fabricated contiguous piece of a transparent wood composite.
Figure 9A:
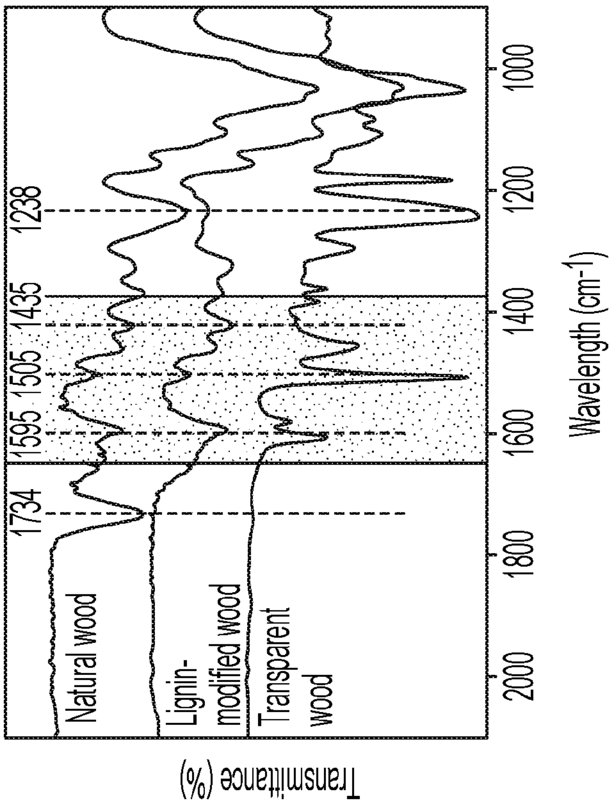

FIG. 9A shows the FTIR spectrum of the lignin-modified wood and the subsequently-formed transparent wood, as compared to natural wood. The absorption peaks at approximately 1595, 1505, and 1435 $cm^{-1}$ can be attributed to the aromatic vibrations of lignin, thus confirming that the in situ lignin modification and subsequent polymer infiltration preserves the aromatic backbone of lignin despite degradation of its chromophore. The peak of 1734 $cm^{-1}$ in the FTIR spectrum can be assigned to the carboxyl groups in hemicellulose (xylan/glucomannan), while the peak of 1235 $cm^{-1}$ belongs to the uronic acid groups of the hemicellulose or the ester linkage of the carboxyl groups of lignin and hemicellulose. The disappearance of 1734 $cm^{-1}$ peak and the decrease of peak intensity of 1235 $cm^{-1}$ in lignin-modified wood as compared to the natural wood indicates a partial dissolution/removal of hemicellulose from natural wood resulting from the photocatalytic oxidation treatment.

FIG. 9B shows the lignin content of the lignin-modified wood and the subsequently formed transparent wood, as compared to natural wood. The lignin content of the natural wood and lignin-modified wood samples was ~23.5% and ~19.9%, respectively. This further confirms that most of lignin structure was well preserved after the photocatalytic oxidation treatment. The preserved lignin can act as a binder to strengthen the mechanical properties of the lignin-modified wood as well as provide a robust wood scaffold for the subsequent polymer infiltration in forming the transparent wood composite.

Figure 9C:
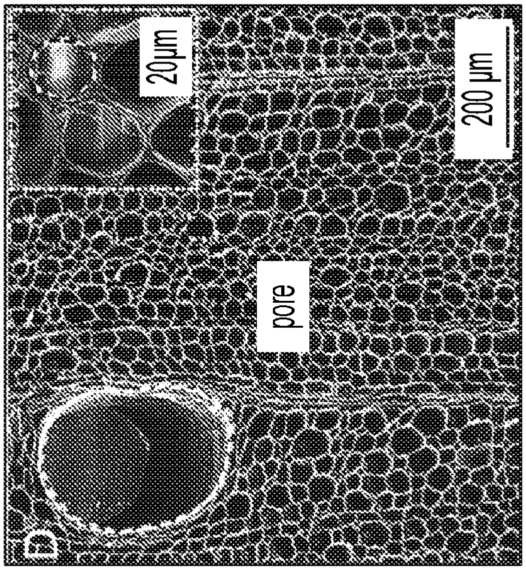
FIGS. 9C-9E are SEM images of transverse cross-sections of natural wood, a fabricated contiguous piece of in situ lignin modified wood, and a fabricated contiguous piece of a transparent wood composite, respectively.
Figure 9D:
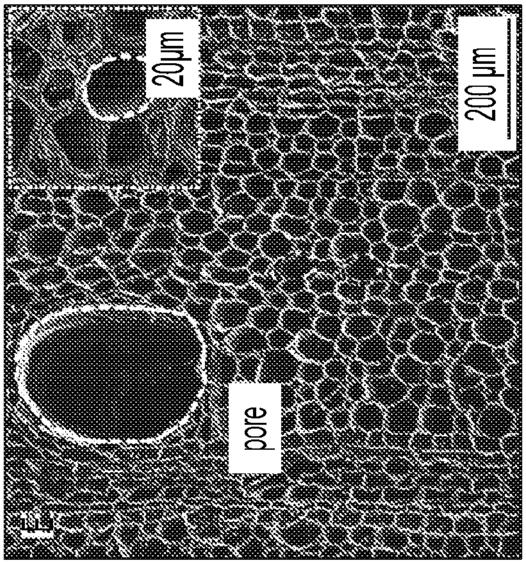
Figure 9E:
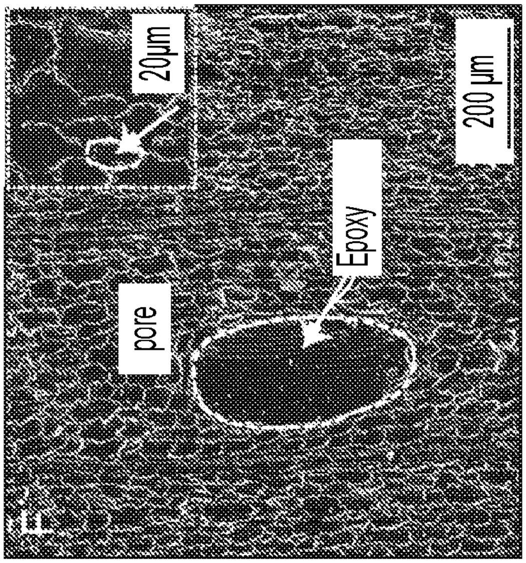

FIGS. 9C-9E show scanning electron microscopy (SEM) images of the natural wood, lignin-modified wood, and transparent wood. As shown in FIG. 9C, the natural wood shows a 3D hierarchical and interconnected porous microstructure, featuring microchannels (e.g., lumina) with cross-sectional dimensions (e.g., diameters) ranging from ~15 μm to ~300 μm. This unique porous microstructure is beneficial for fast $H_2O_2$ solution infiltration/diffusion and efficient UV light trapping inside the wood microchannels, which allows for efficient removal of light-absorbing chromophores during the photocatalytic oxidation process. As shown in FIG. 9D, the lignin-modified wood substantially retains the porous microstructure of the wood, with cross-sectional dimensions (e.g., diameter) of the microchannels in the lignin-modified wood ranging from ~10 μm to ~270 μm. As shown in FIG. 9E, the epoxy resin is able to infiltrate into the pores of the lignin-modified wood, thereby forming a dense and compact composite structure that helps suppress light scattering and improves the optical transmittance.

Figure 9F:
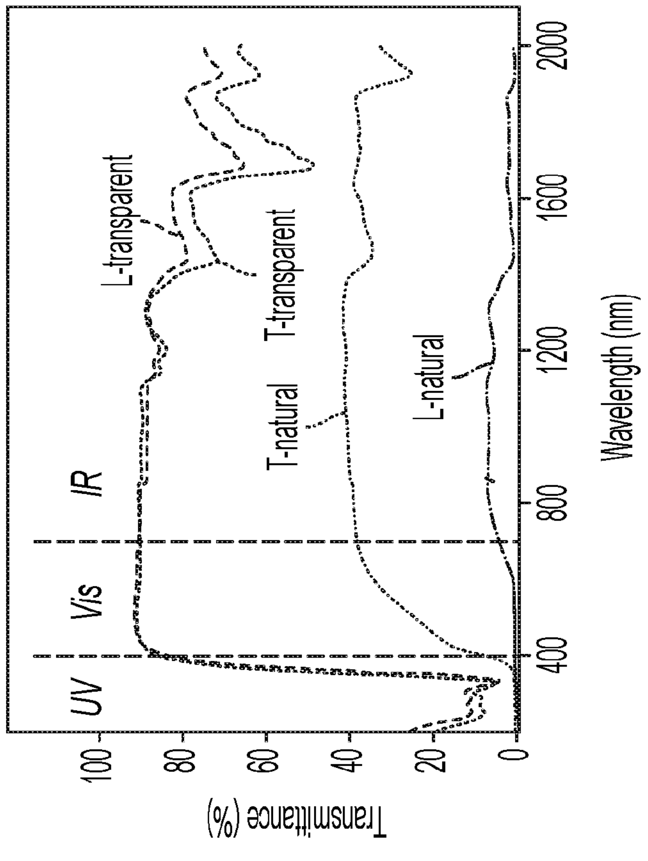
FIGS. 9F-9G are graphs of transmittance and absorptivity spectra, respectively, comparing longitudinal (L) and radial (T) cuts of natural wood and transparent wood composites.
Figure 9G:
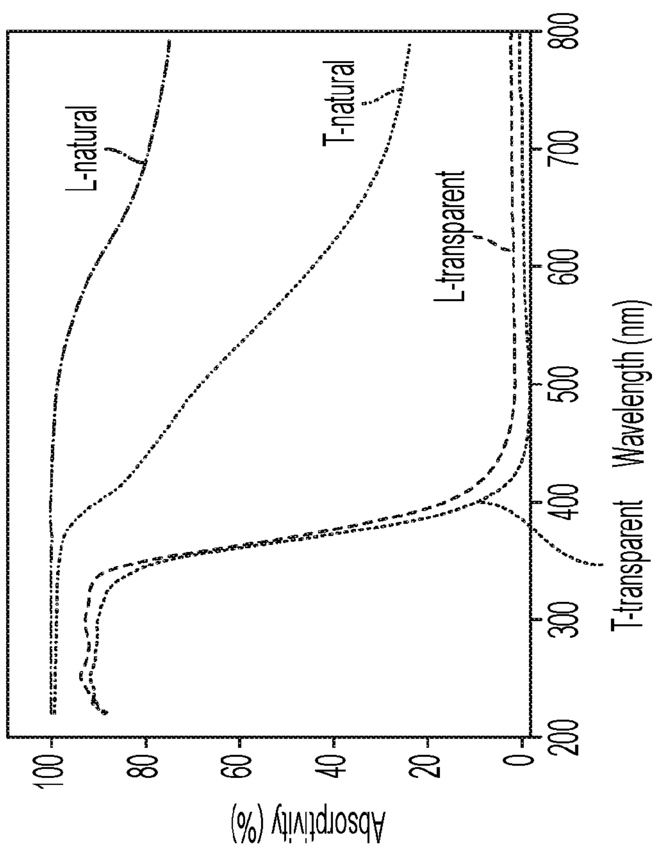
Figure 9H:
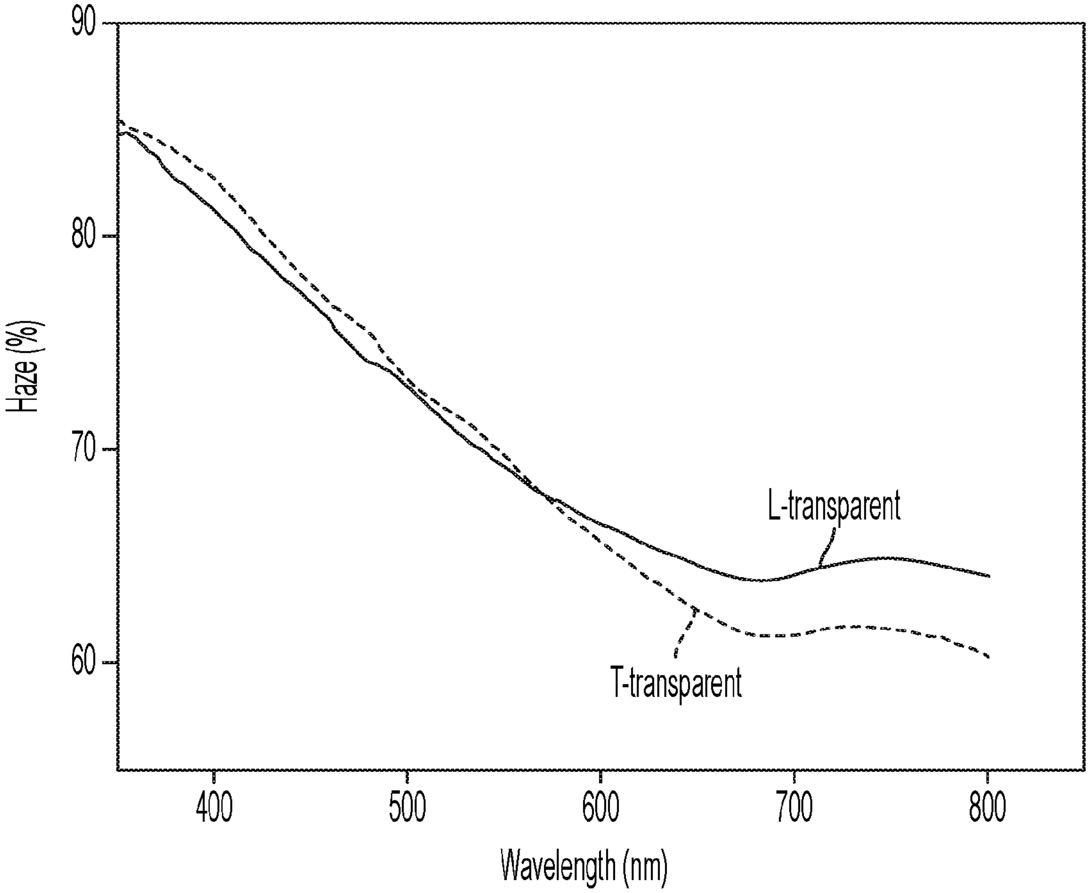
FIG. 9H is a graph of haze for fabricated contiguous pieces of transparent wood composites formed from longitudinal (L) and radial (T) cuts of natural wood.

In particular, transparent wood formed from radial/transverse (T) cut wood (e.g., having a size of 70 mm×30 mm×1.5 mm) and transparent wood formed from longitudinal (L) cut wood (e.g., having a size of 400 mm×110 mm×1 mm) both exhibit excellent optical properties. FIG. 9F shows the optical transmittance of the natural wood and transparent wood from 200-2000 nm. The transparent wood along the L and T directions has a high optical transmittance of ~90% for wavelengths in a range of 400-800 nm, inclusive. In contrast, natural wood in the same range exhibits a much smaller light transmittance, e.g., <6% for L-direction and <36% for the T-direction). Due to the removal of the light-absorbing chromophore of lignin by the photocatalytic oxidation, almost all visible light is allowed to pass through the transparent wood. Thus, the absorptivity of the transparent wood approaches 0% for wavelengths in the range of 400-800 nm, inclusive, which is much lower than that of natural wood in the same range, as shown in FIG. 9G. Meanwhile, the preservation of the cellulose-based microstructure imbues the transparent wood with enhanced haze characteristics in combination with high transparency. For example, FIG. 9H shows transmittance haze values for the transparent wood along the L and T directions, where each cut of the transparent wood exhibits haze values in a range of ~60% to ~80% for wavelengths in a range of 400-800 nm, inclusive.

Although balsa wood was used for the above described examples, transparent wood can be made from any type of hardwood or softwood. Indeed, transparent wood with excellent optical transparency was also be made from other wood species with different densities, in particular, oak and poplar, suggesting the universality of this approach. Additionally, the transparent wood preserves the aligned channels of the original wood microstructure, which allow light propagation to be guided along the channel direction and providing anisotropic optical transmittance.

As discussed above, the retention of lignin within the transparent wood composite can enhance the mechanical properties thereof. Mechanical properties of the natural wood and transparent wood at different tensile directions were measured. The tensile strengths of the natural wood along the L and T directions were 24.5 MPa and 0.7 MPa, respectively, while the tensile strengths of the L- and T-transparent wood samples were 46.2 MPa and 31.4 MPa, respectively (corresponding to an enhancement of 1.8-times and 44.8-times the strength of the respective natural wood cut). The L- and T-transparent wood also have a significantly improved toughness of 0.93 MJ $m^{-3}$ and 1.64 MJ $m^{-3}$ compared to the natural wood (L, 0.26 MJ $m^{-3}$; T, 0.03 MJ $m^{-3}$). The toughness of the L-transparent wood is lower than that of the T-transparent wood because of the smaller elongation at break of the L sample (3.4%<7.4%). Benefiting from the high mechanical strength, the transparent wood is also quite flexible, capable of being bent through an angle greater than 90° (e.g., as much as 180°) without breaking.

Conventional solution-based delignification methods generally involve immersing of the entirety of a wood block into a chemical solution, which makes it difficult to bleach selective areas of the material. In contrast, surface application of a liquid oxidation agent (e.g., brushing of $H_2O_2$ onto the wood) combined with UV light illumination can allow for selective in situ lignin modification of designated areas of the wood samples, thereby enabling the preparation of transparent wood composites with unique predetermined patterns, independent of any underlying natural patterns in the wood. In particular, a patterned transparent wood composite can be formed by selectively and precisely patterning to define lignin-modified regions and unmodified (e.g., natural lignin) regions in a contiguous block, and then infiltrating the contiguous block with polymer. Within the polymer-infiltrated contiguous block, the lignin-modified regions thus exhibit a relatively high optical transmittance (e.g., ~90% for visible wavelengths) while the unmodified regions exhibit an optical transmittance similar to natural wood (e.g., ~6% to ~36% for visible wavelengths).

Figure 9I:
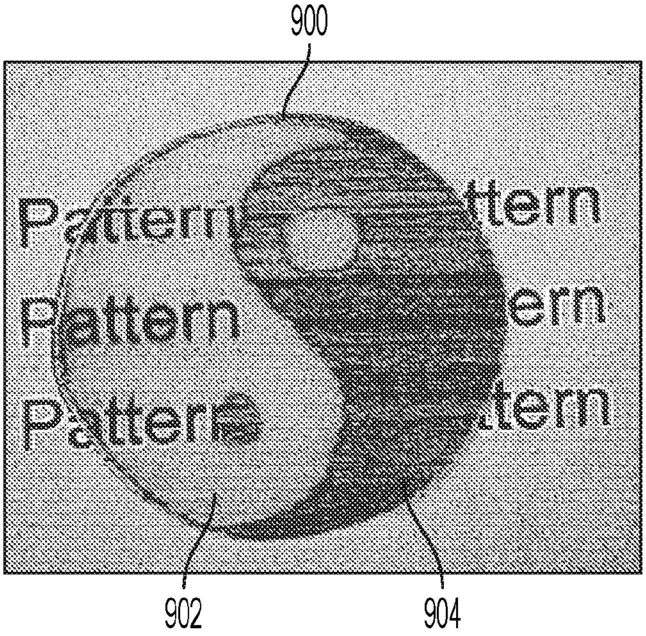
FIG. 9I is an image of a fabricated contiguous piece of transparent wood composite with a custom pattern.

To form a patterned transparent wood composite, a desired pattern was first drawn with a brush on the surface of the natural wood sample using $H_2O_2$ as an "ink." Then the wood surface was illuminated with UV light, which turns the regions underlying the brushed surface white Epoxy resin was then infiltrated into the microchannels of the lignin-modified wood to obtain the transparent wood composite with desired patterns. For example, FIG. 9I illustrates an L-transparent wood composite 900 patterned using the above method in the form of a yin-yang symbol. The lignin in section 902 has been in situ modified to remove chromophores therefrom and thus exhibit a white color, and the lignin in section 904 being substantially unmodified (e.g., native form of lignin). The polymer infiltration thus converts section 902 to transparent while section 904 remains substantially opaque.

Although the above described examples employ an artificial UV light source, solar radiation can also be used as the UV light source. Of the UV light (100-400 nm) emitted by the sun, more than 95% of the wavelengths that reach the Earth's surface are in the UVA range (e.g., 315-400 nm), which wavelengths are effective to provide the desired photocatalytic effect. For example, using solar radiation (Global Solar UV index of 7-8), three large pieces of balsa wood (having a length of 1 m) were in situ lignin modified after only one hour of exposure. Subsequent polymer infiltration converted the white modified wood sections to high transparency wood composite sections.

ADDITIONAL EXAMPLES OF THE DISCLOSED TECHNOLOGY

In view of the above described implementations of the disclosed subject matter, this application discloses the additional examples in the clauses enumerated below. It should be noted that one feature of a clause in isolation, or more than one feature of the clause taken in combination, and, optionally, in combination with one or more features of one or more further clauses are further examples also falling within the disclosure of this application.

Clause 1. A material comprising:

- a contiguous block of chemically-modified wood infiltrated with polymer, the chemically-modified wood retaining a cellulose-based microstructure of the wood in its natural state, the polymer having a refractive index substantially matching a refractive index of cellulose and filling open spaces within the microstructure,
- wherein the contiguous block has a first section and a second section adjacent to the first section,
- at least one of the first and second sections have been chemically modified such that a lignin characteristic of the first section is different than a lignin characteristic of the second section
- the first section is substantially transparent to light having a wavelength of 600 nm, and
- the second section is translucent or opaque to the light having a wavelength of 600 nm.

Clause 2. The material of any clause or example herein, in particular, Clause 1, wherein the lignin characteristic is lignin content, and the first section has a lower lignin content than the second section.

Clause 3. The material of any clause or example herein, in particular, any one of Clauses 1-2, wherein the wood in its natural state is a softwood.

Clause 4. The material of any clause or example herein, in particular, any one of Clauses 1-3, wherein the first section is substantially transparent with respect to some or all wavelengths in the visible light spectrum (e.g., 380-750 nm), and the second section is translucent or opaque with respect to some or all wavelengths in the visible light spectrum (e.g., 380-750 nm).

Clause 5. The material of any clause or example herein, in particular, any one of Clauses 1-4, wherein the first section has a transmittance of at least 85% for the light having the wavelength of 600 nm, the first section has a transmittance of at least 80% with respect to some or all wavelengths in the visible light spectrum (e.g., 380-750 nm), the second section has a transmittance less than or equal to 70% with respect to some or all wavelengths in the visible light spectrum (e.g., 380-750 nm), the second section has a transmittance less than or equal to 60% for the light having the wavelength of 600 nm, or any combination of the foregoing.

Clause 6. The material of any clause or example herein, in particular, any one of Clauses 1-5, wherein a degree of lignin removal in the first section is greater than a degree of lignin removal in the second section.

Clause 7. The material of any clause or example herein, in particular, any one of Clauses 1-7, wherein the first section has no more than 10% of lignin of the wood in its natural state, and the second section has at least 25% (e.g., at least 35%, or at least 50%) of lignin of the wood in its natural state.

Clause 8. The material of any clause or example herein, in particular, any one of Clauses 1-7, wherein a lignin content of the first section is less than or equal to 3 wt %.

Clause 9. The material of any clause or example herein, in particular, any one of Clauses 1-8, wherein a lignin content of the first section is less than or equal to 1 wt %.

Clause 10. The material of any clause or example herein, in particular, any one of Clauses 1-9, wherein a lignin content of the second section is greater than or equal to 7.5 wt %.

Clause 11. The material of any clause or example herein, in particular, any one of Clauses 1-10, wherein a lignin content of the second section is greater than or equal to 12.5 wt %.

Clause 12. The material of any clause or example herein, in particular, any one of Clauses 1-11, wherein the first section has at least 90% of lignin of the wood in its natural state removed by the chemical modification, and the second section has no more than 75% of lignin of the wood in its natural state removed by the chemical modification.

Clause 13. The material of any clause or example herein, in particular, any one of Clauses 1-12, wherein the second section has no more than 65% (e.g., less than or equal to 50%) of lignin of the wood in its natural state removed by the chemical modification.

Clause 14. The material of any clause or example herein, in particular, any one of Clauses 1-13, wherein the contiguous wood block has a transmittance of no more than 20% with respect to some or all light wavelengths in a range of 200-400 nm, inclusive.

Clause 15. The material of any clause or example herein, in particular, any one of Clauses 1-14, wherein the contiguous wood block exhibits a haze of at least 50% for light having a wavelength of 600 nm.

Clause 16. The material of any clause or example herein, in particular, any one of Clauses 1-15, wherein the contiguous wood block exhibits a haze of at least 60% for light having a wavelength in a range of 400-600 nm, inclusive, or the contiguous wood block exhibits a haze of least 65% with respect to some or all wavelengths in a range of 400-600 nm, inclusive.

Clause 17. The material of any clause or example herein, in particular, any one of Clauses 1-16, wherein the first section corresponds to an earlywood region of the wood in its natural state, and the second section corresponds to a latewood region of the wood in its natural state.

Clause 18. The material of any clause or example herein, in particular, any one of Clauses 1-17, wherein:

the first section has a first density and the cellulose-based microstructure in the first section has first lumina defined by first cell walls, the first lumina having a first average cross-sectional dimension and the first cell walls having a first average thickness;

the second section has a second density and the cellulose-based microstructure in the second section has second lumina defined by second cell walls, the second lumina having a second average cross-sectional dimension and the second cell walls having a second average thickness; and the second density is greater than the first density, the first average cross-sectional dimension is greater than the second average cross-sectional dimension, the first average thickness is less than the second average thickness, or any combination of the foregoing.

Clause 19. The material of any clause or example herein, in particular, any one of Clauses 1-18, wherein the cellulose-based microstructure has lumina defined by cell walls, the lumina extending along a longitudinal growth direction of the wood in its natural state, cellulose nanofibers forming the cell walls also extending along the longitudinal growth direction and substantially perpendicular to a radial direction of the wood it is natural state.

Clause 20. The material of any clause or example herein, in particular, Clause 19, wherein a tensile strength of the contiguous block substantially along the radial direction is at least three times greater than that of the wood in its natural state.

Clause 21. The material of any clause or example herein, in particular, any one of Clauses 19-20, wherein a tensile strength of the contiguous block substantially along the radial direction is at least 20 MPa.

Clause 22. The material of any clause or example herein, in particular, any one of Clauses 19-21, wherein a tensile strength of the contiguous block substantially along the longitudinal growth direction is at least 60 MPa.

Clause 23. The material of any clause or example herein, in particular, any one of Clauses 19-22, wherein a tensile strength of the contiguous block substantially along the longitudinal growth direction is at least 80 MPa.

Clause 24. The material of any clause or example herein, in particular, Clause 1, wherein the lignin characteristic comprises a chromophore state of the lignin, the first section has a chromophore state altered from that of the wood in its natural state, and the lignin in the second section retains a chromophore state of the wood in its natural state.

Clause 25. The material of any clause or example herein, in particular, Clause 24, wherein the altered chromophore state comprises removal of a chromophore from the lignin via oxidation.

Clause 26. The material of any clause or example herein, in particular, any one of Clauses 24-25, wherein the wood in its natural state is a hardwood or softwood.

Clause 27. The material of any clause or example herein, in particular, any one of Clauses 24-26, wherein the first section is substantially transparent with respect to some or all wavelengths in the visible light spectrum (e.g., 380-750 nm), and the second section is opaque with respect to some or all wavelengths in the visible light spectrum (e.g., 380-750 nm).

Clause 28. The material of any clause or example herein, in particular, any one of Clauses 24-27, wherein the first section has a transmittance of at least 85% for the light having the wavelength of 600 nm, the first section has a transmittance of at least 80% with respect to some or all wavelengths in the visible light spectrum (e.g., 380-750 nm), the second section has a transmittance less than or equal to 60% with respect to some or all wavelengths in the visible light spectrum (e.g., 380-750 nm), the second section has a transmittance less than or equal to 50% for the light having the wavelength of 600 nm, or any combination of the foregoing.

Clause 29. The material of any clause or example herein, in particular, any one of Clauses 24-28, wherein the first section has a transmittance of 90% or greater with respect to some or all wavelengths within a range of 400-800 nm, inclusive.

Clause 30. The material of any clause or example herein, in particular, any one of Clauses 24-29, wherein both the first and second sections have at least 70% of lignin of the wood in its natural state.

Clause 31. The material of any clause or example herein, in particular, any one of Clauses 24-30, wherein a lignin content of the second section is greater than a lignin content of the first section.

Clause 32. The material of any clause or example herein, in particular, any one of Clauses 24-31, wherein a lignin content of the first section, a lignin content of the second section, or the lignin contents of both the first and second sections are at least 15 wt %.

Clause 33. The material of any clause or example herein, in particular, any one of Clauses 24-32, wherein the first and second sections have no more than 30% of lignin of the wood in its natural state removed by the chemical modification.

Clause 34. The material of any clause or example herein, in particular, any one of Clauses 24-33, wherein the contiguous wood block has a transmittance of no more than 20% with respect to some or all light wavelengths within a range of 200-350 nm, inclusive.

Clause 35. The material of any clause or example herein, in particular, any one of Clauses 24-34, wherein the contiguous wood block has an absorptivity of at least 80% with respect to some or all light wavelengths within a range of 200-350 nm, inclusive.

Clause 36. The material of any clause or example herein, in particular, any one of Clauses 24-35, wherein the contiguous wood block exhibits a haze of at least 50% for light having a wavelength of 600 nm.

Clause 37. The material of any clause or example herein, in particular, any one of Clauses 24-36, wherein the contiguous wood block exhibits a haze of at least 60% with respect to some or all light wavelengths in a range of 400-800 nm, inclusive, or the contiguous wood block exhibits a haze of at least 65% with respect to some or all light wavelengths in a range of 400-800 nm, inclusive.

Clause 38. The material of any clause or example herein, in particular, any one of Clauses 24-37, wherein the first and second sections form a pre-determined pattern independent of an underlying cellulose-based microstructure of the wood in its natural state.

Clause 39. The material of any clause or example herein, in particular, any one of Clauses 24-38, wherein the cellulose-based microstructure has lumina defined by cell walls, the lumina extending along a longitudinal growth direction of the wood in its natural state, cellulose nanofibers forming the cell walls also extending along the longitudinal growth direction and substantially perpendicular to a radial direction of the wood it is natural state.

Clause 40. The material of any clause or example herein, in particular, Clause 39, wherein:

a tensile strength of the contiguous block substantially along the radial direction is at least 40 times greater than that of the wood in its natural state;

a tensile strength of the contiguous block substantially along the longitudinal growth direction is at least 1.5 times greater than that of the wood in its natural state;

a tensile strength of the contiguous block substantially along the radial direction is at least 25 MPa;

a tensile strength of the contiguous block substantially along the longitudinal growth direction is at least 40 MPa; or any combination of the above.

Clause 41. A material comprising:

a section of wood chemically-modified such that chromophores of lignin within the wood in its natural state are altered or removed, wherein the section retains at least 70% of the lignin of the wood in its natural state and a cellulose-based microstructure of the wood in its natural state.

Clause 42. The material of any clause or example herein, in particular, Clause 41, wherein a lignin content of the section is at least 15 wt %.

Clause 43. The material of any clause or example herein, in particular, any one of Clauses 41-42, wherein the section has at least 80% of lignin of the wood in its natural state.

Clause 44. The material of any clause or example herein, in particular, any one of Clauses 41-43, wherein:

each of three orthogonal dimensions of the section is greater than or equal to 0.5 mm.

each of three orthogonal dimensions of the section is greater than or equal to 1 cm.

at least two of three orthogonal dimensions of the section are greater than or equal to 10 cm;

at least one of three orthogonal dimensions of the section is greater than or equal to 20 cm; or any combination of the foregoing.

Clause 45. The material of any clause or example herein, in particular, any one of Clauses 41-44, wherein said section comprises an entirety of a contiguous block of wood.

Clause 46. The material of any clause or example herein, in particular, any one of Clauses 41-44, wherein:

said section comprises a first section of a contiguous block of wood;

the material comprises a second section of the contiguous block of wood adjacent to the first section; and the lignin in the second section retains a chromophore state of the wood in its natural state.

Clause 47. The material of any clause or example herein, in particular, any one of Clauses 45-46, wherein the contiguous block consists essentially of wood.

Clause 48. The material of any clause or example herein, in particular, any one of Clauses 41-47, wherein the section has a reflectivity of 90% or greater with respect to some or all light wavelengths in a range of 400-800 nm, inclusive.

Clause 49. The material of any clause or example herein, in particular, any one of Clauses 41-48, wherein the section is substantially white in color.

Clause 50. The material of any clause or example herein, in particular, any one of Clauses 41-48, wherein the section further comprises a polymer infiltrating the cellulose-based microstructure, the polymer has a refractive index substantially matching a refractive index of cellulose and fills open spaces within the microstructure, and the section is substantially transparent to light having a wavelength of 600 nm.

Clause 51. The material of any clause or example herein, in particular, Clause 50, wherein the section is substantially transparent with respect to some or all wavelengths within the visible light spectrum (e.g., 380-750 nm).

Clause 52. The material of any clause or example herein, in particular, any one of Clauses 50-51, wherein the section has:

a transmittance of at least 80% for the light having the wavelength of 600 nm;

a transmittance of 90% or greater with respect to some or all light wavelengths in a range of 400-800 nm, inclusive;

a transmittance of no more than 20% with respect to some or all light wavelengths in a range of 200-350 nm, inclusive;

an absorptivity of at least 80% with respect to some or all light wavelengths in a range of 200-350 nm, inclusive;

a haze of at least 65% for light having a wavelength of 600 nm;

a haze of at least 50% (e.g., at least 60% or at least 65%) with respect to some or all light wavelengths in a range of 400-800 nm, inclusive; or any combination of the foregoing.

Clause 53. The material of any clause or example herein, in particular, any one of Clauses 50-52, wherein the section consists essentially of wood and the infiltrated polymer.

Clause 54. A method comprising:

subjecting a contiguous block of wood to a chemical treatment for a first time so as to remove lignin from first and second sections within the contiguous block while substantially retaining a cellulose-based microstructure of the wood, the first section being adjacent to the second section, the first time being selected such that at least 90% of the lignin of the wood in the first section is removed while no more than 75% (e.g., less than or equal to 65%, or less than or equal to 50%) of the lignin in the second section is removed; and infiltrating the contiguous block with a polymer so as to fill open spaces within the retained cellulose-based microstructure of the first and second sections, the polymer having a refractive index substantially matching a refractive index of cellulose, wherein, after the infiltrating, the first section is substantially transparent to light having a wavelength of 600 nm, and the second section is translucent to the light having a wavelength of 600 nm.

Clause 55. The method of any clause or example herein, in particular, Clause 54, wherein the wood is a softwood.

Clause 56. The method of any clause or example herein, in particular, any one of Clauses 54-55, wherein, after the infiltrating, the first section has a transmittance of at least 85% for the light having the wavelength of 600 nm, the first section has a transmittance of at least 80% with respect to some or all wavelengths in the visible light spectrum (e.g., 380-750 nm), the second section has a transmittance less than or equal to 70% with respect to some or all wavelengths in the visible light spectrum (e.g., 380-750 nm), the second section has a transmittance less than or equal to 60% for the light having the wavelength of 600 nm, or any combination of the foregoing.

Clause 57. The method of any clause or example herein, in particular, any one of Clauses 54-56, wherein, after the subjecting, a lignin content of the first section is less than or equal to 3 wt %.

Clause 58. The method of any clause or example herein, in particular, any one of Clauses 54-57, wherein, after the subjecting, a lignin content of the first section is less than or equal to 1 wt %.

Clause 59. The method of any clause or example herein, in particular, any one of Clauses 54-58, wherein, after the subjecting, a lignin content of the second section is greater than or equal to 7.5 wt %.

Clause 60. The method of any clause or example herein, in particular, any one of Clauses 54-59, wherein, after the subjecting, a lignin content of the second section is greater than or equal to 12.5 wt %.

Clause 61. The method of any clause or example herein, in particular, any one of Clauses 54-60, wherein the first section corresponds to an earlywood region of the wood in its natural state, and the second section corresponds to a latewood region of the wood in its natural state.

Clause 62. The method of any clause or example herein, in particular, any one of Clauses 54-61, wherein the chemical treatment comprises a solution of sodium chlorite ($NaClO_2$).

Clause 63. The method of any clause or example herein, in particular, any one of Clauses 54-62, wherein the chemical treatment comprises a solution of sodium chlorite ($NaClO_2$) and acetic acid.

Clause 64. The method of any clause or example herein, in particular, Clause 63, wherein said solution is boiling during the subjecting.

Clause 65. The method of any clause or example herein, in particular, any one of Clauses 54-64, wherein the first time is less than or substantially equal to 5 hours.

Clause 66. The method of any clause or example herein, in particular, any one of Clauses 54-65, wherein the first time is no more than 2 hours.

Clause 67. The method of any clause or example herein, in particular, any one of Clauses 54-66, wherein the infiltrating comprises:

immersing the contiguous block within a liquid polymer or polymer precursor;

applying a vacuum to cause the liquid polymer or polymer precursor to flow into the cellulose-based microstructure; and drying the liquid polymer or polymerizing the precursor to form a solid polymer in situ within the microstructure of the contiguous block.

Clause 68. The method of any clause or example herein, in particular, Clause 67, wherein the infiltrating further comprises, during the drying or polymerizing, pressing the contiguous block.

Clause 69. The method of any clause or example herein, in particular, any one of Clauses 54-68, wherein the polymer comprises an epoxy resin.

Clause 70. A method comprising:

applying a first volume of a liquid oxidation agent to an external surface of a section of a contiguous block of wood; and during or after the applying, exposing the section of the contiguous block of wood to ultra-violet (UV) radiation, wherein chromophores of lignin within said section are chemically oxidized and removed in situ by the UV exposure in the presence of the liquid oxidation agent, and after the exposing, a cellulose-based microstructure of the wood and at least 70% of the lignin in said section prior to the applying are retained.

Clause 71. The method of any clause or example herein, in particular, Clause 70, wherein the liquid oxidation agent comprises a solution of hydrogen peroxide ($H_2O_2$).

Clause 72. The method of any clause or example herein, in particular, Clause 71, wherein a concentration of the hydrogen peroxide in the solution is at least 30 wt %.

Clause 73. The method of any clause or example herein, in particular, any one of Clauses 70-72, wherein, after the exposing, a lignin content of the section is at least 15 wt %.

Clause 74. The method of any clause or example herein, in particular, any one of Clauses 70-73, wherein the external surface of the section has a surface area, and the first volume is at least 800 ml/m$^2$ of said surface area.

Clause 75. The method of any clause or example herein, in particular, any one of Clauses 70-74, wherein the section has a thickness in a direction perpendicular to the external surface, and the first volume is at least 125 ml per square meter of surface area per 0.1 mm of thickness.

Clause 76. The method of any clause or example herein, in particular, any one of Clauses 70-75, wherein the first volume is less than 1.5 times a volume of the section, or the first volume is between 1 times and 5 times, inclusive, of a volume of the section.

Clause 77. The method of any clause or example herein, in particular, any one of Clauses 70-76, prior to or concurrent with the applying, applying a second volume of an alkali to the external surface of the section of contiguous block of wood.

Clause 78. The method of any clause or example herein, in particular, Clause 77, wherein the second volume is less than or equal to 20% of the first volume.

Clause 79. The method of any clause or example herein, in particular, any one of Clauses 77-78, wherein the second volume is no more than 3 ml.

Clause 80. The method of any clause or example herein, in particular, any one of Clauses 77-79, wherein the alkali comprises sodium hydroxide (NaOH), potassium hydroxide (KOH), ammonium hydroxide ($NH_4OH$), calcium hydroxide ($Ca(OH)_2$), or any combination of the foregoing.

Clause 81. The method of any clause or example herein, in particular, any one of Clauses 77-80, wherein a concentration of the alkali in solution is at least 10 wt %.

Clause 82. The method of any clause or example herein, in particular, any one of Clauses 70-81, wherein the applying comprises immersing the contiguous block in the first volume of the liquid oxidation agent.

Clause 83. The method of any clause or example herein, in particular, any one of Clauses 70-81, wherein the applying comprises direct application to the external surface without immersing the contiguous block.

Clause 84. The method of any clause or example herein, in particular, Clause 83, wherein the applying comprises multiple sub-applications to achieve the first volume.

Clause 85. The method of any clause or example herein, in particular, any one of Clauses 83-84, wherein the direct application comprises brushing, spraying, rolling, or any combination thereof.

Clause 86. The method of any clause or example herein, in particular, any one of Clauses 83-85, wherein the applying comprises applying the first volume to the external surface in a predetermined pattern without applying any liquid oxidation agent to a second section of the contiguous wood block adjacent to said section.

Clause 87. The method of any clause or example herein, in particular, Clause 86, wherein, after the exposing, the second section has a lignin content greater than a lignin content of the section.

Clause 88. The method of any clause or example herein, in particular, any one of Clauses 86-87, wherein, after the exposing, the section is substantially white in color, and the second section is non-white in color.

Clause 89. The method of any clause or example herein, in particular, any one of Clauses 86-88, further comprising, prior to the applying, defining a boundary of the predetermined pattern by disposing a hydrophobic material on the external surface.

Clause 90. The method of any clause or example herein, in particular, Clause 89, wherein the hydrophobic material comprises petroleum jelly.

Clause 91. The method of any clause or example herein, in particular, any one of Clauses 70-90, wherein the exposing comprises using a mask with predetermined pattern to illuminate the section without illuminating a second section of the contiguous wood block adjacent to said section.

Clause 92. The method of any clause or example herein, in particular, Clause 91, wherein, after the exposing, the second section has a lignin content greater than a lignin content of the section.

Clause 93. The method of any clause or example herein, in particular, any one of Clauses 91-92, wherein, after the exposing, the section is substantially white in color, and the second section is non-white in color.

Clause 94. The method of any clause or example herein, in particular, any one of Clauses 70-93, further comprising:

after the exposing, infiltrating the contiguous block with a polymer so as to fill open spaces within the retained cellulose-based microstructure of the section, the polymer having a refractive index substantially matching a refractive index of cellulose, wherein, after the infiltrating, the section is substantially transparent to light having a wavelength of 600 nm.

Clause 95. The method of any clause or example herein, in particular, Clause 94, wherein the infiltrating comprises:

immersing the contiguous block within a liquid polymer or polymer precursor;

applying a vacuum to cause the liquid polymer or polymer precursor to flow into the cellulose-based microstructure; and drying the liquid polymer or polymerizing the precursor to form a solid polymer in situ within the microstructure of the contiguous block.

Clause 96. The method of any clause or example herein, in particular, any one of Clauses 94-95, wherein the polymer comprises an epoxy resin.

Clause 97. The method of any clause or example herein, in particular, any one of Clauses 94-96, wherein, after the infiltrating, the section has:

a transmittance of at least 90% for the light having the wavelength of 600 nm;

a transmittance of at least 80% for some or all light wavelengths in a range of 400-800 nm, inclusive;

a transmittance of no more than 20% for some or all light wavelengths in a range of 200-350 nm, inclusive;

an absorptivity of at least 80% for some or all light wavelengths in a range of 200-350 nm, inclusive;

a haze of at least 50% for light having a wavelength of 600 nm;

a haze of at least 65%, for some or all light wavelengths within a range of 400-800 nm, inclusive; or any combination of the foregoing.

Clause 98. The method of any clause or example herein, in particular, any one of Clauses 70-97, wherein the UV radiation is from an artificial light source generating radiation in the UVA band of at least 20 W.

Clause 99. The method of any clause or example herein, in particular, any one of Clauses 70-97, wherein the UV radiation is sunlight at an ultraviolet index (UVI) of at least 5.

Clause 100. The method of any clause or example herein, in particular, any one of Clauses 70-99, wherein the exposing is for a time of 2 hours or less.

Clause 101. The method of any clause or example herein, in particular, any one of Clauses 70-99, wherein the exposing is for a time of 1 hour or less.

Clause 102. A method comprising:

(a) photocatalytically oxidizing a section of a contiguous block of wood so as to in situ chemically modify native lignin within the section to remove chromophores thereof while preserving its bulk aromatic skeleton.

Clause 103. The method of any clause or example herein, in particular, Clause 102, wherein:

prior to (a), the section has a first content of lignin therein;

after (a), the section has a second content of lignin therein; and the second content is at least 70% of the first content.

Clause 104. The method of any clause or example herein, in particular, Clause 103, wherein the second content of lignin is at least 15 wt %.

Clause 105. The method of any clause or example herein, in particular, any one of Clauses 102-104, wherein, after (a), the section is substantially white in color.

Clause 106. The method of any clause or example herein, in particular, any one of Clauses 102-105, wherein, after (a), the section has a reflectivity of at least 85% for light having a wavelength in a range of 400-800 nm, inclusive.

Clause 107. The method of any clause or example herein, in particular, any one of Clauses 102-106, further comprising:

(b), after (a), infiltrating the contiguous block of wood with a refractive-index-matching polymer such that the section becomes substantially transparent to visible light.

Clause 108. The method of any clause or example herein, in particular, Clause 107, wherein, after (b):

the section has a transmittance of at least 85% for some or all light wavelengths in a range of 400-800 nm, inclusive;

the section has a haze of at least 65% for some or all light wavelengths in a range of 400-800 nm, inclusive;

or both of the above.

Clause 109. The method of any clause or example herein, in particular, any one of Clauses 102-108, wherein the photocatalytically oxidizing comprises a combination of hydrogen peroxide and ultraviolet radiation.

Clause 110. The method of any clause or example herein, in particular, Clause 109, wherein the hydrogen peroxide is applied to an external surface of the section without immersion of the contiguous block in solution.

Clause 111. The method of any clause or example herein, in particular, any one of Clauses 102-110, wherein another section of the contiguous block is not subject to the photocatalytically oxidizing during (a), such that the section and the another section form a predetermined pattern.

Clause 112. The method of any clause or example herein, in particular, Clause 111, wherein, during (a) no more than one of the hydrogen peroxide and the ultraviolet radiation is applied to the another section.

Clause 113. A material formed by the method of clause or example herein, in particular, any one of Clauses 54-112.

Clause 114. The material of any clause or example herein, in particular, any one of Clauses 1-53 and 113, adapted for use as a building material or structural material.

CONCLUSION

Any of the features illustrated or described with respect to FIGS. 1A-9I and Clauses 1-114 can be combined with any other features illustrated or described with respect to FIGS. 1A-9I and Clauses 1-114 to provide materials, structures, methods, devices, and embodiments not otherwise illustrated or specifically described herein. All features described herein are independent of one another and, except where structurally impossible, can be used in combination with any other feature described herein.

In view of the many possible embodiments to which the principles of the disclosed technology may be applied, it should be recognized that the illustrated embodiments are only preferred examples and should not be taken as limiting the scope of the disclosed technology. Rather, the scope is defined by the following claims. We therefore claim all that comes within the scope and spirit of these claims.

The invention claimed is:

1. A material comprising:

a contiguous block of chemically-modified wood infiltrated with polymer, the chemically-modified wood retaining a cellulose-based microstructure of the wood in its natural state, the polymer having a refractive index substantially matching a refractive index of cellulose and filling open spaces within the microstructure, wherein the contiguous block has a first section and a second section adjacent to the first section, at least one of the first and second sections have been chemically modified such that a lignin characteristic of the first section is different than a lignin characteristic of the second section, the first section is substantially transparent to light having a wavelength of 600 nm, and the second section is translucent or opaque to the light having a wavelength of 600 nm.

2. The material of claim 1, wherein:

the lignin characteristic is lignin content, and the first section has a lower lignin content than the second section.

3. The material of claim 1, wherein the first section has a transmittance of at least 85% for the light having the wavelength of 600 nm, and the second section has a transmittance less than or equal to 60% for the light having the wavelength of 600 nm.

4. The material of claim 1, wherein:

a degree of lignin removal in the first section is greater than a degree of lignin removal in the second section.

5. The material of claim 4, wherein a lignin content of the first section is less than or equal to 3 wt %.

6. The material of claim 4, wherein a lignin content of the second section is greater than or equal to 7.5 wt %.

7. The material of claim 1, wherein the first section corresponds to an earlywood region of the wood in its natural state, and the second section corresponds to a latewood region of the wood in its natural state.

8. The material of claim 1, wherein:

the lignin characteristic comprises a chromophore state of the lignin, the first section has a chromophore state altered from that of the wood in its natural state, and the lignin in the second section retains a chromophore state of the wood in its natural state; and the altered chromophore state comprises removal of a chromophore from the lignin via oxidation.

9. The material of claim 1, wherein the contiguous block is a single continuous first and second sections are the same species of wood and from the same piece of wood taken from a single tree.

10. The material of claim 1, wherein the wood in its natural state is a softwood.

11. The material of claim 1, wherein the contiguous wood block exhibits a haze of at least 50% for light having a wavelength of 600 nm.

12. The material of claim 11, wherein the contiguous wood block exhibits a haze of at least 65% for light having a wavelength between 400 nm and 600 nm, inclusive.

13. The material of claim 1, wherein:

the first section has a first density and the cellulose-based microstructure in the first section has first lumina defined by first cell walls, the first lumina having a first average cross-sectional dimension and the first cell walls having a first average thickness;

the second section has a second density and the cellulose-based microstructure in the second section has second lumina defined by second cell walls, the second lumina having a second average cross-sectional dimension and the second cell walls having a second average thickness; and the second density is greater than the first density, the first average cross-sectional dimension is greater than the second average cross-sectional dimension, the first average thickness is less than the second average thickness, or any combination of the foregoing.

14. The material of claim 1, wherein the polymer comprises an epoxy resin.

15. A method comprising:

subjecting a contiguous block of wood to a chemical treatment for a first time so as to remove lignin from first and second sections within the contiguous block while substantially retaining a cellulose-based microstructure of the wood in its natural state, the first-second section being adjacent to the second first section, the first time being selected such that at least 90% of the lignin of the wood in the first section is removed while no more than 75% of the lignin in the second section is removed; and infiltrating the contiguous block with a polymer so as to fill open spaces within the retained cellulose-based microstructure of the first and second sections, the polymer having a refractive index substantially matching a refractive index of cellulose, wherein, after the infiltrating, the first section is substantially transparent to light having a wavelength of 600 nm, and the second section is translucent to the light having a wavelength of 600 nm.

16. The method of claim 15, wherein, after the infiltrating, the first section has a transmittance of at least 85% for the light having the wavelength of 600 nm, and the second section has a transmittance less than or equal to 60% for the light having the wavelength of 600 nm.

17. The method of claim 15, wherein, after the subjecting, a lignin content of the first section is less than or equal to 3 wt %.

18. The method of claim 15, wherein, after the subjecting, a lignin content of the second section is greater than or equal to 7.5 wt %.

19. The method of claim 15, wherein the infiltrating comprises:

immersing the contiguous block within a liquid polymer or polymer precursor;

applying a vacuum to cause the liquid polymer or polymer precursor to flow into the cellulose-based microstructure; and drying the liquid polymer or polymerizing the precursor to form a solid polymer in situ within the microstructure of the contiguous block.

20. The method of claim 19, wherein the infiltrating further comprises, during the drying or polymerizing, pressing the contiguous block.

* * * * *